US010687043B2

(12) United States Patent
Lee et al.

(10) Patent No.: US 10,687,043 B2
(45) Date of Patent: Jun. 16, 2020

(54) METHOD OF TRANSMITTING OMNIDIRECTIONAL VIDEO, METHOD OF RECEIVING OMNIDIRECTIONAL VIDEO, DEVICE FOR TRANSMITTING OMNIDIRECTIONAL VIDEO, AND DEVICE FOR RECEIVING OMNIDIRECTIONAL VIDEO

(71) Applicant: LG ELECTRONICS INC., Seoul (KR)

(72) Inventors: Jangwon Lee, Seoul (KR); Sejin Oh, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 17 days.

(21) Appl. No.: 15/685,631

(22) Filed: Aug. 24, 2017

(65) Prior Publication Data
US 2018/0063505 A1    Mar. 1, 2018

Related U.S. Application Data

(60) Provisional application No. 62/379,740, filed on Aug. 25, 2016.

(51) Int. Cl.
*H04N 13/194* (2018.01)
*G06T 9/00* (2006.01)
(Continued)

(52) U.S. Cl.
CPC ......... *H04N 13/194* (2018.05); *G06T 3/0018* (2013.01); *G06T 9/00* (2013.01);
(Continued)

(58) Field of Classification Search
CPC .............. H04N 13/194; H04N 13/178; H04N 21/23614; H04N 13/106; G06T 9/00; G06T 3/0018; G06T 15/20; G06T 15/04
(Continued)

(56) References Cited

U.S. PATENT DOCUMENTS 7,176,960 B1    2/2007 Nayar et al.
2013/0044108 A1    2/2013 Tanaka et al.
(Continued)

FOREIGN PATENT DOCUMENTS

CN    103004227 A    3/2013
CN    104735464 A    6/2015
(Continued)

OTHER PUBLICATIONS

"The Rhombic Dodecahedron Map: An Efficient Scheme for Encoding Panoramic Video" (Fu), IEEE (Year: 2009).*
(Continued)

*Primary Examiner* — Jared Walker
(74) *Attorney, Agent, or Firm* — Dentons US LLP

(57) ABSTRACT

A method of transmitting omnidirectional video is provided according to one aspect of the present invention. The method of transmitting omnidirectional video according to an embodiment of the present invention includes: acquiring an image for the omnidirectional video; projecting the image for the omnidirectional video onto a 3D projection structure; packing the image projected on the 3D projection structure into a 2D frame; encoding the image packed into the 2D frame; and transmitting a data signal including the encoded image and metadata about the omnidirectional video.

8 Claims, 32 Drawing Sheets

(51) Int. Cl.
*H04N 13/178* (2018.01)
*H04N 13/106* (2018.01)
*G06T 3/00* (2006.01)
*G06T 15/20* (2011.01)
*H04N 21/236* (2011.01)
*G06T 15/04* (2011.01)

(52) U.S. Cl.
CPC ......... *H04N 13/106* (2018.05); *H04N 13/178* (2018.05); *H04N 21/23614* (2013.01); *G06T 15/04* (2013.01); *G06T 15/20* (2013.01)

(58) Field of Classification Search
USPC .......................................................... 348/43
See application file for complete search history.

(56) References Cited

U.S. PATENT DOCUMENTS

| | | | | |
|---|---|---|---|---|
| 2013/0106855 | A1* | 5/2013 | Urbach | G06T 15/08 345/424 |
| 2013/0185353 | A1* | 7/2013 | Rondao Alface | H04N 5/445 709/203 |
| 2014/0325572 | A1* | 10/2014 | Yie | H04H 60/73 725/74 |
| 2015/0381998 | A1* | 12/2015 | Wang | H04N 19/174 375/240.16 |
| 2016/0088287 | A1* | 3/2016 | Sadi | H04N 13/254 348/43 |
| 2016/0119541 | A1* | 4/2016 | Alvarado-Moya | G06T 3/4038 348/38 |

FOREIGN PATENT DOCUMENTS

| | | |
|---|---|---|
| CN | 105898254 A | 8/2016 |
| CN | 105898339 A | 8/2016 |
| JP | 5891388 B2 | 3/2016 |
| WO | 2015/027105 A1 | 2/2015 |
| WO | 2016076680 A1 | 5/2016 |

OTHER PUBLICATIONS

Yu, M., et al., "A framework to Evaluate Omnidirectional Video Coding Schemes," 2015 IEEE International Symposium on Mixed and Augmented Reality, 2015, pp. 31-36.

XP055517901: Choi, Wang and Hannuksela, International Organisation for Standarisation: Organisation Internationale de Normalisation, Jun. 2016, Geneva, Switzerland, "WD on ISO/IEC 23000-20 Omnidirectional Media Application Format," pp. 1-42.

* cited by examiner

FIG. 7
(a) 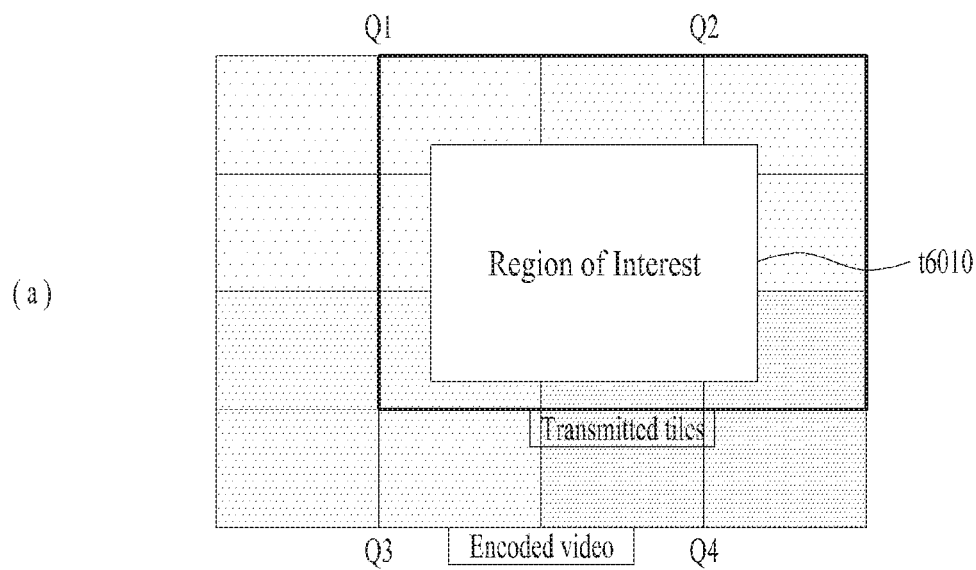
(b) 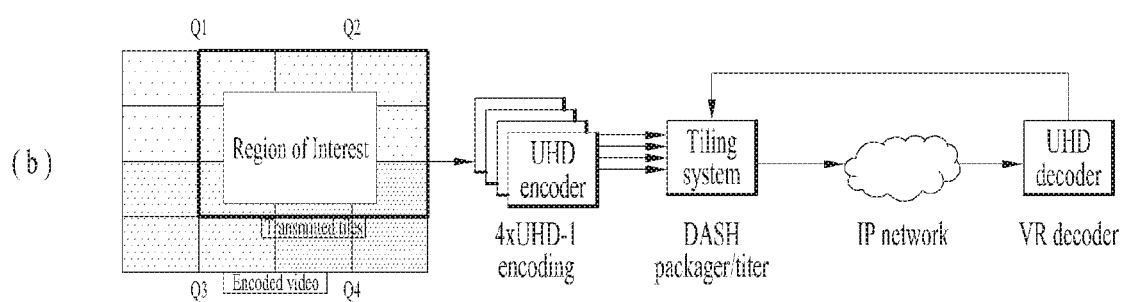

FIG. 8

```
.....
            < Basic metadata >
    unsigned     int(8)         vr_geometry;
    unsigned     int(8)         projection_scheme;
            < Stereoscopic related metadata >
    unsigned     int(1)         is_stereoscopic;
    unsigned     int(3)         stereo_mode;
            < Initial view related metadata >
    signed       int(8)         initial_view_yaw_degree;
    signed       int(8)         initial_view_pitch_degree;
    signed       int(8)         initial_view_roll_degree;
            < ROI related metadata >
    unsigned int(1)             2d_roi_range_flag;
    unsigned int(1)             3d_roi_range_flag;
    if (2d_roi_region_flag ==1) {
       unsigned int(16) min_top_left_x;
       unsigned int(16) max_top_left_x;
       unsigned int(16) min_top_left_y;
       unsigned int(16) max_top_left_y;
       unsigned int(16) min_width;
       unsigned int(16) max_width;
       unsigned int(16) min_height;
       unsigned int(16) max_height;
       unsigned int(16) min_x;
       unsigned int(16) max_x;
       unsigned int(16) min_y;
       unsigned int(16) max_y;
    }
    if (3d_roi_region_flag ==1) {
       unsigned int(16) min_yaw;
       unsigned int(16) max_yaw;
       unsigned int(16) min_pitch;
       unsigned int(16) max_pitch;
       unsigned int(16) min_roll;
       unsigned int(16) max_roll;
       unsigned int(16) min_field_of_view;
       unsigned int(16) max_field_of_view;
    }
            < Field Of View related metadata >
    unsigned int(1)             content_fov_flag;
    if (content_fov_flag == 1) {
       unsigned int(16)         content_fov;
    }
            < Cropped Region related metadata >
    unsigned int(1)             is_cropped_region;
    if(is_cropped_region == 1) {
       unsigned int(16)         cr_region_left_top_x;
       unsigned int(16)         cr_region_left_top_y;
       unsigned int(16)         cr_region_width;
       unsigned int(16)         cr_region_height;
    }
.....
```

FIG. 11
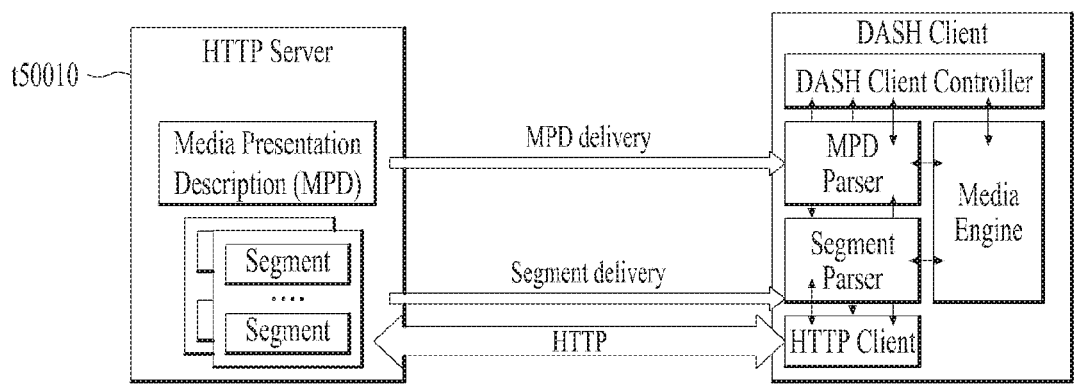
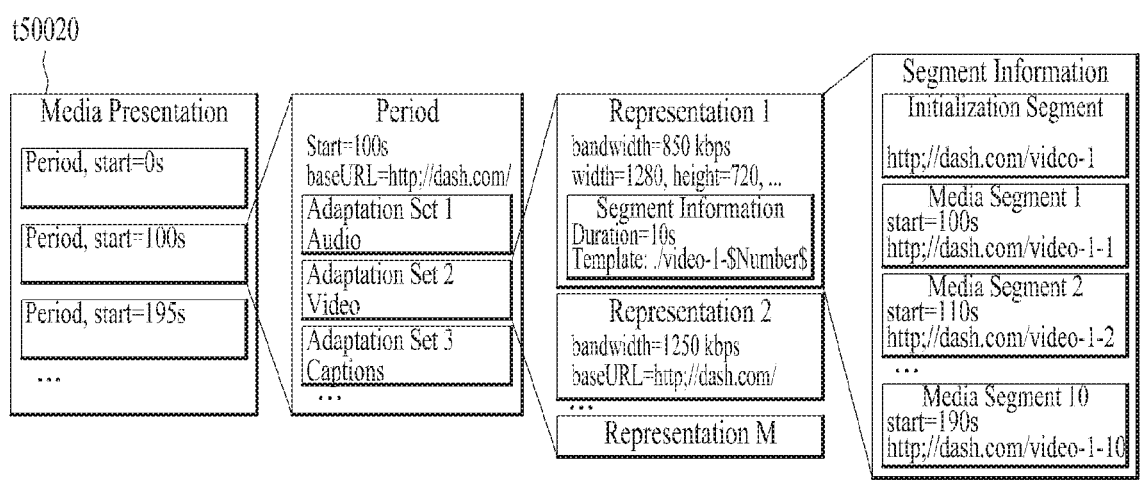

FIG. 12

(a)
```
class 2DReagionCartesianCoordinatesSampleEntry extends MetadataSampleEntry ('2drc') {
    unsigned int(16) reference_width;
    unsigned int(16) reference_height;
    unsigned int(16) min_top_left_x;
    unsigned int(16) max_top_left_x;
    unsigned int(16) min_top_left_y;
    unsigned int(16) max_top_left_y;
    unsigned int(16) min_width;
    unsigned int(16) max_width;
    unsigned int(16) min_height;
    unsigned int(16) max_height;
}
```

(b)
```
class 2DRegionCartesianCoordinatesSample(){
    unsigned int(16) top_left_x;
    unsigned int(16) top_left_y;
    unsigned int(16) width;
    unsigned int(16) height;
    unsigned int(1) interpolate;
    unsigned int(7) reserved;
}
```

FIG. 13

(a)
```
class 2DPointCartesianCoordinatesSampleEntry extends MetadataSampleEntry ('2dpc') {
    unsigned int(16) reference_width;
    unsigned int(16) reference_height;
    unsigned int(16) min_x;
    unsigned int(16) max_x;
    unsigned int(16) min_y;
    unsigned int(16) max_y;
}
```

(b)
```
class 2DPointCartesianCoordinatesSample(){
    unsigned int(16) x;
    unsigned int(16) y;
    unsigned int(1) interpolate;
    unsigned int(7) reserved;
}
```

FIG. 14

(a)
```
class 3DCartesianCoordinatesSampleEntry extends MetadataSampleEntry ('3dcc') {
    unsigned int(16) min_yaw;
    unsigned int(16) max_yaw;
    unsigned int(16) min_pitch;
    unsigned int(16) max_pitch;
    unsigned int(16) min_roll;
    unsigned int(16) max_roll;
    unsigned int(16) min_field_of_view;
    unsigned int(16) max_field_of_view;
}
```

(b)
```
class 3DCartesianCoordinatesSampleEntry extends MetadataSampleEntry ('3dcc') {
    unsigned int(16) center_yaw;
    unsigned int(16) center_pitch;
    unsigned int(16) center_roll;
    unsigned int(16) horizontal_field_of_view;
    unsigned int(16) vertical_field_of_view;
}
```

FIG. 15

(a)
```
class 3DRegionCartesianCoordinatesSample(){
    unsigned int(16) yaw;
    unsigned int(16) pitch;
    unsigned int(16) roll;
    unsigned int(16) field_of_view;
    unsigned int(1) interpolate;
    unsigned int(7) reserved;
}
```

(b)
```
class 3DPointCartesianCoordinatesSample(){
    unsigned int(16) yaw;
    unsigned int(16) pitch;
    unsigned int(16) roll;
    unsigned int(1) interpolate;
    unsigned int(7) reserved;
}
```

FIG. 16

```
aligned(8) class TrackReferenceBox extends Box('tref') {
}
aligned(8) class TrackReferenceTypeBox (unsigned int(32) reference_type) extends Box(reference_type) {
            unsigned int(32) track_IDs[];
}
```

FIG. 17

(a)
```
class GPSSampleEntry extends MetadataSampleEntry ('gpsm') {
    string              coordinate_reference_sys;
    unsigned int(1)     altitude_flag;
    unsigned int(7)     reserved=0;
}
```

(b)
```
class GPSSample(){
    signed int(32) longitude;
    signed int(32) latitude;
    signed int(32) altitude;
}
```

(c)
```
class GPSSample(){
    signed int(32) longitude;
    signed int(32) latitude;
}
```

FIG. 18

```xml
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">

<Period>
        <!-- 360 degree VR video -->
        <AdaptationSet ...>
            <Role schemeIdUri="urn:mpeg:dash:role:2011" value="main"/>                    ───H18010
            <Representation id="VR_video" mimeType="video/mp4" width="3840" height="1920" ...>
                <BaseURL>VR_video.mp4</BaseURL>
            </Representation>
        </AdaptationSet>

<!-- director's cut -->
        <AdaptationSet ...>
            <Role schemeIdUri="urn:mpeg:dash:role:201x" value="dirc"/>                    ───H18020
            <Representation id="directors_cut" associationId="VR_video" associationType="dirc"...>
                <BaseURL>directors_cut.mp4</BaseURL>                                      ───H18030
            </Representation>
        </AdaptationSet>

</Period>
</MPD>
```

FIG. 19

```xml
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">

<Period>
        <!-- 360 degree VR video -->
        <AdaptationSet segmentAlignment="true" subsegmentAlignment="true" subsegmentStartsWithSAP="1">
            <Role schemeIdUri="urn:mpeg:dash:role:2011" value="main"/>          ———— H19010
            <Representation id="VR_video" mimeType="video/mp4" width="3840" height="1920" ...>
                <BaseURL>VR_video.mp4</BaseURL>
            </Representation>
        </AdaptationSet>

<!-- director's cut -->
        <AdaptationSet segmentAlignment="true" subsegmentAlignment="true" subsegmentStartsWithSAP="1">
            <Role schemeIdUri="urn:mpeg:dash:role:2011" value="metadata"/>      ———— H19020
            <Representation id="directors_cut" associationId="VR_video" associationType="dirc" ...>
                <BaseURL>directors_cut.mp4</BaseURL>                             ———— H19030
            </Representation>
        </AdaptationSet>

</Period>
</MPD>
```

FIG. 21

```xml
<?xml version="1.0" encoding="UTF-8"?>
<MPD
   xmlns="urn:mpeg:dash:schema:mpd:2011"
   type="static"
   mediaPresentationDuration="PT10S"
   minBufferTime="PT1S"
   profiles="urn:mpeg:dash:profile:isoff-on-demand:2011">

<Period>
      <!- 360 degree VR video (1920x1920 video next to each other)-->
      <AdaptationSet ...>
         <SupplementalProperty schemeIdUri="urn:mpeg:dash:srd:2014"          ──────── H21010
          value="1, 0, 0, 1920, 1920, 3840, 1920, 0"/>
         <Representation id="VR_video" mimeType="video/mp4" width="1920" height="1080" ...>
            <BaseURL>VR_video_tile1.mp4</BaseURL>
         </Representation>
      </AdaptationSet>

<AdaptationSet ...>
         <SupplementalProperty schemeIdUri="urn:mpeg:dash:srd:2014"          ──────── H21020
          value="1, 0, 1920, 1920, 1920, 3840, 1920, 0"/>
         <Representation id="VR_video" mimeType="video/mp4" width="1920" height="1080" ...>
            <BaseURL>VR_video_tile2.mp4</BaseURL>
         </Representation>
      </AdaptationSet>

<!- director's cut -->
      <AdaptationSet ...>
         <Role schemeIdUri="urn:mpeg:dash:role:201x" value="dirc"/>           ──────── H21030
         <Representation id="directors_cut" associationId="VR_video_tile1 VR_video_tile2"
 associationType="dirc"...>
                                                                             ──────── H21040
            <BaseURL>directors_cut.mp4</BaseURL>
         </Representation>
      </AdaptationSet>

</Period>
</MPD>
```

FIG. 22

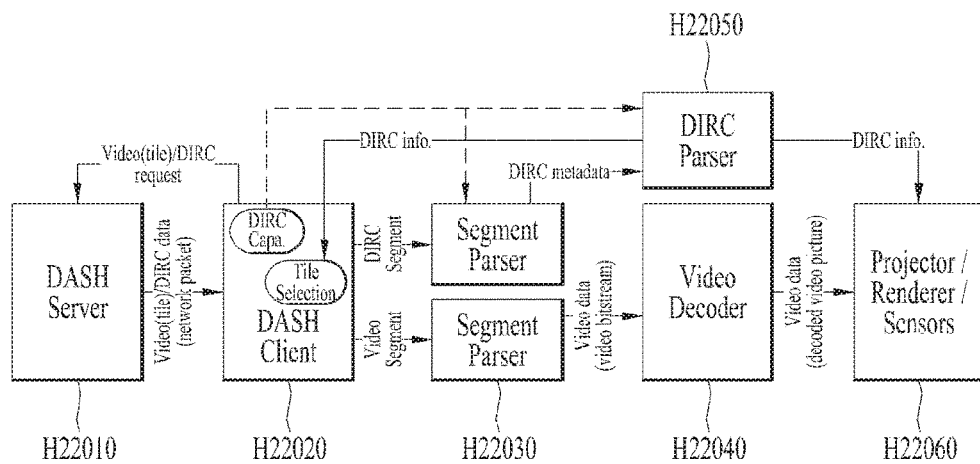

FIG. 23

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">

<Period>
        <!-- 360 degree VR video & director's cut -->
        <AdaptationSet ...>
            <ContentComponent contentType="video" .../>                         — H23010
                <Role schemeIdUri="urn:mpeg:dash:role:2011" value="main"/>       — H23030
            <ContentComponent contentType="application" .../>                   — H23020
                <Role schemeIdUri="urn:mpeg:dash:role:201x" value="dirc"/>      — H23040
            <Representation id="VR_video" mimeType="video/mp4" width="1920" height="1080" ...>
                <BaseURL>VR_video.mp4</BaseURL>
            </Representation>
        </AdaptationSet>
    </Period>
</MPD>
```

FIG. 24

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">

<Period>
        <!-- 360 degree VR video & director's cut -->
        <AdaptationSet ...>
            <Role schemeIdUri="urn:mpeg:dash:role:2011" value="main"/>         ── H24010
            <Role schemeIdUri="urn:mpeg:dash:role:201x" value="dirc"/>         ── H24020
            <Representation id="VR_video" mimeType="video/mp4" width="1920" height="1080" ...>
                <BaseURL>VR_video.mp4</BaseURL>
            </Representation>
        </AdaptationSet>
    </Period>
</MPD>
```

FIG. 25

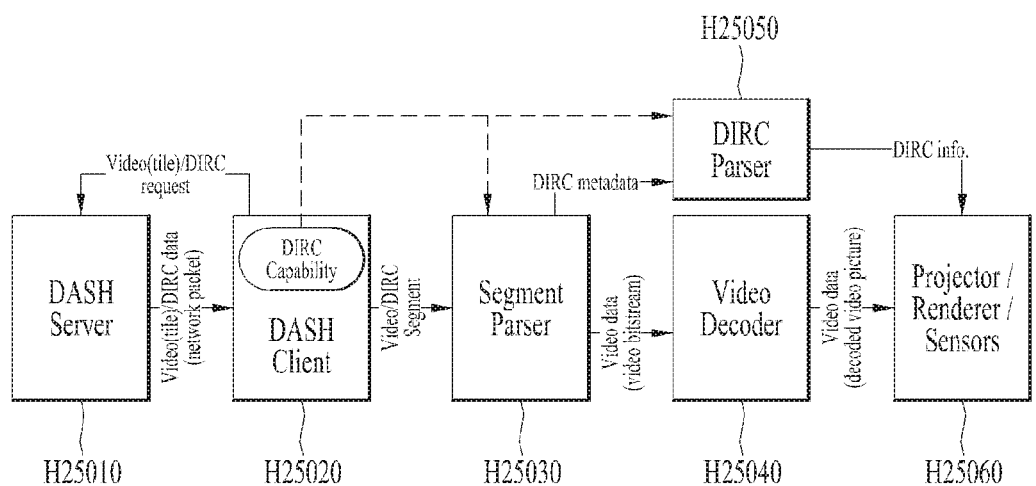

FIG. 26

| stream_id | Note | stream coding |
|---|---|---|
| 1011 1100 | 1 | program_stream_map |
| 1011 1101 | 2, 9, 10, 11 | private_stream_1 |
| 1011 1110 | | padding_stream |
| 1011 1111 | 3 | private_stream_2 |
| 110x xxxx | | ISO/IEC 13818-3 or ISO/IEC 11172-3 or ISO/IEC 13818-7 or ISO/IEC 14496-3 audio stream number x xxxx |
| 1110 xxxx | | ITU-T Rec. H.262 | ISO/IEC 13818-2 or ISO/IEC 11172-2 or ISO/IEC 14496-2 or ITU-T Rec.H.264 | ISO/IEC 14496-10 video stream number xxxx |
| 1111 0000 | 3 | ECM_stream |
| 1111 0001 | 3 | EMM_stream |
| 1111 0010 | 5 | ITU-T Rec. H.222.0 | ISO/IEC 13818-1 Annex A or ISO/IEC 13818-6_DSMCC_stream |
| 1111 0011 | 2 | ISO/IEC_13522_stream |
| 1111 0100 | 6 | ITU-T Rec. H.222.1 type A |
| 1111 0101 | 6 | ITU-T Rec. H.222.1 type B |
| 1111 0110 | 6 | ITU-T Rec. H.222.1 type C |
| 1111 0111 | 6 | ITU-T Rec. H.222.1 type D |
| 1111 1000 | 6 | ITU-T Rec. H.222.1 type E |
| 1111 1001 | 7 | ancillary_stream |
| 1111 1010 | | ISO/IEC14496-1_SL-packetized_stream |
| 1111 1011 | | ISO/IEC14496-1_FlexMux_stream |
| 1111 1100 | | metadata stream |
| 1111 1101 | 8 | extended_stream_id |
| 1111 1110 | | reserved data stream |
| 1111 1111 | 4 | program_stream_directory |

The notation x means that the values '0' or '1' are both permitted and results in the same stream type. The stream number is given by the values taken by the x's.
NOTE 1 – PES packets of type program_stream_map have unique syntax specified in 2.5.4.1.
NOTE 2 – PES packets of type private_stream_1 and ISO/IEC_13552_stream follow the same PES packet syntax as those for ITU-T Rec. H.262 | ISO/IEC 13818-2 video and ISO/IEC 13818-3 audio streams.
NOTE 3 – PES packets of type private_stream_2, ECM_stream and EMM_stream are similar to private_stream_1 except no syntax is specified after PES_packet_length field.
NOTE 4 – PES packets of type program_stream_directory have a unique syntax specified in 2.5.5.
NOTE 5 – PES packets of type DSM-CC_stream have a unique syntax specified in ISO/IEC 13818-6.
NOTE 6 – This stream_id is associated with stream_type 0x09 in Table 2-29.
NOTE 7 – This stream_id is only used in PES packets, which carry data from a Program Stream or an ISO/IEC 11172-1 System Stream, in a Transport Stream (refer to 2.4.3.8).
NOTE 8 – The use of stream_id 0xFD (extended_stream_id) identifies that this PES packet employs an extended syntax to permit additional stream types to be identified..
NOTE 9 – JPEG 2000 video streams (stream_type = 0x21) are carried using the same PES packet syntax as private_stream_1.
NOTE 10 – Timeline and External Media Information streams (stream_type = 0x26) are carried using the same PES packet syntax as private_stream_1.
NOTE 11 – VR Director's Cut Information streams (stream_type = 0x27) are carried using the same PES packet syntax as private_stream_1.

FIG. 27

| value | description |
|---|---|
| ... | ... |
| 0x26 | Timeline and External Media Information Stream (See Annex T) |
| 0x27 | VR Director's Cut Information Stream |
| 0x28-0x7E | ITU-T Rec. H.222.0 | ISO/IEC 13818-1 Reserved |
| ... | ... |

FIG. 28

| Syntax | Nb bits | Mnemonic |
|---|---|---|
| VDCI_AU { | | |
|     CRC_flag | 1 | |
|     reserved | 7 | |
|     for (i=0; i<N; i++) { | | |
|         vdci_descriptor(); | | |
|     } | | |
|     if (CRC_flag) { | | |
|         CRC_32 | 32 | uimsbf |
|     } | | |
| } | | |

FIG. 29

| Syntax | No. of bits | Mnemonic |
|---|---|---|
| adaptation_field() { | | |
|     adaptation_field_length | 8 | uimsbf |
|     if (adaptation_field_length > 0) { | | |
|         discontinuity_indicator | 1 | bslbf |
|         random_access_indicator | 1 | bslbf |
|         elementary_stream_priority_indicator | 1 | bslbf |
|         PCR_flag | 1 | bslbf |
|         OPCR_flag | 1 | bslbf |
|         splicing_point_flag | 1 | bslbf |
|         transport_private_data_flag | 1 | bslbf |
|         adaptation_field_extension_flag | 1 | bslbf |
|         if (PCR_flag == '1') { | | |
|             program_clock_reference_base | 33 | uimsbf |
|             reserved | 6 | bslbf |
|             program_clock_reference_extension | 9 | uimsbf |
|         } | | |
|         if (OPCR_flag == '1') { | | |
|             original_program_clock_reference_base | 33 | uimsbf |
|             reserved | 6 | bslbf |
|             original_program_clock_reference_extension | 9 | uimsbf |
|         } | | |
|         if (splicing_point_flag == '1') { | | |
|             splice_countdown | 8 | tcimsbf |
|         } | | |
|         if (transport_private_data_flag == '1') { | | |
|             transport_private_data_length | 8 | uimsbf |
|             for (i = 0; i < transport_private_data_length; i++) { | | |
|                 private_data_byte | 8 | bslbf |
|             } | | |
|         } | | |
|         if (adaptation_field_extension_flag == '1') { | | |
|             adaptation_field_extension_length | 8 | uimsbf |
|             ltw_flag | 1 | bslbf |
|             piecewise_rate_flag | 1 | bslbf |
|             seamless_splice_flag | 1 | bslbf |
|             af_descriptor_not_present_flag | 1 | bslbf |
|             vedi_descriptor_not_present_flag | 1 | bslbf |
|             reserved | 3 | bslbf |
|             if (ltw_flag == '1') { | | |
|                 ltw_valid_flag | 1 | bslbf |
|                 ltw_offset | 15 | uimsbf |
|             } | | |
|             if (piecewise_rate_flag == '1') { | | |
|                 reserved | 2 | bslbf |
|                 piecewise_rate | 22 | uimsbf |
|             } | | |
|             if (seamless_splice_flag == '1') { | | |
|                 splice_type | 4 | bslbf |
|                 DTS_next_AU[32..30] | 3 | bslbf |
|                 marker_bit | 1 | bslbf |
|                 DTS_next_AU[29..15] | 15 | bslbf |
|                 marker_bit | 1 | bslbf |
|                 DTS_next_AU[14..0] | 15 | bslbf |
|                 marker_bit | 1 | bslbf |
|             } | | |
|             if (af_descriptor_not_present_flag == '0') { | | |
|                 for (i = 0; i < N; i++) { | | |
|                     af_descriptor() | 8 | bslbf |
|                 } | | |
|             } | | |
|             if (vedi_descriptor_not_present_flag == '0') { | | |
|                 for (i = 0; i < N; i++) { | | |
|                     vedi_descriptor() | 8 | bslbf |
|                 } | | |
|             } | | |
|             for (i = 0; i < N; i--) { | | |
|                 reserved | 8 | bslbf |
|             } | | |
|         } | | |
|         for (i = 0; i < N; i++) { | | |
|             stuffing_byte | 8 | bslbf |
|         } | | |
|     } | | |
| } | | |

FIG. 30

| Syntax | No. of bits | Mnemonic |
|---|---|---|
| Extension_descriptor () { <br>    descriptor_tag <br>    descriptor_length <br>    extension_descriptor_tag <br>    if ( extension_descriptor_tag == 0x02) { <br>    ObjectDescriptorUpdate() <br>    } <br>    else if ( extension_descriptor_tag == 0x03) { <br>    HEVC_timing_and_HRD_descriptor() <br>    } <br>    else if ( extension_descriptor_tag == 0x04) { <br>    af_extensions_descriptor () <br>    } <br>    else if ( extension_descriptor_tag == 0x05) { <br>    vdci_extensions_descriptor () <br>    } <br>    else { <br>        for ( i=0; i<N; i++ ) { <br>            reserved <br>        } <br>    } <br>} | 8 <br> 8 <br> 8 <br><br><br><br><br><br><br><br><br><br><br><br><br><br><br><br> 8 | uimsbf <br> uimsbf <br> uimsbf <br><br><br><br><br><br><br><br><br><br><br><br><br><br><br><br> bslbf |

FIG. 31

| Extension_descriptor_tag | TS | PS | Identification |
|---|---|---|---|
| 0 | n/a | n/a | Reserved |
| 1 | n/a | X | Forbidden |
| 2 | X | X | ODUpdate_descriptor |
| 3 | X | n/a | HEVC_timing_and_HRD_descriptor() |
| 4 | X | n/a | af_extensions_descriptor() |
| 5 | X | n/a | vdci_extensions_descriptor() |
| 6-255 | n/a | n/a | Rec. ITU-T H.222.0 | ISO/IEC 13818-1 Reserved |

FIG. 32

| Syntax | No. Of bits | Mnemonic |
|---|---|---|
| vdci_extensions_descriptor() {<br>  vcdi_descriptor_type<br>} | 8 | uimsbf |

FIG. 33

| Syntax | Nb bits | Mnemonic |
|---|---|---|
| 2d_vdci_descriptor { | | |
|   2d_vdci_descr_tag | 8 | uimsbf |
|   2d_vdci_descr_length | 8 | uimsbf |
| | | |
|   reference_region_flag | 1 | |
|   duration_flag | 1 | |
|   next_vcdi_flag | 1 | uimsbf |
|   reserved | 5 | uimsbf |
| | | |
|   if (reference_region_flag) { | 16 | |
|     reference_width | 16 | uimsbf |
|     reference_height | | uimsbf |
|   } | | uimsbf |
| | 16 | uimsbf |
|   top_left_x | 16 | uimsbf |
|   top_left_y | 16 | uimsbf |
|   width | 16 | uimsbf |
|   height | 1 | uimsbf |
|   interpolate | 7 | uimsbf |
|   reserved | 16 | |
|   if (duration_flag) { | 16 | |
|     duration | 16 | |
|   } | 16 | |
| | 16 | |
|   if (next_vcdi_flag) { | 1 | |
|     next_top_left_x | 7 | |
|     next_top_left_y | | |
|     next_width | | |
|     next_height | | |
|     next_interpolate | | |
|     reserved | | |
|   } | | |
| } | | |

FIG. 34

| Syntax | Nb bits | Mnemonic |
|---|---|---|
| spherical_vdci_descriptor { | | |
|   spherical_vdci_descr_tag | 8 | uimsbf |
|   spherical_vdci_descr_length | 8 | uimsbf |
| | | |
|   reference_region_flag | 1 | |
|   duration_flag | 1 | |
|   next_vcdi_flag | 1 | uimsbf |
|   reserved | 5 | uimsbf |
|   if (reference_region_flag) { | | uimsbf |
|     reference_min_yaw | 16 | uimsbf |
|     reference_max_yaw | 16 | uimsbf |
|     reference_min_pitch | 16 | uimsbf |
|     reference_max_pitch | 16 | uimsbf |
|   } | | uimsbf |
| | 16 | uimsbf |
|   yaw | 16 | uimsbf |
|   pitch | 16 | uimsbf |
|   roll | 16 | uimsbf |
|   field_of_view | 1 | uimsbf |
|   interpolate | 7 | |
|   reserved | 16 | |
|   if (duration_flag) { | 16 | |
|     duration | 16 | |
|   } | 16 | |
|   if (next_vcdi_flag) { | 16 | |
|     next_yaw | 1 | |
|     next_pitch | 7 | |
|     next_roll | | |
|     next_field_of_view | | |
|     next_interpolate | | |
|     reserved | | |
|   } | | |
| } | | |

FIG. 36

| vr_2d_directors_cut( payloadSize ) { | Descriptor |
|---|---|
|     dirctors_cut_id | ue(v) |
|     reference_region_flag | u(1) |
|     duration_flag | u(1) |
|     next_vdci_flag | u(1) |
|     if(reference_region_flag) { | |
|         reference_width | u(16) |
|         reference_height | u(16) |
|     } | |
|     top_left_x | u(16) |
|     top_left_y | u(16) |
|     width | u(16) |
|     height | u(16) |
|     interpolate | u(1) |
|     if(duration_flag) { | |
|         duration | u(16) |
|     } | |
|     if(next_vdci_flag) { | |
|         next_top_left_x | u(16) |
|         next_top_left_y | u(16) |
|         next_width | u(16) |
|         next_height | u(16) |
|         next_interpolate | u(1) |
|     } | |
| } | |

| vr_spherical_directors_cut( payloadSize ) { | Descriptor |
|---|---|
|     dirctors_cut_id | ue(v) |
|     reference_region_flag | u(1) |
|     duration_flag | u(1) |
|     next_vdci_flag | u(1) |
|     if(reference_region_flag) { | |
|         reference_min_yaw | u(16) |
|         reference_max_yaw | u(16) |
|         reference_min_pitch | u(16) |
|         reference_max_pitch | u(16) |
|     } | |
|     yaw | u(16) |
|     pitch | u(16) |
|     roll | u(16) |
|     field_of_view | u(16) |
|     interpolate | u(1) |
|     if(duration_flag) { | |
|         duration | u(16) |
|     } | |
|     if(next_vdci_flag) { | |
|         next_yaw | u(16) |
|         next_pitch | u(16) |
|         next_roll | u(16) |
|         next_field_of_view | u(16) |
|         next_interpolate | u(1) |
|     } | |
| } | |

METHOD OF TRANSMITTING OMNIDIRECTIONAL VIDEO, METHOD OF RECEIVING OMNIDIRECTIONAL VIDEO, DEVICE FOR TRANSMITTING OMNIDIRECTIONAL VIDEO, AND DEVICE FOR RECEIVING OMNIDIRECTIONAL VIDEO

CROSS-REFERENCE TO RELATED APPLICATIONS

This application claims the benefit of U.S. Provisional Patent Application No. 62/379,740, filed on Aug. 25, 2016, which is hereby incorporated by reference as if fully set forth herein.

BACKGROUND OF THE INVENTION

Field of the Invention

The present invention relates to methods and devices for transmitting and receiving omnidirectional media, and more particularly, to methods and devices for transmitting and receiving omnidirectional video and metadata related to the omnidirectional video.

Discussion of the Related Art

As analog broadcast signal transmission is terminated, various technologies for transmitting and receiving a digital broadcast signal have been developed. A digital broadcast signal is capable of containing a larger amount of video/audio data than an analog broadcast signal and further containing various types of additional data as well as video/audio data.

A virtual reality (VR) system provides, to a user, the experience of being in an electronically projected environment. The VR system can be enhanced in order to provide images with higher definition and spatial sounds. The VR system can allow a user to interactively use VR content.

SUMMARY OF THE INVENTION

The VR system needs to be enhanced in order to more efficiently provide VR environments to users. To this end, it is necessary to provide data transmission efficiency for transmission of a large amount of data such as VR content, robustness between transmission and reception networks, network flexibility considering a mobile receiver, efficient reproduction and a signaling method, etc.

The present invention proposes methods for effectively providing omnidirectional video services by defining and delivering metadata about attributes of omnidirectional video when omnidirectional video content is provided.

The specification discloses methods of defining, storing and signaling metadata related to omnidirectional video such that a user can view a view (point) or a region intended by a producer in reproduction of the omnidirectional video. Specific methods are as follows.

A method of defining, storing and signaling metadata about region information in a 2D space is disclosed.

A method of defining, storing and signaling metadata about viewpoint (point) information in a 2D space is disclosed.

A method of defining, storing and signaling metadata about region information in a 3D space is disclosed.

A method of defining, storing and signaling metadata about viewpoint (point) information in a 3D space is disclosed.

A method of signaling a relationship between a metadata track regarding region information or viewpoint (point) information and an omnidirectional video track is disclosed.

A method of transmitting and signaling metadata using DASH is disclosed.

A method of transmitting and signaling metadata using MPEG-2 TS is disclosed.

A method of transmitting and signaling metadata using a video coding layer (VCL) is disclosed.

The specification discloses methods of defining, storing and signaling metadata about GPS information related to video in reproduction of omnidirectional video. Specific methods are as follows.

A method of defining, storing and signaling metadata about GPS related information is disclosed.

A method of signaling a relationship between a metadata track regarding GPS related information and an omnidirectional video track.

The present invention can efficiently transmit omnidirectional content in an environment supporting future hybrid broadcast using terrestrial broadcast networks and the Internet.

The present invention can propose methods for providing interactive experience in omnidirectional content consumption of users.

The present invention can propose signaling methods for correctly reflecting intention of omnidirectional content producers in omnidirectional content consumption of users.

The present invention can propose methods of efficiently increasing transmission capacity and delivering necessary information in omnidirectional content delivery.

The present invention can propose methods for effectively providing omnidirectional video services by defining and delivering metadata about attributes of 360-degree video when omnidirectional video content is provided.

BRIEF DESCRIPTION OF THE DRAWINGS

FIG. 7 illustrates tiles according to one embodiment of the present invention.

FIG. 8 illustrates 360-degree video related metadata according to one embodiment of the present invention.

FIG. 11 illustrates overall operation of a DASH based adaptive streaming model according to one embodiment of the present invention.

FIG. 12 illustrates metadata about region information in a 2D space according to one embodiment of the present invention.

FIG. 13 illustrates metadata about viewpoint (point) information in a 2D space according to one embodiment of the present invention.

FIG. 14 illustrates metadata about region information in a 3D space according to one embodiment of the present invention.

FIG. 15 illustrates metadata about an individual region to be represented in a 3D space according to various embodiments of the present invention.

FIG. 16 illustrates a tref box according to one embodiment of the present invention.

FIG. 17 illustrates metadata about a GPS according to one embodiment of the present invention.

FIG. 18 illustrates an MPD signaling transmission of metadata about region information or viewpoint information according to one embodiment of the present invention.

FIG. 19 illustrates an MPD signaling transmission of metadata about region information or viewpoint information according to another embodiment of the present invention.

FIG. 21 illustrates an MPD signaling transmission of metadata about region information or viewpoint information according to another embodiment of the present invention.

FIG. 22 is a block diagram of a receiver according to another embodiment of the present invention.

FIG. 23 illustrates an MPD signaling transmission of metadata about region information or viewpoint information according to another embodiment of the present invention.

FIG. 24 illustrates an MPD signaling transmission of metadata about region information or viewpoint information according to another embodiment of the present invention.

FIG. 25 is a block diagram of a receiver according to another embodiment of the present invention.

FIG. 26 illustrates a stream identifier and information on a stream allocated to the stream identifier.

FIG. 27 illustrates a stream type and part of information on a stream allocated to the stream type.

FIG. 28 illustrates an access unit transmitted through a PES packet.

FIG. 29 illustrates an adaptation field according to one embodiment of the present invention.

FIG. 30 illustrates an extension descriptor according to one embodiment of the present invention.

FIG. 31 illustrates values of an extension descriptor tag included in the extension descriptor and description of the values.

FIG. 32 illustrates a vdci extension descriptor according to one embodiment of the present invention.

FIG. 33 illustrates a 2D vdci descriptor according to one embodiment of the present invention.

FIG. 34 illustrates a spherical vcdi descriptor according to one embodiment of the present invention.

FIG. 36 illustrates metadata about region information or viewpoint information, which is included in an SEI message, according to one embodiment of the present invention.

DETAILED DESCRIPTION OF THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

Figure 1:
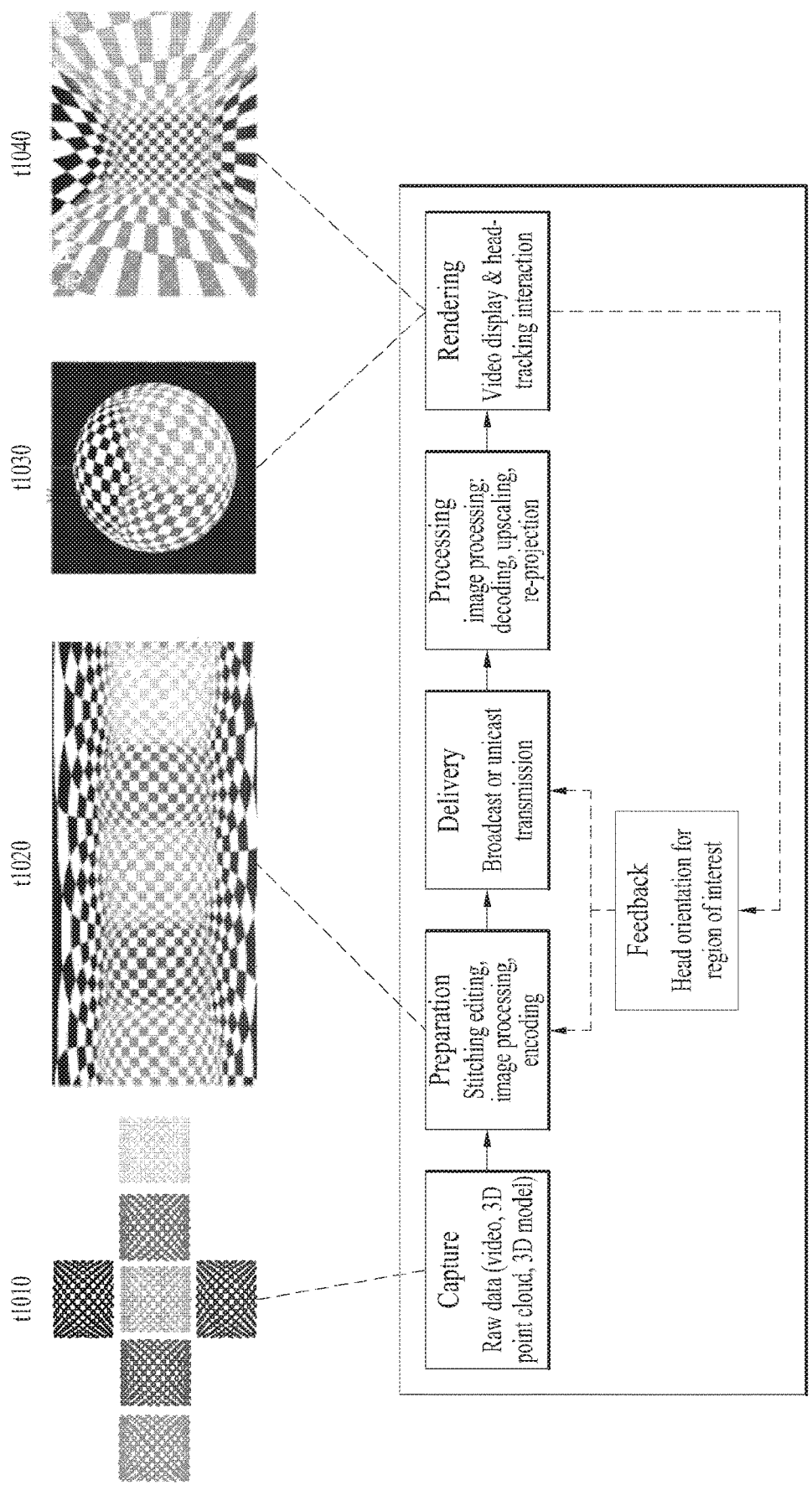
FIG. 1 illustrates an architecture for providing 360-degree video according to the present invention.

FIG. 1 illustrates an architecture for providing 360-degree video according to the present invention.

The present invention proposes a method for providing 360-degree content or omnidirectional media in order to provide VR (Virtual Reality) to users. VR refers to a technique or an environment for replicating an actual or virtual environment. VR artificially provides sensuous experiences to users and thus users can experience electronically projected environments.

360-degree content refers to convent for realizing and providing VR and may include 360-degree video and/or 360-degree audio. 360-degree video may refer to video or image content which is necessary to provide VR and is captured or reproduced in all directions (360 degrees). 360-degree video may refer to video or an image represented on 3D spaces in various forms according to 3D models. For example, 360 video can be represented on a spherical plane. 360 audio is audio content for providing VR and may refer to spatial audio content which can be recognized as content having an audio generation source located on a specific space. 360 content may be generated, processed and transmitted to users, and users may consume VR experiences using the 360 content. Hereinafter, 360 content/video/image/audio may be represented as 360 content/video/image/audio without a unit (degree) or VR content/video/image/audio. Further, 360 content/video/image/audio may be used interchangeably with omnidirectional content/video/image/audio.

The present invention proposes a method for effectively providing 360 degree video. To provide 360 video, first, 360 video may be captured using one or more cameras. The captured 360 video is transmitted through a series of processes, and a receiving side may process received data into the original 360 video and render the 360 video. Accordingly, the 360 video can be provided to a user.

Specifically, a procedure for providing 360 video may include a capture process, a preparation process, a transmission process, a processing process, a rendering process and/or a feedback process.

The capture process may refer to a process of capturing images or videos for a plurality of viewpoints through one or more cameras. An image/video data t1010 shown in the figure can be generated through the capture process. Each plane of the shown image/video data t1010 may refer to an image/video for each viewpoint. The captured images/videos may be called raw data. In the capture process, metadata related to capture may be generated.

For capture, a special camera for VR may be used. When 360 video for a virtual space generated using a computer is provided according to an embodiment, capture using a camera may not be performed. In this case, the capture process may be replaced by a process of simply generating related data.

The preparation process may be a process of processing the captured images/videos and metadata generated in the capture process. The captured images/videos may be subjected to stitching, projection, region-wise packing and/or encoding in the preparation process.

First, the images/videos may pass through a stitching process. The stitching process may be a process of connecting the captured images/videos to create a single panorama image/video or a spherical image/video.

Then, the stitched images/videos may pass through a projection process. In the projection process, the stitched images/videos can be projected on a 2D image. This 2D image may be called a 2D image frame. Projection on a 2D image may be represented as mapping to the 2D image. The projected image/video data can have a form of a 2D image t1020 as shown in the figure.

The video data projected on the 2D image can pass through a region-wise packing process in order to increase video coding efficiency. Region-wise packing may refer to a process of dividing the video data projected on the 2D image into regions and processing the regions. Here, regions may refer to regions obtained by dividing a 2D image on which 360 video data is projected. Such regions may be obtained by dividing the 2D image equally or randomly according to an embodiment. Regions may be divided depending on a projection scheme according to an embodiment. The region-wise packing process is an optional process and thus may be omitted in the preparation process.

According to an embodiment, this process may include a process of rotating the regions or rearranging the regions on the 2D image in order to increase video coding efficiency. For example, the regions can be rotated such that specific sides of regions are positioned in proximity to each other to increase coding efficiency.

According to an embodiment, this process may include a process of increasing or decreasing the resolution of a specific region in order to differentiate the resolution for regions of the 360 video. For example, the resolution of regions corresponding to a relatively important part of the 360 video can be increased to higher than other regions. The video data projected on the 2D image or the region-wise packed video data can pass through an encoding process using a video codec.

According to an embodiment, the preparation process may additionally include an editing process. In the editing process, the image/video data before or after projection may be edited. In the preparation process, metadata with respect to stitching/projection/encoding/editing may be generated.

In addition, metadata with respect to the initial viewpoint or ROI (region of interest) of the video data projected on the 2D image may be generated.

The transmission process may be a process of processing and transmitting the image/video data and metadata which have passed through the preparation process. For transmission, processing according to an arbitrary transmission protocol may be performed. The data that has been processed for transmission may be delivered over a broadcast network and/or broadband. The data may be delivered to a receiving side in an on-demand manner. The receiving side may receive the data through various paths.

The processing process refers to a process of decoding the received data and re-projecting the projected image/video data on a 3D model. In this process, the image/video data projected on the 2D image may be re-projected on a 3D space. This process may be called mapping projection. Here, the 3D space on which the data is mapped may have a form depending on a 3D model. For example, 3D models may include a sphere, a cube, a cylinder and a pyramid.

According to an embodiment, the processing process may further include an editing process, an up-scaling process, etc. In the editing process, the image/video data before or after re-projection can be edited. When the image/video data has been reduced, the size of the image/video data can be increased through up-scaling of samples in the up-scaling process. As necessary, the size may be decreased through down-scaling.

The rendering process may refer to a process of rendering and displaying the image/video data re-projected on the 3D space. Re-projection and rendering may be collectively represented as rendering on a 3D model. The image/video re-projected (or rendered) on the 3D model may have a form t1030 as shown in the figure. The form t1030 corresponds to a case in which the image/video data is re-projected on a spherical 3D model. A user can view a region of the rendered image/video through a VR display or the like. Here, the region viewed by the user may have a form t1040 shown in the figure.

The feedback process may refer to a process of delivering various types of feedback information which can be acquired in the display process to a transmission side. Through the feedback process, interactivity in 360 video consumption can be provided. According to an embodiment, head orientation information, viewport information indicating a region currently viewed by a user, etc. can be delivered to the transmission side in the feedback process. According to an embodiment, the user may interact with content realized in a VR environment. In this case, information related to the interaction may be delivered to the transmission side or a service provider in the feedback process. According to an embodiment, the feedback process may not be performed.

The head orientation information may refer to information about the position, angle and motion of a user's head. On the basis of this information, information about a region of 360 video currently viewed by the user, that is, viewport information can be calculated.

The viewport information may be information about a region of 360 video currently viewed by a user. Gaze analysis may be performed using the viewport information to check a manner in which the user consumes 360 video, a region of the 360 video at which the user gazes, and how long the user gazes at the region. Gaze analysis may be performed by the receiving side and the analysis result may be delivered to the transmission side through a feedback channel. A device such as a VR display may extract a viewport region on the basis of the position/direction of a user's head, vertical or horizontal FOV supported by the device, etc.

According to an embodiment, the aforementioned feedback information may be consumed at the receiving side as well as being delivered to the transmission side. That is, decoding, re-projection and rendering processes of the receiving side can be performed using the aforementioned feedback information. For example, only 360 video corresponding to the region currently viewed by the user can be preferentially decoded and rendered using the head orientation information and/or the viewport information.

Here, a viewport or a viewport region can refer to a region of 360 video currently viewed by a user. A viewpoint is a point in 360 video which is viewed by the user and may refer to a center point of a viewport region. That is, a viewport is a region based on a viewpoint, and the size and form of the region can be determined by FOV (field of view) which will be described below.

In the above-described architecture for providing 360 video, image/video data which is subjected to a series of capture/projection/encoding/transmission/decoding/re-projection/rendering processes can be called 360 video data. The term "360 video data" may be used as the concept including metadata or signaling information related to such image/video data.

Figure 2:
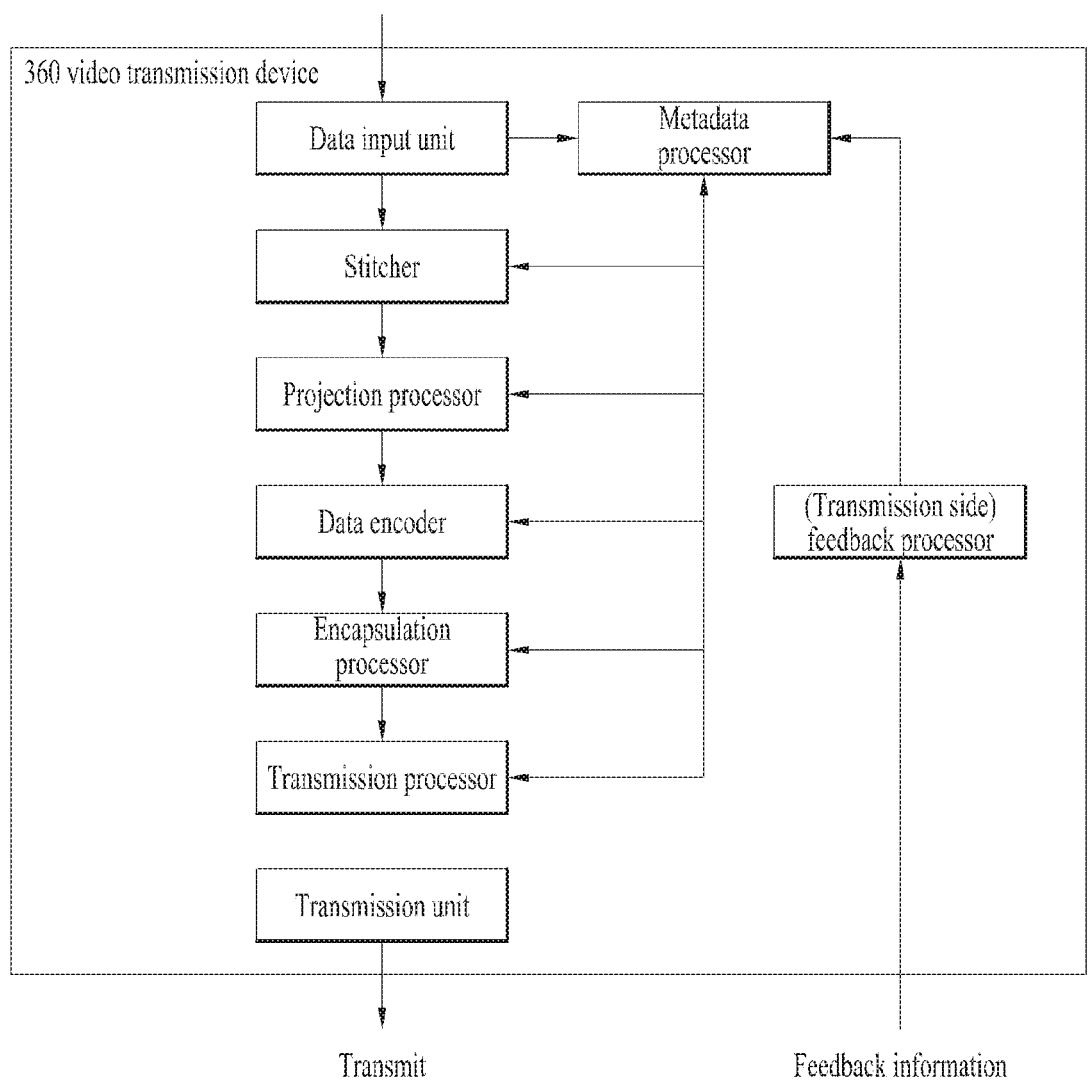
FIG. 2 illustrates a 360-degree video transmission device according to one aspect of the present invention.

FIG. 2 illustrates a 360 video transmission device according to one aspect of the present invention.

According to one aspect, the present invention may relate to a 360 video transmission device. The 360 video transmission device according to the present invention may perform operations related to the above-described preparation process to the transmission process. The 360 video transmission device according to the present invention may include a data input unit, a stitcher, a projection processor, a region-wise packing processor (not shown), a metadata processor, a (transmission side) feedback processor, a data encoder, an encapsulation processor, a transmission processor and/or a transmitter as internal/external elements.

The data input unit may receive captured images/videos for respective viewpoints. The images/videos for the viewpoints may be images/videos captured by one or more cameras. In addition, the data input unit may receive metadata generated in the capture process. The data input unit may deliver the received images/videos for the viewpoints to the stitcher and deliver the metadata generated in the capture process to a signaling processor.

The stitcher may stitch the captured images/videos for the viewpoints. The stitcher may deliver the stitched 360 video data to the projection processor. The stitcher may receive necessary metadata from the metadata processor and use the metadata for stitching operation as necessary. The stitcher may deliver the metadata generated in the stitching process to the metadata processor. The metadata in the stitching process may include information indicating whether stitching has been performed, a stitching type, etc.

The projection processor may project the stitched 360 video data on a 2D image. The projection processor may perform projection according to various schemes which will be described below. The projection processor may perform mapping in consideration of the depth of 360 video data for each viewpoint. The projection processor may receive metadata necessary for projection from the metadata processor and use the metadata for the projection operation as necessary. The projection processor may deliver metadata generated in the projection process to the metadata processor. The metadata of the projection process may include a projection scheme type.

The region-wise packing processor (not shown) may perform the aforementioned region-wise packing process. That is, the region-wise packing processor may perform a process of dividing the projected 360 video data into regions, rotating or rearranging the regions or changing the resolution of each region. As described above, the region-wise packing process is an optional process, and when region-wise packing is not performed, the region-wise packing processor can be omitted. The region-wise packing processor may receive metadata necessary for region-wise packing from the metadata processor and use the metadata for the region-wise packing operation as necessary. The metadata of the region-wise packing processor may include a degree to which each region is rotated, the size of each region, etc.

The aforementioned stitcher, the projection processor and/or the region-wise packing processor may be realized by one hardware component according to an embodiment.

The metadata processor may process metadata which can be generated in the capture process, the stitching process, the projection process, the region-wise packing process, the encoding process, the encapsulation process and/or the processing process for transmission. The metadata processor may generate 360 video related metadata using such metadata. According to an embodiment, the metadata processor may generate the 360 video related metadata in the form of a signaling table. The 360 video related metadata may be called metadata or 360 video related signaling information according to context. Furthermore, the metadata processor may deliver acquired or generated metadata to internal elements of the 360 video transmission device as necessary. The metadata processor may deliver the 360 video related metadata to the data encoder, the encapsulation processor and/or the transmission processor such that the metadata can be transmitted to the receiving side.

The data encoder may encode the 360 video data projected on the 2D image and/or the region-wise packed 360 video data. The 360 video data may be encoded in various formats.

The encapsulation processor may encapsulate the encoded 360 video data and/or 360 video related metadata into a file. Here, the 360 video related metadata may be delivered from the metadata processor. The encapsulation processor may encapsulate the data in a file format such as ISOBMFF, CFF or the like or process the data into a DASH segment. The encapsulation processor may include the 360 video related metadata in a file format according to an embodiment. For example, the 360 video related metadata can be included in boxes of various levels in an ISOBMFF file format or included as data in an additional track in a file. The encapsulation processor may encapsulate the 360 video related metadata into a file according to an embodiment. The transmission processor may perform processing for transmission on the 360 video data encapsulated in a file format. The transmission processor may process the 360 video data according to an arbitrary transmission protocol. The processing for transmission may include processing for delivery through a broadcast network and processing for delivery over a broadband. According to an embodiment, the transmission processor may receive 360 video related metadata from the metadata processor in addition to the 360 video data and perform processing for transmission on the 360 video related metadata.

The transmission unit may transmit the processed 360 video data and/or the 360 video related metadata over a broadcast network and/or broadband. The transmission unit may include an element for transmission over a broadcast network and an element for transmission over a broadband.

According to an embodiment of the present invention, the 360 video transmission device may further include a data storage unit (not shown) as an internal/external element. The data storage unit may store the encoded 360 video data and/or 360 video related metadata before delivery to the transmission processor. Such data may be stored in a file format such as ISOBMFF. When 360 video is transmitted in real time, the data storage unit may not be used. However, 360 video is delivered on demand, in non-real time or over a broadband, encapsulated 360 data may be stored in the data storage unit for a predetermined period and then transmitted.

According to another embodiment of the present invention, the 360 video transmission device may further include a (transmission side) feedback processor and/or a network interface (not shown) as internal/external elements. The network interface may receive feedback information from a 360 video reception device according to the present invention and deliver the feedback information to the (transmission side) feedback processor. The feedback processor may deliver the feedback information to the stitcher, the projection processor, the region-wise packing processor, the data encoder, the encapsulation processor, the metadata processor and/or the transmission processor. The feedback information may be delivered to the metadata processor and then delivered to each internal element according to an embodiment. Upon reception of the feedback information, internal elements may reflect the feedback information in 360 video data processing.

According to another embodiment of the 360 video transmission device of the present invention, the region-wise packing processor may rotate regions and map the regions on a 2D image. Here, the regions may be rotated in different directions at different angles and mapped on the 2D image. The regions may be rotated in consideration of neighboring parts and stitched parts of the 360 video data on the spherical plane before projection. Information about rotation of the regions, that is, rotation directions and angles may be signaled using 360 video related metadata. According to another embodiment of the 360 video transmission device according to the present invention, the data encoder may perform encoding differently on respective regions. The data encoder may encode a specific region with high quality and encode other regions with low quality. The feedback processor at the transmission side may deliver the feedback information received from the 360 video reception device to the data encoder such that the data encoder can use encoding methods differentiated for regions. For example, the feedback processor can deliver viewport information received from the receiving side to the data encoder. The data encoder may encode regions including a region indicated by the viewport information with higher quality (UHD) than other regions.

According to another embodiment of the 360 video transmission device according to the present invention, the transmission processor may perform processing for transmission differently on respective regions. The transmission processor may apply different transmission parameters (modulation orders, code rates, etc.) to regions such that data delivered for the regions have different robustnesses.

Here, the feedback processor may deliver the feedback information received from the 360 video reception device to the transmission processor such that the transmission processor can perform transmission processing differentiated for respective regions. For example, the feedback processor can deliver viewport information received from the receiving side to the transmission processor. The transmission processor may perform transmission processing on regions including a region indicated by the viewport information such that the regions have higher robustness than other regions.

The aforementioned internal/external elements of the 360 video transmission device according to the present invention may be hardware elements. According to an embodiment, the internal/external elements may be modified, omitted, replaced by other elements or integrated with other elements. According to an embodiment, additional elements may be added to the 360 video transmission device.

Figure 3:
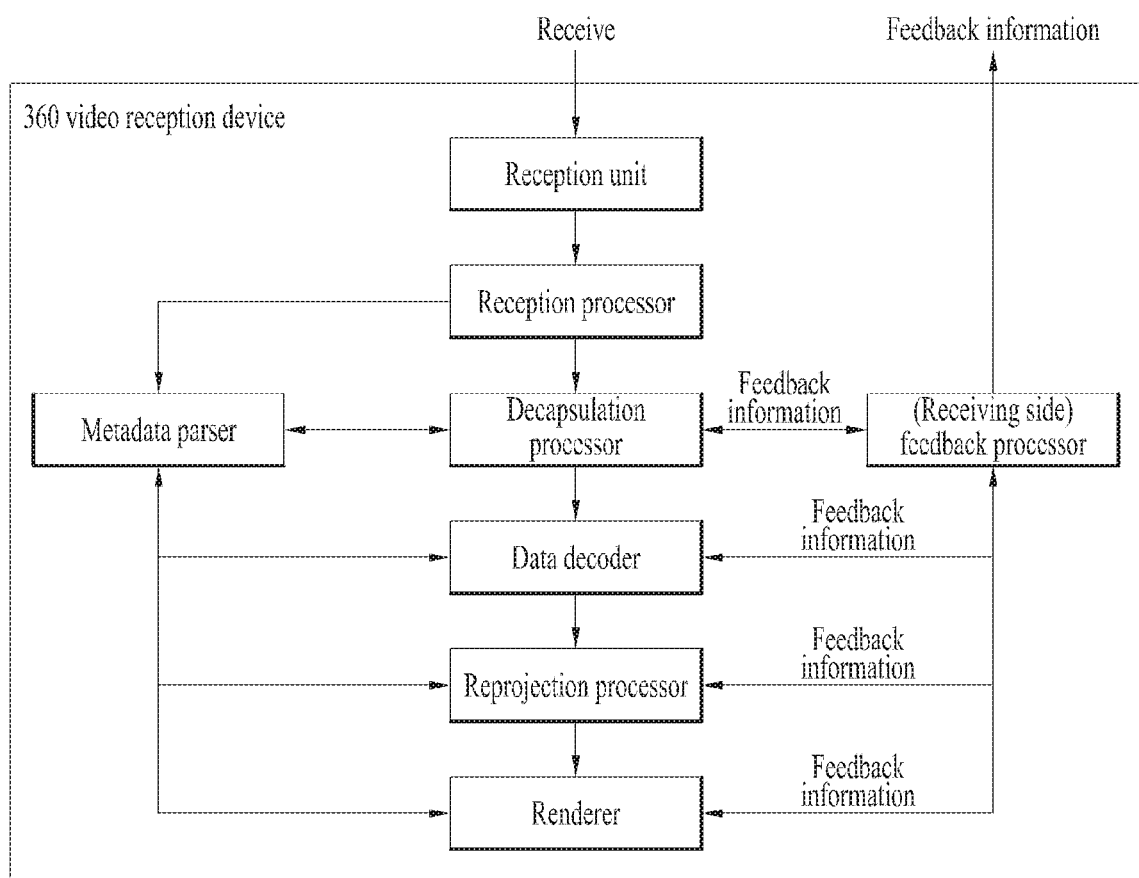
FIG. 3 illustrates a 360-degree video reception device according to another aspect of the present invention.

FIG. 3 illustrates a 360 video reception device according to another aspect of the present invention.

According to another aspect, the present invention may relate to a 360 video reception device. The 360 video reception device according to the present invention may perform operations related to the above-described processing process and/or the rendering process. The 360 video reception device according to the present invention may include a reception unit, a reception processor, a decapsulation processor, a data decoder, a metadata parser, a (receiving side) feedback processor, a re-projection processor and/or a renderer as internal/external elements.

The reception unit may receive 360 video data transmitted from the 360 video transmission device according to the present invention. The reception unit may receive the 360 video data through a broadcast network or a broadband depending on a transmission channel.

The reception processor may perform processing according to a transmission protocol on the received 360 video data. The reception processor may perform a reverse of the process of the transmission processor. The reception processor may deliver the acquired 360 video data to the decapsulation processor and deliver acquired 360 video related metadata to the metadata parser. The 360 video related metadata acquired by the reception processor may have a form of a signaling table.

The decapsulation processor may decapsulate the 360 video data in a file format received from the reception processor. The decapsulation processor may decapsulate files in ISOBMFF to acquire 360 video data and 360 video related metadata. The acquired 360 video data may be delivered to the data decoder and the acquired 360 video related metadata may be delivered to the metadata parser. The 360 video related metadata acquired by the decapsulation processor may have a form of box or track in a file format. The decapsulation processor may receive metadata necessary for decapsulation from the metadata parser as necessary.

The data decoder may decode the 360 video data. The data decoder may receive metadata necessary for decoding from the metadata parser. The 360 video related metadata acquired in the data decoding process may be delivered to the metadata parser.

The metadata parser may parse/decode the 360 video related metadata. The metadata parser may deliver the acquired metadata to the data decapsulation processor, the data decoder, the re-projection processor and/or the renderer.

The re-projection processor may re-project the decoded 360 video data. The re-projection processor may re-project the 360 video data on a 3D space. The 3D space may have different forms depending on used 3D models. The reprojection processor may receive metadata necessary for re-projection from the metadata parser. For example, the re-projection processor may receive information about the type of a used 3D model and detailed information thereof from the metadata parser. According to an embodiment, the re-projection processor may re-project only 360 video data corresponding to a specific region on the 3D space using the metadata necessary for re-projection.

The renderer may render the re-projected 360 video data. This may be represented as rendering of the 360 video data on a 3D space as described above. When two processes are simultaneously performed in this manner, the re-projection processor and the renderer may be integrated and the processes may be performed in the renderer. According to an embodiment, the renderer may render only a region viewed by the user according to view information of the user.

The user may view part of the rendered 360 video through a VR display. The VR display is a device for reproducing 360 video and may be included in the 360 video reception device (tethered) or connected to the 360 video reception device as a separate device (un-tethered).

According to an embodiment of the present invention, the 360 video reception device may further include a (receiving side) feedback processor and/or a network interface (not shown) as internal/external elements. The feedback processor may acquire feedback information from the renderer, the re-projection processor, the data decoder, the decapsulation processor and/or the VR display and process the feedback information. The feedback information may include viewport information, head orientation information, gaze information, etc. The network interface may receive the feedback information from the feedback processor and transmit the same to the 360 video transmission device.

As described above, the feedback information may be used by the receiving side in addition to being delivered to the transmission side. The receiving side feedback processor can deliver the acquired feedback information to internal elements of the 360 video reception device such that the feedback information is reflected in a rendering process. The receiving side feedback processor can deliver the feedback information to the renderer, the re-projection processor, the data decoder and/or the decapsulation processor. For example, the renderer can preferentially render a region viewed by the user using the feedback information. In addition, the decapsulation processor and the data decoder can preferentially decapsulate and decode a region viewed by the user or a region to be viewed by the user.

The internal/external elements of the 360 video reception device according to the present invention may be hardware elements. According to an embodiment, the internal/external elements may be modified, omitted, replaced by other elements or integrated with other elements. According to an embodiment, additional elements may be added to the 360 video reception device.

Another aspect of the present invention may relate to a method of transmitting 360 video and a method of receiving 360 video. The methods of transmitting/receiving 360 video according to the present invention may be performed by the above-described 360 video transmission/reception devices or embodiments thereof.

The aforementioned embodiments of the 360 video transmission/reception devices and embodiments of the internal/external elements thereof may be combined. For example, embodiments of the projection processor and embodiments of the data encoder can be combined to create as many embodiments of the 360 video transmission device as the number of the embodiments. The combined embodiments are also included in the scope of the present invention.

Figure 4:
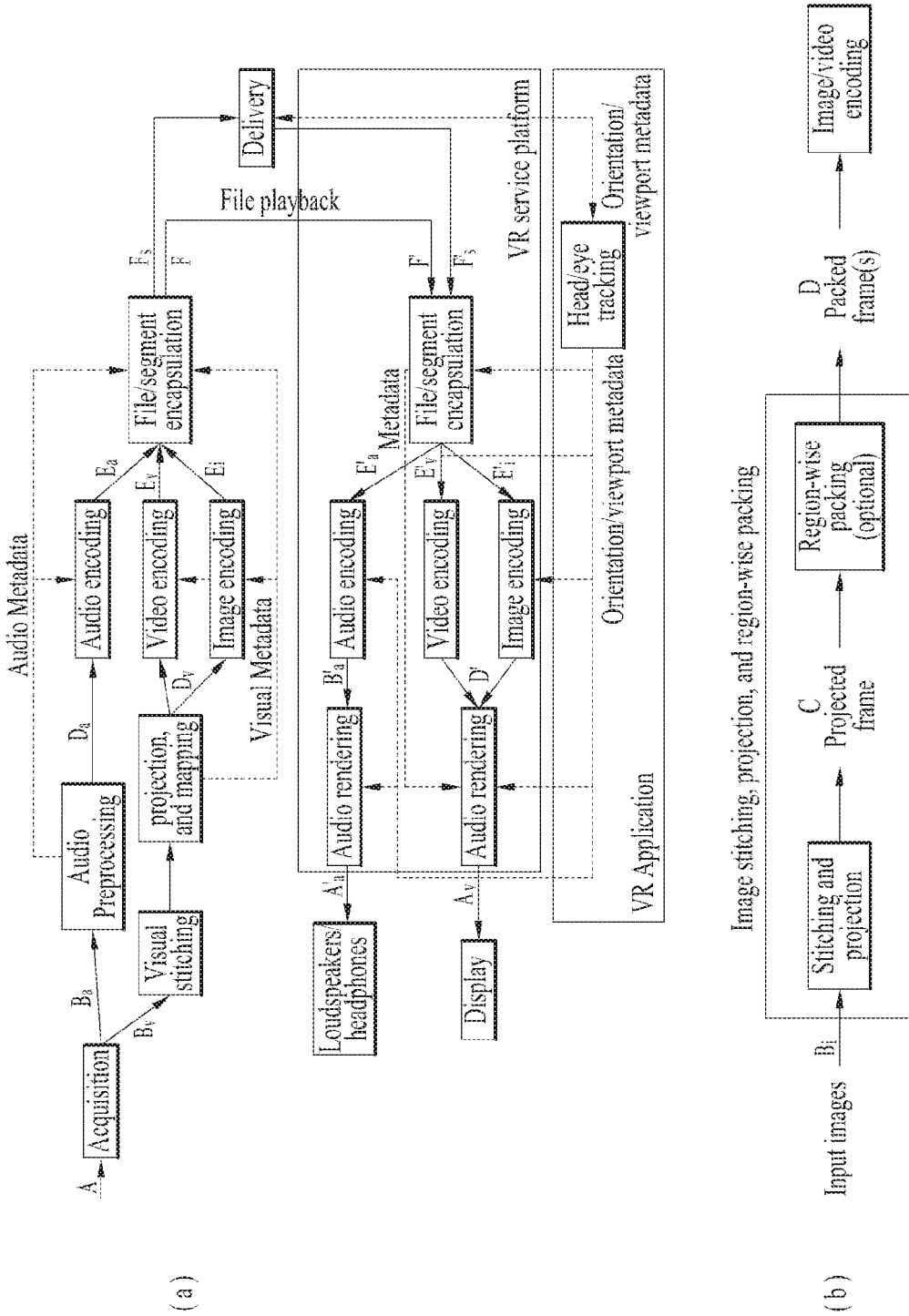
FIG. 4 illustrates a 360-degree video transmission device/360-degree video reception device according to another embodiment of the present invention.

FIG. 4 illustrates a 360 video transmission device/360 video reception device according to another embodiment of the present invention.

As described above, 360 content may be provided according to the architecture shown in (a). The 360 content may be provided in the form of a file or in the form of a segment based download or streaming service such as DASH. Here, the 360 content may be called VR content.

As described above, 360 video data and/or 360 audio data may be acquired.

The 360 audio data may be subjected to audio preprocessing and audio encoding. Through these processes, audio related metadata may be generated, and the encoded audio and audio related metadata may be subjected to processing for transmission (file/segment encapsulation).

The 360 video data may pass through the aforementioned processes. The stitcher of the 360 video transmission device may stitch the 360 video data (visual stitching). This process may be omitted and performed at the receiving side according to an embodiment. The projection processor of the 360 video transmission device may project the 360 video data on a 2D image (projection and mapping (packing)).

The stitching and projection processes are shown in (b) in detail. In (b), when the 360 video data (input images) is delivered, stitching and projection may be performed thereon. The projection process may be regarded as projecting the stitched 360 video data on a 3D space and arranging the projected 360 video data on a 2D image. In the specification, this process may be represented as projecting the 360 video data on a 2D image. Here, the 3D space may be a sphere or a cube. The 3D space may be identical to the 3D space used for re-projection at the receiving side.

The 2D image may also be called a projected frame C. Region-wise packing may be optionally performed on the 2D image. When region-wise packing is performed, the positions, forms and sizes of regions may be indicated such that the regions on the 2D image can be mapped on a packed frame D. When region-wise packing is not performed, the projected frame may be identical to the packed frame. Regions will be described below. The projection process and the region-wise packing process may be represented as projecting regions of the 360 video data on a 2D image. The 360 video data may be directly converted into the packed frame without an intermediate process according to design.

In (a), the projected 360 video data may be image-encoded or video-encoded. Since the same content may be present for different viewpoints, the same content may be encoded into different bit streams. The encoded 360 video data may be processed into a file format such as ISOBMFF according to the aforementioned encapsulation processor. Alternatively, the encapsulation processor may process the encoded 360 video data into segments. The segments may be included in an individual track for DASH based transmission.

Along with processing of the 360 video data, 360 video related metadata may be generated as described above. This metadata may be included in a video bitstream or a file format and delivered. The metadata may be used for encoding, file format encapsulation, processing for transmission, etc.

The 360 audio/video data may pass through processing for transmission according to the transmission protocol and then be transmitted. The aforementioned 360 video reception device may receive the 360 audio/video data over a broadcast network or broadband.

In (a), a VR service platform may correspond to an embodiment of the aforementioned 360 video reception device. In (a), loudspeakers/headphones, display and head/eye tracking components are performed by an external device or a VR application of the 360 video reception device. According to an embodiment, the 360 video reception device may include all of these components. According to an embodiment, the head/eye tracking components may correspond to the aforementioned receiving side feedback processor.

The 360 video reception device may perform processing for reception (file/segment decapsulation) on the 360 audio/video data. The 360 audio data may be subjected to audio decoding and audio rendering and then provided to the user through a speaker/headphone.

The 360 video data may be subjected to image decoding or video decoding and visual rendering and provided to the user through a display. Here, the display may be a display supporting VR or a normal display.

As described above, the rendering process may be regarded as a process of re-projecting 360 video data on a 3D space and rendering the re-projected 360 video data. This may be represented as rendering of the 360 video data on the 3D space.

The head/eye tracking components may acquire and process head orientation information, gaze information and viewport information of a user. This has been described above.

The receiving side may include a VR application which communicates with the aforementioned processes of the receiving side.

Figure 5:
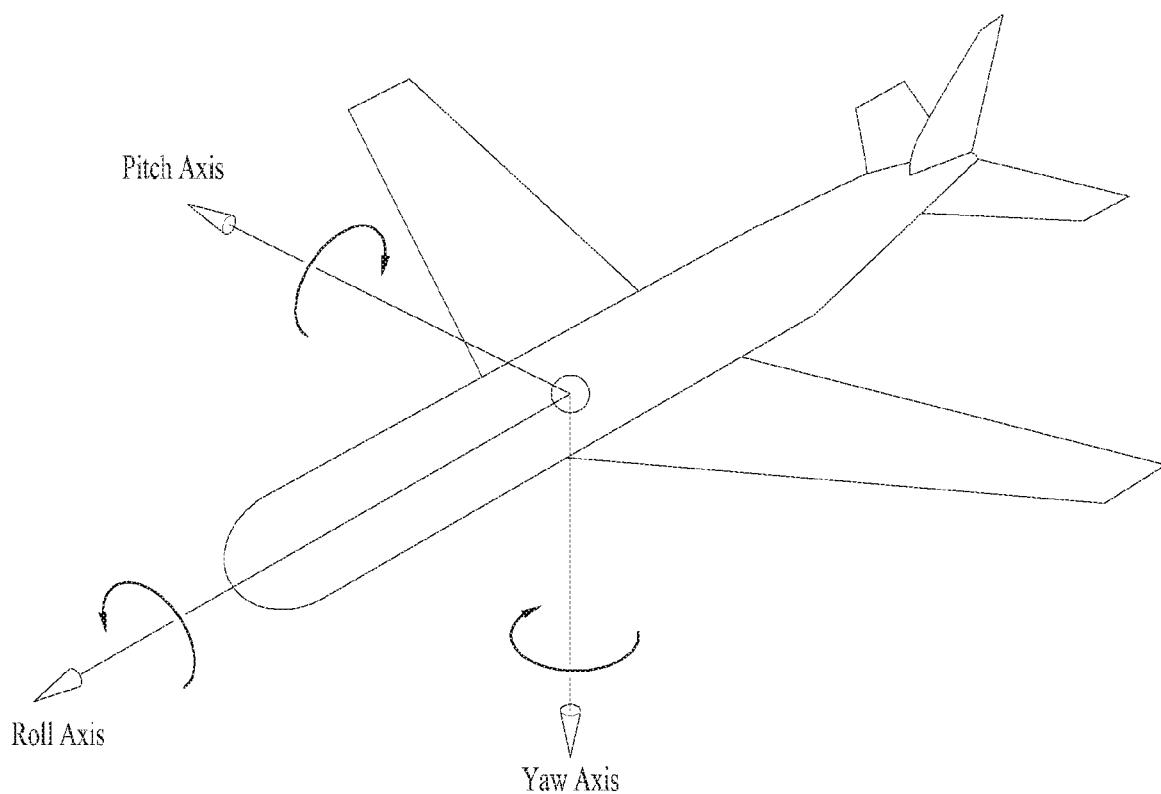
FIG. 5 illustrates the concept of aircraft principal axes for describing a 3D space according to the present invention.

FIG. 5 illustrates the concept of aircraft principal axes for describing a 3D space of the present invention.

In the present invention, the concept of aircraft principal axes may be used to represent a specific point, position, direction, spacing and region in a 3D space.

That is, the concept of aircraft principal axes may be used to describe a 3D space before projection or after re-projection and to signal the same. According to an embodiment, a method using X, Y and Z axes or a spherical coordinate system may be used.

An aircraft can freely rotate in the three dimension. Axes which form the three dimension are called pitch, yaw and roll axes. In the specification, these may be represented as pitch, yaw and roll or a pitch direction, a yaw direction and a roll direction.

The pitch axis may refer to a reference axis of a direction in which the front end of the aircraft rotates up and down. In the shown concept of aircraft principal axes, the pitch axis can refer to an axis connected between wings of the aircraft.

The yaw axis may refer to a reference axis of a direction in which the front end of the aircraft rotates to the left/right. In the shown concept of aircraft principal axes, the yaw axis can refer to an axis connected from the top to the bottom of the aircraft.

The roll axis may refer to an axis connected from the front end to the tail of the aircraft in the shown concept of aircraft principal axes, and rotation in the roll direction can refer to rotation based on the roll axis.

As described above, a 3D space in the present invention can be described using the concept of the pitch, yaw and roll.

Figure 6:
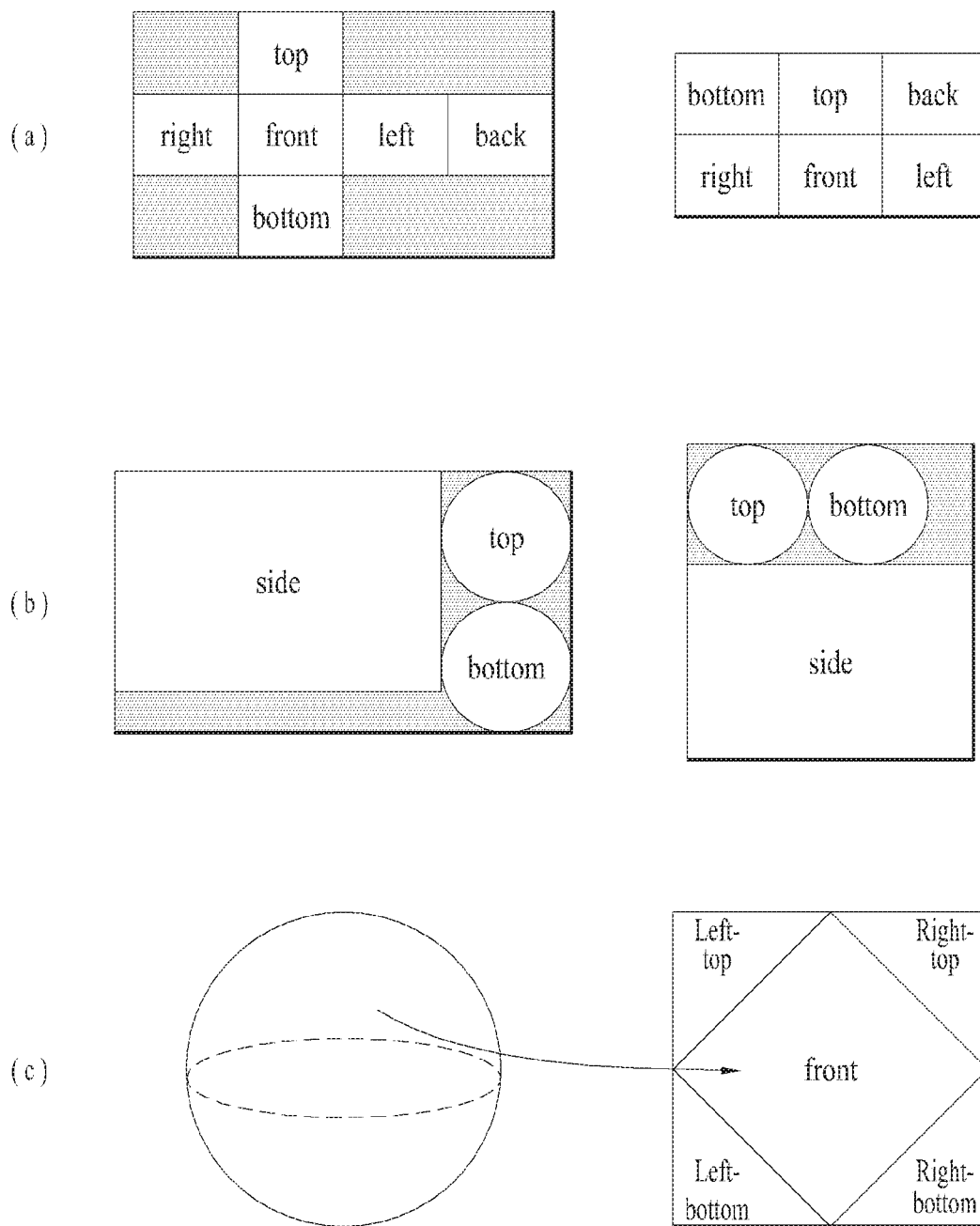
FIG. 6 illustrates projection schemes according to one embodiment of the present invention.

FIG. 6 illustrates projection schemes according to an embodiment of the present invention.

As described above, the projection processor of the 360 video transmission device according to the present invention may project stitched 360 video data on a 2D image. In this process, various projection schemes can be used.

According to another embodiment of the 360 video transmission device according to the present invention, the projection processor may perform projection using a cubic projection scheme. For example, stitched video data can be represented on a spherical plane. The projection processor may segment the 360 video data into faces of a cube and project the same on the 2D image. The 360 video data on the spherical plane may correspond to the faces of the cube and be projected on the 2D image as shown in (a).

According to another embodiment of the 360 video transmission device according to the present invention, the projection processor may perform projection using a cylindrical projection scheme. Similarly, if stitched video data can be represented on a spherical plane, the projection processor can segment the 360 video data into parts of a cylinder and project the same on the 2D image. The 360 video data on the spherical plane can correspond to the side, top and bottom of the cylinder and be projected on the 2D image as shown in (b).

According to another embodiment of the 360 video transmission device according to the present invention, the projection processor may perform projection using a pyramid projection scheme. Similarly, if stitched video data can be represented on a spherical plane, the projection processor can regard the 360 video data as a pyramid form, segment the 360 video data into faces of the pyramid and project the same on the 2D image. The 360 video data on the spherical plane can correspond to the front, left top, left bottom, right top and right bottom of the pyramid and be projected on the 2D image as shown in (c).

According to an embodiment, the projection processor may perform projection using an equirectangular projection scheme and a panoramic projection scheme in addition to the aforementioned schemes.

As described above, regions may refer to regions obtained by dividing a 2D image on which 360 video data is projected. Such regions need not correspond to respective faces of the 2D image projected according to a projection scheme. However, regions may be divided such that the faces of the projected 2D image correspond to the regions and region-wise packing may be performed according to an embodiment. Regions may be divided such that a plurality of faces may correspond to one region or one face may correspond to a plurality of regions according to an embodiment. In this case, the regions may depend on projection schemes. For example, the top, bottom, front, left, right and back sides of the cube can be respective regions in (a). The side, top and bottom of the cylinder can be respective regions in (b). The front, left top, left bottom, right top and right bottom sides of the pyramid can be respective regions in (c).

FIG. 7 illustrates tiles according to an embodiment of the present invention.

360 video data projected on a 2D image or region-wise packed 360 video data may be divided into one or more tiles. (a) shows that one 2D image is divided into 16 tiles. Here, the 2D image may be the aforementioned projected frame or packed frame. According to another embodiment of the 360 video transmission device of the present invention, the data encoder may independently encode the tiles.

The aforementioned region-wise packing can be discriminated from tiling. The aforementioned region-wise packing may refer to a process of dividing 360 video data projected on a 2D image into regions and processing the regions in order to increase coding efficiency or adjusting resolution. Tiling may refer to a process through which the data encoder divides a projected frame or a packed frame into tiles and independently encode the tiles. When 360 video is provided, a user does not simultaneously use all parts of the 360 video. Tiling enables only tiles corresponding to important part or specific part, such as a viewport currently viewed by the user, to be transmitted to or consumed by the receiving side on a limited bandwidth. Through tiling, a limited bandwidth can be used more efficiently and the receiving side can reduce computational load compared to a case in which the entire 360 video data is processed simultaneously.

A region and a tile are discriminated from each other and thus they need not be identical. However, a region and a tile may refer to the same area according to an embodiment. Region-wise packing may be performed based on tiles and thus regions can correspond to tiles according to an embodiment. Furthermore, when sides according to a projection scheme correspond to regions, each side, region and tile according to the projection scheme may refer to the same area according to an embodiment. A region may be called a VR region and a tile may be called a tile region according to context.

ROI (Region of Interest) may refer to a region of interest of users, which is provided by a 360 content provider. When the 360 content provider produces 360 video, the 360 content provider can produce the 360 video in consideration of a specific region which is expected to be a region of interest of users. According to an embodiment, ROI may correspond to a region in which important content of the 360 video is reproduced.

According to another embodiment of the 360 video transmission/reception devices of the present invention, the receiving side feedback processor may extract and collect viewport information and deliver the same to the transmission side feedback processor. In this process, the viewport information can be delivered using network interfaces of both sides. In the 2D image shown in (a), a viewport t6010 is displayed. Here, the viewport may be displayed over nine tiles of the 2D images.

In this case, the 360 video transmission device may further include a tiling system. According to an embodiment, the tiling system may be located following the data encoder (b), may be included in the aforementioned data encoder or transmission processor, or may be included in the 360 video transmission device as a separate internal/external element.

The tiling system may receive viewport information from the transmission side feedback processor. The tiling system may select only tiles included in a viewport region and transmit the same. In the 2D image shown in (a), only nine tiles including the viewport region t6010 among 16 tiles can be transmitted. Here, the tiling system may transmit tiles in a unicast manner over a broadband because the viewport region is different for users.

In this case, the transmission side feedback processor may deliver the viewport information to the data encoder. The data encoder may encode the tiles including the viewport region with higher quality than other tiles.

Furthermore, the transmission side feedback processor may deliver the viewport information to the metadata processor. The metadata processor may deliver metadata related to the viewport region to each internal element of the 360 video transmission device or include the metadata in 360 video related metadata.

By using this tiling method, transmission bandwidths can be saved and processes differentiated for tiles can be performed to achieve efficient data processing/transmission.

The above-described embodiments related to the viewport region can be applied to specific regions other than the viewport region in a similar manner. For example, the aforementioned processes performed on the viewport region can be performed on a region determined to be a region in which users are interested through the aforementioned gaze analysis, ROI, and a region (initial view, initial viewpoint) initially reproduced when a user views 360 video through a VR display.

According to another embodiment of the 360 video transmission device of the present invention, the transmission processor may perform processing for transmission differently on tiles. The transmission processor may apply different transmission parameters (modulation orders, code rates, etc.) to tiles such that data delivered for the tiles has different robustnesses.

Here, the transmission side feedback processor may deliver feedback information received from the 360 video reception device to the transmission processor such that the transmission processor can perform transmission processing differentiated for tiles. For example, the transmission side feedback processor can deliver the viewport information received from the receiving side to the transmission processor. The transmission processor can perform transmission processing such that tiles including the corresponding viewport region have higher robustness than other tiles.

FIG. 8 illustrates 360 video related metadata according to an embodiment of the present invention.

The aforementioned 360 video related metadata may include various types of metadata related to 360 video. The 360 video related metadata may be called 360 video related signaling information according to context. The 360 video related metadata may be included in an additional signaling table and transmitted, included in a DASH MPD and transmitted, or included in a file format such as ISOBMFF in the form of box and delivered. When the 360 video related metadata is included in the form of box, the 360 video related metadata may be included in various levels such as a file, fragment, track, sample entry, sample, etc. and may include metadata about data of the corresponding level.

According to an embodiment, part of the metadata, which will be described below, may be configured in the form of a signaling table and delivered, and the remaining part may be included in a file format in the form of a box or a track.

According to an embodiment of the 360 video related metadata, the 360 video related metadata may include basic metadata related to a projection scheme, stereoscopic related metadata, initial view/initial viewpoint related metadata, ROI related metadata, FOV (Field of View) related metadata and/or cropped region related metadata. According to an embodiment, the 360 video related metadata may include additional metadata in addition to the aforementioned metadata.

Embodiments of the 360 video related metadata according to the present invention may include at least one of the aforementioned basic metadata, stereoscopic related metadata, initial view/initial viewpoint related metadata, ROI related metadata, FOV related metadata, cropped region related metadata and/or additional metadata. Embodiments of the 360 video related metadata according to the present invention may be configured in various manners depending on the number of cases of metadata included therein. According to an embodiment, the 360 video related metadata may further include additional metadata in addition to the aforementioned metadata.

The basic metadata may include 3D model related information, projection scheme related information and the like. The basic metadata may include a vr_geometry field, a projection_scheme field, etc. According to an embodiment, the basic metadata may further include additional information.

The vr_geometry field can indicate the type of a 3D model supported by the corresponding 360 video data. When the 360 video data is re-projected on a 3D space as described above, the 3D space may have a form according to a 3D model indicated by the vr_geometry field. According to an embodiment, a 3D model used for rendering may differ from the 3D model used for re-projection, indicated by the vr_geometry field. In this case, the basic metadata may further include a field which indicates the 3D model used for rendering. When the field has values of 0, 1, 2 and 3, the 3D space can conform to 3D models of a sphere, a cube, a cylinder and a pyramid. When the field has the remaining values, the field can be reserved for future use. According to an embodiment, the 360 video related metadata may further include detailed information about the 3D model indicated by the field. Here, the detailed information about the 3D model may refer to the radius of a sphere, the height of a cylinder, etc. for example. This field may be omitted.

The projection_scheme field can indicate a projection scheme used when the 360 video data is projected on a 2D image. When the field has values of 0, 1, 2, 3, 4, and 5, the field indicates that the equirectangular projection scheme, cubic projection scheme, cylindrical projection scheme, tile-based projection scheme, pyramid projection scheme and panoramic projection scheme are used. When the field has a value of 6, the field indicates that the 360 video data is directly projected on the 2D image without stitching. When the field has the remaining values, the field can be reserved for future use. According to an embodiment, the 360 video related metadata may further include detailed information about regions generated according to a projection scheme specified by the field. Here, the detailed information about regions may refer to information indicating whether regions have been rotated, the radius of the top region of a cylinder, etc. for example.

The stereoscopic related metadata may include information about 3D related attributes of the 360 video data. The stereoscopic related metadata may include an is_stereoscopic field and/or a stereo_mode field. According to an embodiment, the stereoscopic related metadata may further include additional information.

The is_stereoscopic field can indicate whether the 360 video data supports 3D. When the field is 1, the 360 video data supports 3D. When the field is 0, the 360 video data does not support 3D. This field may be omitted.

The stereo_mode field can indicate 3D layout supported by the corresponding 360 video. Whether the 360 video supports 3D can be indicated only using this field. In this case, the is_stereoscopic field can be omitted. When the field is 0, the 360 video may be a mono mode. That is, the projected 2D image can include only one mono view. In this case, the 360 video may not support 3D.

When this field is set to 1 and 2, the 360 video can conform to left-right layout and top-bottom layout. The left-right layout and top-bottom layout may be called a side-by-side format and a top-bottom format. In the case of the left-right layout, 2D images on which left image/right image are projected can be positioned at the left/right on an image frame. In the case of the top-bottom layout, 2D images on which left image/right image are projected can be positioned at the top/bottom on an image frame. When the field has the remaining values, the field can be reserved for future use.

The initial view/initial viewpoint related metadata may include information about a view (initial view) which is viewed by a user when initially reproducing 360 video. The initial view/initial viewpoint related metadata may include an initial_view_yaw_degree field, an initial_view_pitch_degree field and/or an initial_view_roll_degree field. According to an embodiment, the initial view/initial viewpoint related metadata may further include additional information.

The initial_view_yaw_degree field, initial_view_pitch_degree field and initial_view_roll_degree field can indicate an initial view when the 360 video is reproduced. That is, the center point of a viewport which is initially viewed when the 360 video is reproduced can be indicated by these three fields. The fields can indicate the center point using a direction (sign) and a degree (angle) of rotation on the basis of yaw, pitch and roll axes. Here, the viewport which is initially viewed when the 360 video is reproduced according to FOV. The width and height of the initial viewport based on the indicated initial view may be determined through FOV. That is, the 360 video reception device can provide a specific region of the 360 video as an initial viewport to a user using the three fields and FOV information.

According to an embodiment, the initial view indicated by the initial view/initial viewpoint related metadata may be changed per scene. That is, scenes of the 360 video change as 360 content proceeds with time. The initial view or initial viewpoint which is initially viewed by a user can change for each scene of the 360 video. In this case, the initial view/initial viewpoint related metadata can indicate the initial view per scene. To this end, the initial view/initial viewpoint related metadata may further include a scene identifier for identifying a scene to which the initial view is applied. In addition, since FOV may change per scene of the 360 video, the initial view/initial viewpoint related metadata may further include FOV information per scene which indicates FOV corresponding to the relative scene.

The ROI related metadata may include information related to the aforementioned ROI. The ROI related metadata may include a 2d_roi_range_flag field and/or a 3d_roi_range_flag field. These two fields can indicate whether the ROI related metadata includes fields which represent ROI on the basis of a 2D image or fields which represent ROI on the basis of a 3D space. According to an embodiment, the ROI related metadata may further include additional information such as differentiate encoding information depending on ROI and differentiate transmission processing information depending on ROI.

When the ROI related metadata includes fields which represent ROI on the basis of a 2D image, the ROI related metadata may include a min_top_left_x field, a max_top_left_x field, a min_top_left_y field, a max_top_left_y field, a min_width field, a max_width field, a min_height field, a max_height field, a min_x field, a max_x field, a min_y field and/or a max_y field.

The min_top_left_x field, max_top_left_x field, min_top_left_y field, max_top_left_y field can represent minimum/maximum values of the coordinates of the left top end of the ROI. These fields can sequentially indicate a minimum x coordinate, a maximum x coordinate, a minimum y coordinate and a maximum y coordinate of the left top end.

The min_width field, max_width field, min_height field and max_height field can indicate minimum/maximum values of the width and height of the ROI. These fields can sequentially indicate a minimum value and a maximum value of the width and a minimum value and a maximum value of the height.

The min_x field, max_x field, min_y field and max_y field can indicate minimum and maximum values of coordinates in the ROI. These fields can sequentially indicate a minimum x coordinate, a maximum x coordinate, a minimum y coordinate and a maximum y coordinate of coordinates in the ROI. These fields can be omitted.

When ROI related metadata includes fields which indicate ROI on the basis of coordinates on a 3D rendering space, the ROI related metadata may include a min_yaw field, a max_yaw field, a min_pitch field, a max_pitch field, a min_roll field, a max_roll field, a min_field_of_view field and/or a max_field_of_view field.

The min_yaw field, max_yaw field, min_pitch field, max_pitch field, min_roll field and max_roll field can indicate a region occupied by ROI on a 3D space using minimum/maximum values of yaw, pitch and roll. These fields can sequentially indicate a minimum value of yaw-axis based reference rotation amount, a maximum value of yaw-axis based reference rotation amount, a minimum value of pitch-axis based reference rotation amount, a maximum value of pitch-axis based reference rotation amount, a minimum value of roll-axis based reference rotation amount, and a maximum value of roll-axis based reference rotation amount.

The min_field_of_view field and max_field_of_view field can indicate minimum/maximum values of FOV of the corresponding 360 video data. FOV can refer to the range of view displayed at once when 360 video is reproduced. The min_field_of_view field and max_field_of_view field can indicate minimum and maximum values of FOV. These fields can be omitted. These fields may be included in FOV related metadata which will be described below.

The FOV related metadata may include the aforementioned FOV related information. The FOV related metadata may include a content_fov_flag field and/or a content_fov field. According to an embodiment, the FOV related metadata may further include additional information such as the aforementioned minimum/maximum value related information of FOV.

The content_fov_flag field can indicate whether corresponding 360 video includes information about FOV intended when the 360 video is produced. When this field value is 1, a content_fov field can be present.

The content_fov field can indicate information about FOV intended when the 360 video is produced. According to an embodiment, a region displayed to a user at once in the 360 video can be determined according to vertical or horizontal FOV of the 360 video reception device. Alternatively, a region displayed to a user at once in the 360 video may be determined by reflecting FOV information of this field according to an embodiment.

Cropped region related metadata may include information about a region including 360 video data in an image frame. The image frame may include a 360 video data projected active video area and other areas. Here, the active video area can be called a cropped region or a default display region. The active video area is viewed as 360 video on an actual VR display and the 360 video reception device or the VR display can process/display only the active video area. For example, when the aspect ratio of the image frame is 4:3, only an area of the image frame other than an upper part and a lower part of the image frame can include 360 video data. This area can be called the active video area.

The cropped region related metadata can include an is_cropped_region field, a cr_region_left_top_x field, a cr_region_left_top_y field, a cr_region_width field and/or a cr_region_height field. According to an embodiment, the cropped region related metadata may further include additional information.

The is_cropped_region field may be a flag which indicates whether the entire area of an image frame is used by the 360 video reception device or the VR display. That is, this field can indicate whether the entire image frame indicates an active video area. When only part of the image frame is an active video area, the following four fields may be added.

A cr_region_left_top_x field, a cr_region_left_top_y field, a cr_region_width field and a cr_region_height field can indicate an active video area in an image frame. These fields can indicate the x coordinate of the left top, the y coordinate of the left top, the width and the height of the active video area. The width and the height can be represented in units of pixel.

As described above, 360-degree video related signaling information or metadata can be included in an arbitrarily defined signaling table, included in the form of box in a file format such as ISOBMFF or common file format or included in a DASH MPD and transmitted. In addition, 360-degree media data may be included in such a file format or a DASH segment and transmitted.

The ISOBMFF and DASH MPD will be sequentially described below.

Figure 9:
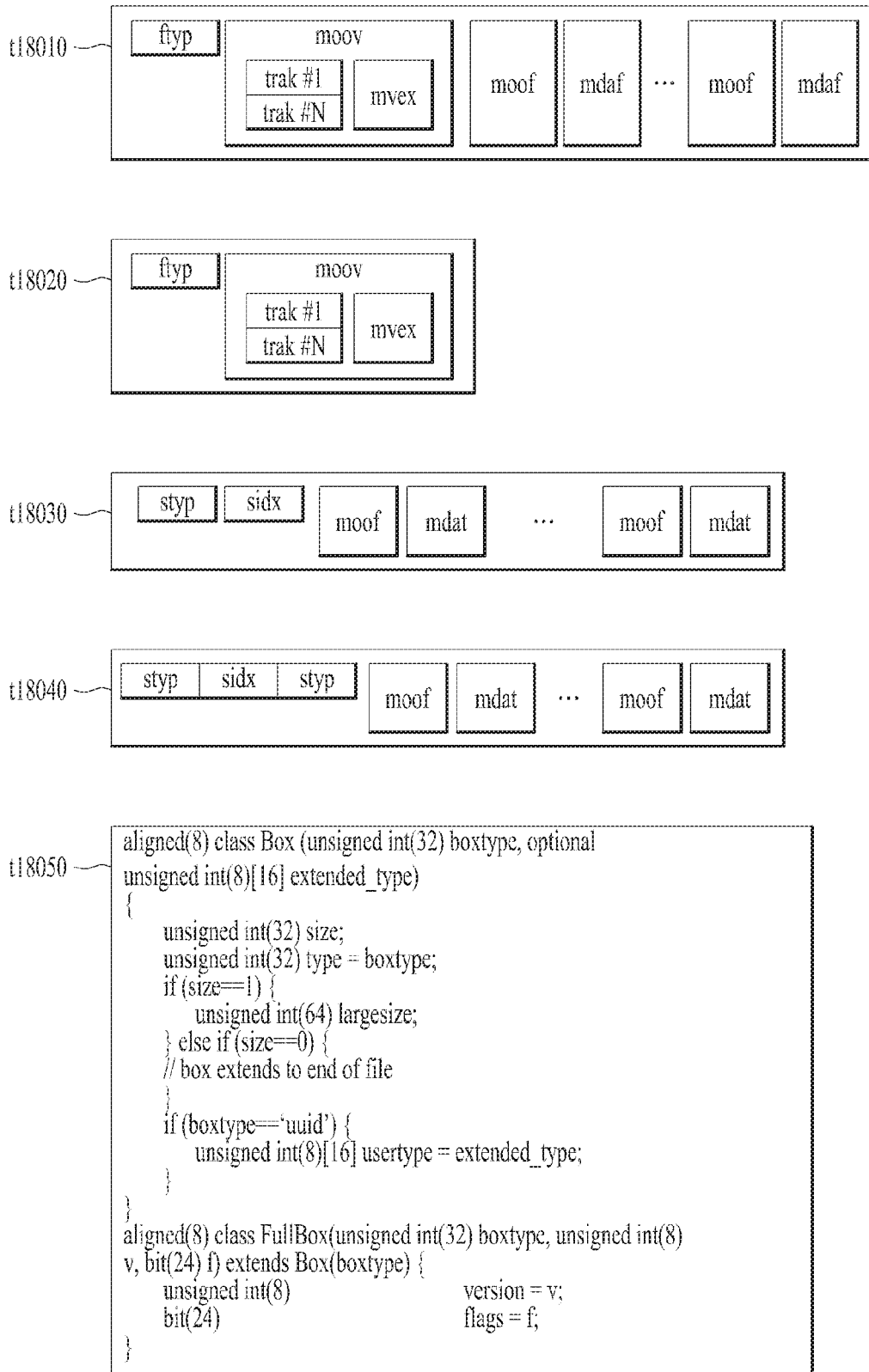
FIG. 9 illustrates a media file structure according to one embodiment of the present invention.

FIG. 9 illustrates a media file structure according to one embodiment of the present invention.

Figure 10:
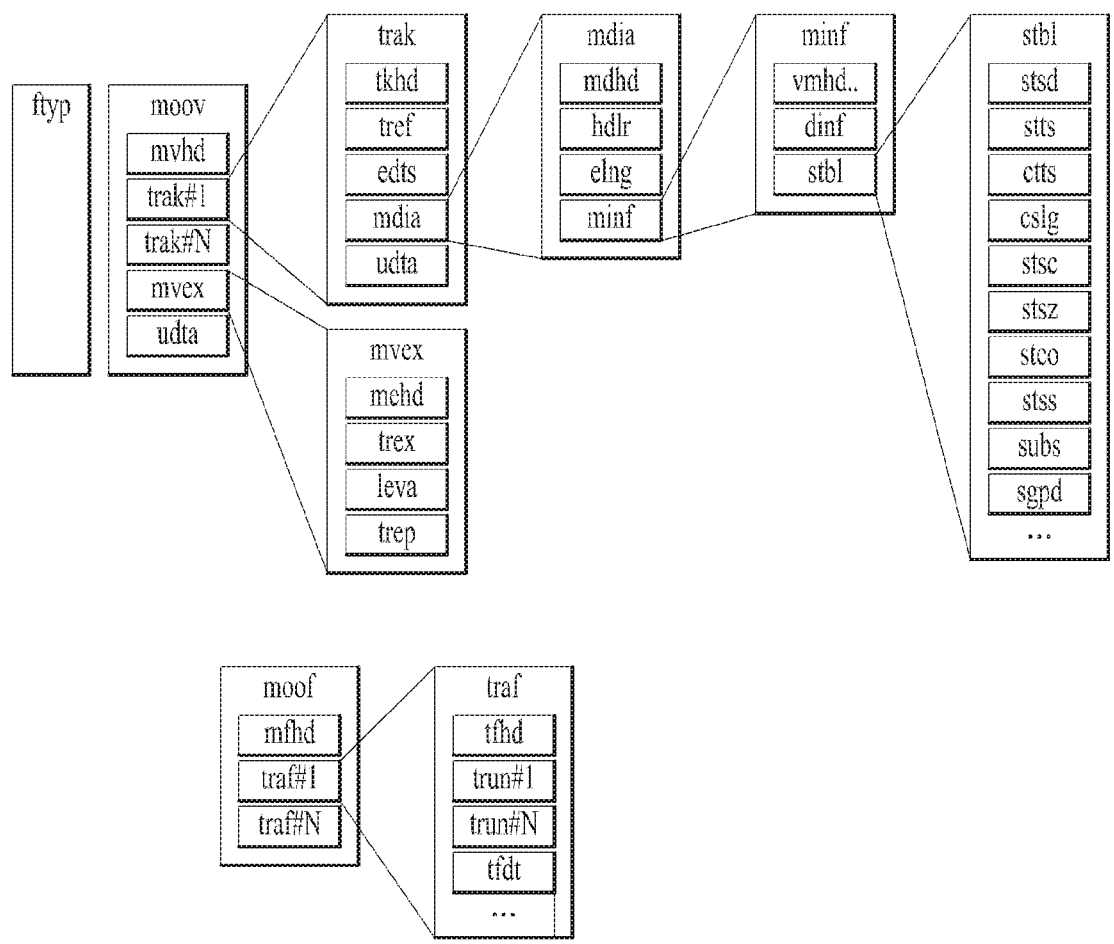
FIG. 10 illustrates a hierarchical structure of boxes in ISOBMFF according to one embodiment of the present invention.

FIG. 10 illustrates a hierarchical structure of boxes in ISOBMFF according to one embodiment of the present invention.

To store and transmit media data such as audio or video, a standardized media file format can be defined. According to an embodiment, a media file may have a file format based on ISO base media file format (ISOBMFF).

A media file according to the present invention may include at least one box. Here, a box may be a data block or an object including media data or metadata related to media data. Boxes may be arranged in a hierarchical structure, and thus data can be classified and a media file can take a form suitable for storage and/or transmission of media data. In addition, the media file may have a structure which facilitates accessing media information such as user moving to a specific point in media content.

The media file according to the present invention can include an ftyp box, a moov box and/or an mdat box.

The ftyp box (file type box) can provide information related to file type or compatibility of the corresponding media file. The ftyp box can include configuration version information about media data of the media file. A decoder can identify the corresponding media file with reference to the ftyp box.

The moov box (movie box) may include metadata about the media data of the media file. The moov box can serve as a container for all pieces of metadata. The moov box may be a box at the highest level among metadata related boxes. According to an embodiment, only one moov box may be included in the media file.

The mdat box (media data box) may contain actual media data of the corresponding media file. The media data can include audio samples and/or video samples and the mdat box can serve as a container for containing such media samples.

According to an embodiment, the moov box may include an mvhd box, a trak box and/or an mvex box as lower boxes.

The mvhd box (movie header box) can include media presentation related information of media data included in the corresponding media file. That is, the mvhd box can include information such as a media generation time, change time, time standard and period of corresponding media presentation.

The trak box (track box) can provide information related to a track of corresponding media data. The trak box can include information such as stream related information about an audio track or a video track, presentation related information, and access related information. A plurality of trak boxes may be provided depending on the number of tracks.

The trak box may include a tkhd box (track header box) as a lower box according to an embodiment. The tkhd box can include information about a track indicated by the trak box. The tkhd box can include information such as a generation time, change time and track identifier of the corresponding track.

The mvex box (movie extend box) can indicate that the corresponding media file may include a moof box which will be described below. Moov boxes may need to be scanned to recognize all media samples of a specific track.

The media file according to the present invention may be divided into a plurality of fragments according to an embodiment (t18010). Accordingly, the media file can be segmented and stored or transmitted. Media data (mdat box) of the media file is divided into a plurality of fragments and each fragment can include the moof box and divided mdat boxes. According to an embodiment, information of the ftyp box and/or the moov box may be necessary to use fragments.

The moof box (movie fragment box) can provide metadata about media data of a corresponding fragment. The moof box may be a box at the highest layer among boxes related to the metadata of the corresponding fragment.

The mdat box (media data box) can include actual media data as described above. The mdat box can include media samples of media data corresponding to each fragment.

According to an embodiment, the aforementioned moof box can include an mfhd box and/or a traf box as lower boxes.

The mfhd box (movie fragment header box) can include information related to correlation of divided fragments. The mfhd box can include a sequence number to indicate the order of the media data of the corresponding fragment. In addition, it is possible to check whether there is omitted data among divided data using the mfhd box.

The traf box (track fragment box) can include information about a corresponding track fragment. The traf box can provide metadata about a divided track fragment included in the corresponding fragment. The traf box can provide metadata for decoding/reproducing media samples in the corresponding track fragment. A plurality of traf boxes may be provided depending on the number of track fragments.

According to an embodiment, the aforementioned traf box may include a tfhd box and/or a trun box as lower boxes.

The tfhd box (track fragment header box) can include header information of the corresponding track fragment. The tfhd box can provide information such as a basic sample size, period, offset and identifier for media samples of the track fragment indicated by the aforementioned traf box.

The trun box (track fragment run box) can include information related to the corresponding track fragment. The trun box can include information such as a period, size and reproduction timing of each media sample.

The aforementioned media file and fragments of the media file can be processed into segments and transmitted. Segments may include an initialization segment and/or a media segment.

A file of an embodiment t18020 shown in the figure may be a file including information related to initialization of a media decoder except media data. This file can correspond to the aforementioned initialization segment. The initialization segment can include the aforementioned ftyp box and/or the moov box.

The file of an embodiment t18030 shown in the figure may be a file including the aforementioned fragments. For example, this file can correspond to the aforementioned media segment. The media segment can include the aforementioned moof box and/or mdat box. In addition, the media segment can further include an styp box and/or an sidx box.

The styp box (segment type box) can provide information for identifying media data of a divided fragment. The styp box can perform the same role as the aforementioned ftyp box for a divided fragment. According to an embodiment, the styp box can have the same format as the ftyp box.

The sidx box (segment index box) can provide information indicating an index for a divided fragment. Accordingly, the sidx box can indicate the order of the divided fragment.

An ssix box may be further provided according to an embodiment t18040. The ssix box (sub-segment index box) can provide information indicating indexes of sub-segments when a segment is divided into the sub-segments.

Boxes in a media file may further include extended information on the basis of a box as shown in an embodiment t18050 or a full box. In this embodiment, a size field and a largesize field can indicate the length of a corresponding box in bytes. A version field can indicate the version of a corresponding box format. A type field can indicate the type or identifier of the corresponding box. A flags field can indicate flags related to the corresponding box.

FIG. 11 illustrates overall operation of a DASH based adaptive streaming model according to an embodiment of the present invention.

A DASH based adaptive streaming model according to an embodiment t50010 shown in the figure describes operations between an HTTP server and a DASH client. Here, DASH (dynamic adaptive streaming over HTTP) is a protocol for supporting HTTP based adaptive streaming and can dynamically support streaming depending on network state. Accordingly, reproduction of AV content can be seamlessly provided.

First, the DASH client can acquire an MPD. The MPD can be delivered from a service provider such as the HTTP server. The DASH client can request segments described in the MPD from the server using information for accessing the segments. The request can be performed based on a network state.

The DASH client can acquire the segments, process the segments in a media engine and display the processed segments on a screen. The DASH client can request and acquire necessary segments by reflecting a presentation time and/or a network state in real time (adaptive streaming). Accordingly, content can be seamlessly presented.

The MPD (media presentation description) is a file including detained information used for the DASH client to dynamically acquire segments and can be represented in XML.

A DASH client controller can generate a command for requesting the MPD and/or segments on the basis of a network state. In addition, the DASH client controller can control an internal block such as the media engine to use acquired information.

An MPD parser can parse the acquired MPD in real time. Accordingly, the DASH client controller can generate a command for acquiring necessary segments.

A segment parser can parse acquired segments in real time. Internal blocks such as the media engine can perform a specific operation according to information included in the segment.

An HTTP client can request a necessary MPD and/or segments from the HTTP server. In addition, the HTTP client can deliver the MPD and/or segments acquired from the server to the MPD parser or the segment parser.

The media engine can display content on the screen using media data included in segments. Here, information of the MPD can be used.

A DASH data model may have a hierarchical structure t50020. Media presentation can be described by the MPD. The MPD can describe a time sequence of a plurality of periods which forms media presentation. A period indicates one section of media content.

In one period, data can be included in adaptation sets. An adaptation set may be a set of media content components which can be exchanged. Adaption can include a set of representations. A representation can correspond to a media content component. In one representation, content can be temporally divided into a plurality of segments for appropriate accessibility and delivery. To access each segment, the URL of each segment may be provided.

The MPD can provide information related to media presentation and a period element, an adaptation set element and a representation element can describe a corresponding period, adaptation set and representation. A representation can be divided into sub-representations, and a sub-representation element can describe a corresponding sub-representation.

Here, common attribute/elements can be defined. The common attributes/elements can be applied to (included in) sub-representations. The common attributes/elements may include an essential property and/or a supplemental property.

The essential property may be information including elements regarded as mandatory elements in processing of corresponding media presentation related data. The supplemental property may be information including elements which may be used to process corresponding media presentation related data. In an embodiment, descriptors which will be described below may be defined in the essential property and/or the supplemental property and delivered through an MPD.

A DASH based descriptor may include an @schemeIdUri field, an @value field and/or an @id field. The @schemeIdUri field can provide a URI through which the scheme of the corresponding descriptor is identified. The @value field can have values defined by the scheme indicated by the @schemeIdUri field. That is, the @ value field can have values of descriptor elements according to the scheme, which may be called parameters. The parameters can be discriminated by ",". The @id can indicate the ID of the corresponding descriptor. When the descriptor has the same ID, the descriptor can include the same scheme ID, value and parameters.

The embodiments of 360 video related metadata may be rewritten as embodiments of a DASH based descriptor. When 360 video data is delivered according to DASH, 360 video related metadata may be described in the form of DASH descriptors, included in an MPD and delivered to a receiving side. The descriptors may be delivered in the form of the aforementioned essential property descriptor and/or supplemental property descriptor. These descriptors may be included in the adaptation set, representation and sub-representation of the MPD and delivered.

The specification discloses methods of defining, storing and signaling related metadata in order to deliver information about a viewpoint (point) intended by a producer, such as a director's cut, such that a user can view the intended viewpoint (point) or region in reproduction of 360 video. Region information or viewpoint information which will be described below may be region information or viewpoint information indicating a region or a view (point) intended by a producer.

Information that needs to be delivered for the methods may correspond to a region in a 2D space, a viewpoint (point) in the 2D space, a region in a 3D space or a viewpoint (point) in the 3D space. The 2D space may refer to a captured or encoded rectangular image plane and the 3D space may refer to a projecting space or a projection structure for 360 video rendering, such as a spherical, cylindrical or square form. Here, the region may refer to the aforementioned region, and the region or viewpoint (point) in the 3D space may correspond to the region or viewpoint (point) in the 2D space. That is, the region or viewpoint (point) of the 2D space may be obtained by projecting/mapping the region or viewpoint (point) of the 3D space on a 2D frame.

<Method of Delivering Region and Viewpoint Information in 2D Space>

Region and viewpoint (point) information in a 2D space may be stored in a single track as timed metadata in ISOBMFF. Embodiments of metadata about region information in a 2D space and metadata about viewpoint (point) information in the 2D space will be sequentially described below.

FIG. 12 illustrates metadata about region information in a 2D space according to one embodiment of the present invention.

FIG. 12(a) illustrate a configuration of a sample entry of a track storing the region information in the 2D space and FIG. 12(b) illustrates a configuration of an individual sample for an individual region to be represented in the 2D space.

The sample entry of the track storing the region information in the 2D space may include reference_width, reference_height, min_top_left_x, max_top_left_x, min_top_left_y, max_top_left_y, min_width, max_width, min_height and/or max_height.

The reference_width indicates the horizontal size of the 2D space. Here, the horizontal size of the 2D space may be represented in number of pixels.

The reference_height indicates the vertical size of the 2D space. Here, the vertical size of the 2D space may be represented in number of pixels.

The min_top_left_x indicates a minimum value of the horizontal coordinate of the left top point of a region to be represented.

The max_top_left_x indicates a maximum value of the horizontal coordinate of the left top point of the region to be represented.

The min_top_left_y indicates a minimum value of the vertical coordinate of the left top point of the region to be represented.

The max_top_left_y indicates a maximum value of the vertical coordinate of the left top point of the region to be represented.

The min_width indicates a minimum value of the horizontal size of a region (region in the 2D space) to be represented. Here, the minimum value of the horizontal size of the region to be represented may be represented in number of pixels.

The max_width indicates a maximum value of the horizontal size of the region (region in the 2D space) to be represented. Here, the maximum value of the horizontal size of the region to be represented may be represented in number of pixels.

The min_height indicates a minimum value of the vertical size of a region (region in the 2D space) to be represented.

Here, the minimum value of the vertical size of the region to be represented may be represented in number of pixels.

The max_height indicates a maximum value of the vertical size of a region (region in the 2D space) to be represented. Here, the maximum value of the vertical size of the region to be represented may be represented in number of pixels.

An individual sample for an individual region to be represented in the 2D space may include top_left_x, top_left_y, width, height and/or interpolate.

The top_left_x indicates the horizontal coordinate of the left top point of a region to be represented.

The top_left_y indicates the vertical coordinate of the left top point of the region to be represented.

The width indicates the horizontal size of the region to be represented. Here, the horizontal size of the region to be represented may be represented in number of pixels.

The height indicates the vertical size of the region to be represented. Here, the vertical size of the region to be represented may be represented in number of pixels.

The interpolate indicates whether values between a region represented by a previous sample and a region represented by a current sample are filled by linearly interpolated values. In an embodiment, when interpolate is 1, the values between the region represented by the previous sample and the region represented by the current sample can be filled by linearly interpolated values.

FIG. 13 illustrates metadata about a viewpoint (point) in a 2D space according to one embodiment of the present invention.

FIG. 13(a) illustrate a configuration of a sample entry of a track storing the viewpoint (point) information in the 2D space and FIG. 13(b) illustrates a configuration of an individual sample for an individual viewpoint (point) to be represented in the 2D space.

The sample entry of the track storing the point information in the 2D space may include reference_width, reference_height, min_x, max_x, min_y and/or max_y.

The reference_width indicates the horizontal size of the 2D space. Here, the horizontal size of the 2D space may be represented in number of pixels.

The reference_height indicates the vertical size of the 2D space. Here, the vertical size of the 2D space may be represented in number of pixels.

The min_x indicates a minimum value of the horizontal coordinate of a point to be presented.

The max_x indicates a maximum value of the horizontal coordinate of the point to be presented.

The min_y indicates a minimum value of the vertical coordinate of the point to be presented.

The max_y indicates a maximum value of the vertical coordinate of the point to be presented.

An individual sample for an individual point to be represented in the 2D space may include x, y and/or interpolate.

The x indicates the horizontal coordinate of a point to be represented.

The y indicates the vertical coordinate of the point to be represented.

The interpolate indicates whether values between a region represented by a previous sample and a region represented by a current sample are filled by linearly interpolated values. In an embodiment, when interpolate is 1, the values between the region represented by the previous sample and the region represented by the current sample can be filled by linearly interpolated values.

<Method of Delivering Region and Viewpoint Information in 3D Space>

Region and viewpoint information in a 3D space may be stored in a single track as timed metadata in ISOBMFF. Embodiments of metadata about region information in a 3D space and metadata about viewpoint (point) information in the 3D space will be sequentially described below.

Here, the 3D space may refer to a sphere and 360-degree video may be represented on the sphere. The aforementioned 2D space may refer to a 3D plane onto which the 3D space is projected/mapped.

FIG. 14 illustrates metadata about region information in a 3D space according to various embodiments of the present invention.

FIG. 14(a) illustrate a configuration of a sample entry of a track storing the region information in the 3D space according to one embodiment of the present invention and FIG. 14(b) illustrates a configuration of a sample entry of a track storing the region information in the 3D space according to another embodiment of the present invention.

Referring to FIG. 14(a), the sample entry of the track storing the region information in the 3D space according to one embodiment of the present invention may include min_yaw, max_yaw, min_pitch, max_pitch, min_roll, max_roll, min_field_of_view and/or max_field_of_view.

The min_yaw indicates a minimum value of a rotation amount with respect to the yaw axis of a region to be represented.

The max_yaw indicates a maximum value of the rotation amount with respect to the yaw axis of the region to be represented.

The min_pitch indicates a minimum value of a rotation amount with respect to the pitch axis of the region to be represented.

The max_pitch indicates a maximum value of the rotation amount with respect to the pitch axis of the region to be represented.

The min_roll indicates a minimum value of a rotation amount with respect to the roll axis of the region to be represented.

The max_roll indicates a maximum value of the rotation amount with respect to the roll axis of the region to be represented.

The min_field_of_view indicates a minimum value of field of view to be represented.

The max_field_of_view indicates a maximum value of field of view to be represented.

When the min_field_of_view and max_field_of_view are set to 0, a region of a sample which refers to the sample entry may be a point.

Referring to FIG. 14(b), the sample entry of the track storing the region information in the 3D space according to another embodiment of the present invention may include center_yaw, center_pitch, center_roll, horizontal_field_of_view and/or vertical_field_of_view.

The center_yaw indicates a center value of a rotation amount with respect to the yaw axis of a region to be represented.

The center_pitch indicates a center value of a rotation amount with respect to the pitch axis of the region to be represented.

The center_roll indicates a center value of a rotation amount with respect to the roll axis of the region to be represented.

The horizontal_field_of_view indicates a value of a horizontal field of view to be represented. This value may be a horizontal field of view based on center_yaw.

The vertical_field_of_view indicates a value of a vertical field of view to be represented. This value may be a vertical field of view based on center_pitch.

When the horizontal_field_of_view and vertical_field_of_view are set to 0, a region of a sample which refers to the sample entry may be a point.

The horizontal_field_of_view and vertical_field_of_view of the corresponding sample entry may be applied to each sample as long as they are not changed in each sample.

In one embodiment, the sample entries of a track storing the region information in the 3D space according to one embodiment and/or another embodiment of the present invention may further include dynamic_range_flag. The dynamic_range_flag can indicate that horizontal and vertical fields of view indicated by a corresponding sample entry are not changed but are maintained for all samples which refer to the sample entry. For example, the dynamic_range_flag can indicate that horizontal and vertical fields of view of the sample entry are maintained in samples which refer to the sample entry when set to 0.

FIG. 15 illustrates metadata about an individual region to be represented in a 3D space according to various embodiments of the present invention.

FIG. 15(a) illustrates a configuration of an individual sample for an individual region to be represented in a 3D space according to one embodiment of the present invention and FIG. 15(b) illustrates a configuration of an individual sample for the individual region to be represented in the 3D space according to another embodiment of the present invention.

Referring to FIG. 15(a), the individual sample for the individual region to be represented in the 3D space according to one embodiment of the present invention may include yaw, pitch, roll, field_of_view and/or interpolate.

The yaw indicates a rotation amount with respect to the yaw axis of the region to be represented.

The pitch indicates a rotation amount with respect to the pitch axis of the region to be represented.

The roll indicates a rotation amount with respect to the roll axis of the region to be represented.

In an embodiment, the yaw and pitch may indicate the center of a viewport and the roll may indicate a roll angle of the viewport.

The field_of_view indicates a field of view to be represented. The field of view may be subdivided into horizontal_field_of_view and vertical_field_of_view.

The horizontal_field_of_view indicates a value of a horizontal field of view to be represented. This value may be a horizontal field of view based on center_yaw.

The vertical_field_of_view indicates a value of a vertical field of view to be represented. This value may be a vertical field of view based on center_pitch.

The interpolate indicates whether values between a region represented by a previous sample and a region represented by a current sample are filled by linearly interpolated values. In an embodiment, when interpolate is 1, the values between the region represented by the previous sample and the region represented by the current sample can be filled by linearly interpolated values.

Referring to FIG. 15(b), the individual sample for the individual region to be represented in the 3D space according to another embodiment of the present invention may include yaw, pitch, roll and/or interpolate.

The yaw indicates a rotation amount with respect to the yaw axis of the region to be represented.

The pitch indicates a rotation amount with respect to the pitch axis of the region to be represented.

The roll indicates a rotation amount with respect to the roll axis of the region to be represented.

The interpolate indicates whether values between a region represented by a previous sample and a region represented by a current sample are filled by linearly interpolated values. In an embodiment, when interpolate is 1, the values between the region represented by the previous sample and the region represented by the current sample can be filled by linearly interpolated values.

<Method of Signaling Relationship Between Metadata Track with Respect to Region Information or Viewpoint Information and 360-Degree Video Track>

A metadata track regarding region information or viewpoint information and a 360-degree video track to which such metadata will be applied may be signaled through the following method.

First, a method of signaling a relationship between 360-degree video tracks will be described.

In an embodiment, when one video frame is divided into one or more regions, the regions are coded and data about the regions are delivered through one or more tracks, 360-degree video related metadata about each track may be included in the form of box. Here, the 360-degree video related metadata may be the 360-degree video related metadata described above with reference to FIGS. 2, 3, 4 and 8. When the 360-degree video related metadata is included in the form of box, the 360-degree video related metadata may be defined as OMVideoConfigurationBox class. OMVideoConfigurationBox may be called an omvb box. The 360-degree video related metadata may be included in various levels such as a file, a fragment, a track, a sample entry and a sample and delivered and may provide metadata about data of the level corresponding thereto (track, stream, sample, etc.).

When only some specific tracks include OMVideoConfigurationBox and the remaining tracks do not include OMVideoConfigurationBox, signaling through which the remaining tracks can refer to the tracks including OMVideoConfigurationBox is needed. To this end, information indicating the tracks including OMVideoConfigurationBox may be included in TrackReferenceTypeBox of the remaining tracks which do not include OMVideoConfigurationBox. According to an embodiment, a track reference type of "omvb" may be defined and tracks including 360-degree video related metadata may be indicated through track IDs included in the corresponding TrackReferenceTypeBox.

Next, a method of signaling a relationship between a metadata track regarding region information or viewpoint information and a 360-degree video track will be described.

The metadata track regarding region information or viewpoint information may be stored and delivered separately from the 360-degree video track. In other words, metadata about region information or viewpoint information may be delivered through a track separated from the 360-degree video track. When the metadata about region information or viewpoint information is included in a track and delivered in this manner, referencing between the track including the metadata about region information or viewpoint information and the 360-degree video track related to the metadata track may be required.

According to an embodiment, referencing between the metadata track about region information or viewpoint information and the 360-degree video track related to the metadata track may be performed using "cdsc" reference type defined in TrackReferenceBox('tref') which is one of boxes of the ISOBMFF.

According to another embodiment, referencing between the metadata track about region information or viewpoint information and the 360-degree video track related to the metadata track may be performed by newly defining a reference type of "vdsc" in TrackReferenceBox('tref').

FIG. 16 illustrates a tref box according to an embodiment of the present invention.

The TrackReference('tref') box provides a reference between tracks included therein and other tracks. The TrackReference('tref') box may include a predetermined reference type and one or more track reference type boxes having IDs.

Track_ID may be an integer which provides a reference for other tracks in presentation in the track corresponding thereto. The track_ID is not reused and cannot be 0.

Reference_type may be set to one of the following values. Further, the reference_type may be set to values which are not defined in the following.

A track referred to by "hint" may include original media of the corresponding hint track.

A "cdsc" track describes a referred track. This track may include timed metadata about a reference track.

A "font" track may use a font delivered/defined in a referenced track.

A "hind" track depends on a referenced hint track. That is, this track can be used when the referenced hint track is used.

A "vdep" track may include auxiliary depth video information about a referenced video track.

A "vplx" track may include auxiliary parallax video information about a referenced video track.

A "subt" track may include subtitle, timed text and/or overlay graphic information about a referenced track or all tracks of a substitute group including the corresponding track.

A "vdsc" track may be a reference type which correlates a metadata track delivering region information with a 360 video track. In one embodiment, a track including the tref box having this reference_type may be a metadata track which delivers region information or viewpoint information. Here, track_IDs included in the tref box can reference the 360 video track. In another embodiment, a track including the tref box having this reference_type may be a 360 video track. Here, track_IDs included in the tref box can reference a metadata track which delivers region information or viewpoint information.

In addition, a reference type of "cdsc" may be used in order to reference a metadata track about region information or viewpoint information and a 360-degree video track related to the metadata track.

That is, to reference the metadata track about region information or viewpoint information and the 360-degree video track related to the metadata track, the reference type of "cdsc" or "vdsc" may be used.

<GPS Information Delivery Method>

GPS information may be stored in a single track as timed metadata in the ISOBMFF. A description will be given of embodiments of metadata about GPS information.

FIG. 17 illustrates metadata about GPS according to an embodiment of the present invention.

FIG. 17(a) illustrates a configuration of a sample entry of a track which stores GPS information according to an embodiment of the present invention, FIG. 17(b) illustrates a configuration of an individual sample which stores GPS data according to an embodiment of the present invention and FIG. 17(c) illustrates a configuration of an individual sample which stores GPS data according to another embodiment of the present invention.

The sample entry of the track which stores the GPS information may include coordinate_reference_sys and/or altitude_flag.

The coordinate_reference_sys indicates a coordinate reference system (CRS) with respect to latitude, longitude and altitude values included in the sample. The coordinate_reference_sys may be represented as a URI (Uniform Resource Identifier). For example, the coordinate_reference_sys can indicate "urn:ogc:def:crs:EPSG::4979". Here, "urn:ogc:def:crs:EPSG::4979" can indicate a coordinate reference system (CRS) having code 4979 in an EPSG database.

The altitude_flag indicates whether the sample includes an altitude value. In one embodiment, the altitude_flag may indicate that the sample includes an altitude value when set to 1 and indicate that the sample does not include an altitude value when set to 0.

GPS data may be stored in an individual sample. Embodiments with respect to a configuration of GPS data which can be stored in an individual sample are shown in FIGS. 17(b) and 17(c).

FIG. 17(b) illustrates a configuration of an individual sample which stores GPS data according to an embodiment of the present invention. A GPS data sample shown in FIG. 7(b) may include longitude, latitude and/or altitude.

The longitude indicates a longitude value of a point. A positive value may indicate an eastern longitude and a negative value may indicate a western longitude.

The latitude indicates a latitude value of the point. A positive value may indicate a northern latitude and a negative value may indicate a southern latitude.

The altitude indicates an altitude value of the point. In one embodiment, when the altitude flag of a sample entry indicates that the sample includes an altitude value (ex. altitude flag=1), the sample may include an altitude. In another embodiment, when the altitude flag of the sample entry indicates that the sample does not include an altitude value (ex. altitude flag=0), the sample may not include an altitude. An embodiment in which a sample does not include an altitude is described with reference to FIG. 17(c).

FIG. 17(c) illustrates a configuration of an individual sample which stores GPS data according to another embodiment of the present invention. A GPS data sample illustrated in FIG. 17(c) may include longitude and/or latitude. The GPS data sample illustrated in FIG. 17(c) may not include altitude.

The longitude indicates a longitude value of a point. A positive value may indicate an eastern longitude and a negative value may indicate a western longitude.

The latitude indicates a latitude value of the point. A positive value may indicate a northern latitude and a negative value may indicate a southern latitude.

<Method of Signaling Relationship Between GPS Information Delivery Metadata Track and 360-Degree Video Track>

A metadata track regarding GPS information and a 360-degree video track to which such metadata will be applied may be signaled through the following method.

First, a method of signaling a relationship between 360-degree video tracks will be described.

In one embodiment, when one video frame is divided into one or more regions, the regions are coded and data about the regions are delivered through one or more tracks, 360-degree video related metadata about each track may be included in the form of box. Here, the 360-degree video related metadata may be the 360-degree video related metadata describe above with reference to FIGS. 2, 3, 4 and 8. When the 360-degree video related metadata is included in the form of box, the 360-degree video related metadata may be defined as OMVideoConfigurationBox class. OMVideoConfigurationBox may be called an omvb box. The 360-degree video related metadata may be included in various levels such as a file, a fragment, a track, a sample entry and a sample and delivered and may provide metadata about data of the level corresponding thereto (track, stream, sample, etc.).

When only some specific tracks include OMVideoConfigurationBox and the remaining tracks do not include OMVideoConfigurationBox, signaling through which the remaining tracks can refer to the tracks including OMVideoConfigurationBox is needed. To this end, information indicating the tracks including OMVideoConfigurationBox may be included in TrackReferenceTypeBox of the remaining tracks which do not include OMVideoConfigurationBox. According to an embodiment, a track reference type of "omvb" may be defined and tracks including 360-degree video related metadata may be indicated through track IDs included in the corresponding TrackReferenceTypeBox.

Next, a method of signaling a relationship between a metadata track regarding GPS information and a 360-degree video track will be described.

The metadata track regarding GPS information may be stored and delivered separately from the 360-degree video track. In other words, metadata about GPS information may be delivered through a track separated from the 360-degree video track. When the metadata about GPS information is included in a track and delivered in this manner, referencing between the track including the metadata about GPS information and the 360-degree video track related to the metadata track may be required.

According to an embodiment, referencing between the metadata track about GPS information and the 360-degree video track related to the metadata track may be performed using "cdsc" reference type defined in TrackReferenceBox ('tref') which is one of boxes of the ISOBMFF.

According to another embodiment, referencing between the metadata track about GPS information and the 360-degree video track related to the metadata track may be performed by newly defining a reference type of "gpsd" in TrackReferenceBox('tref').

Referring back to FIG. 16, FIG. 16 illustrates a tref box according to an embodiment of the present invention.

The TrackReference('tref') box provides reference between tracks included therein and other tracks. The TrackReference('tref') box may include a predetermined reference type and one or more track reference type boxes having IDs. Here, "gpsd" may be newly defined and used as a reference type.

A track_ID may be an integer which provides reference for other tracks in presentation in the track corresponding thereto. The track_ID is not reused and cannot be 0.

A reference_type may be set to one of the following values. Further, the reference_type may be set to values which are not defined in the following.

A track referred to by "hint" may include original media of the corresponding hint track.

A "cdsc" track describes a referred track. This track may include timed metadata about a reference track.

A "font" track may use a font delivered/defined in a referred track.

A "hind" track depends on a referenced hint track. That is, this track can be used when the referenced hint track is used.

A "vdep" track may include auxiliary depth video information about a referenced video track.

A "vplx" track may include auxiliary parallax video information about a referenced video track.

A "subt" track may include subtitles, timed text and/or overlay graphic information about a referenced track or all tracks of a substitute group including the corresponding track.

A "gpsd" track may be a reference type which correlates a metadata track delivering GPS information with a 360 video track. In one embodiment, a track including the tref box having this reference_type may be a metadata track which delivers GPS information. Here, track_IDs included in the tref box can reference the 360 video track. In another embodiment, a track including the tref box having this reference_type may be a 360 video track. Here, track_IDs included in the tref box can reference a metadata track which delivers GPS information.

In addition, a reference type of "cdsc" may be used in order to reference a metadata track about GPS information and a 360-degree video track related to the metadata track.

That is, to reference the metadata track about GPS information and the 360-degree video track related to the metadata track, the reference type of "cdsc" or "vdsc" may be used.

The methods disclosed in the specification can be applied to a case in which a file with respect to content supporting 360 video services is generated on the basis of a box based file format such as ISOBMFF, a DASH segment which can operate in MPEG DASH is generated or an MPU which can operate in an MPEG MMT is generated. In addition, a receiver including a DASH client or an MMT client may effectively decode and display the content on the basis of 360 video related metadata (flags, parameters, etc.).

The aforementioned sample entries and/or samples (e.g., 2DReagionCartesianCoordinatesSampleEntry, 2DPointCartesianCoordinatesSampleEntry, 3DCartesianCoordinatesSampleEntry, and GPSSampleEntry) for metadata about region information or viewpoint information and/or metadata about GPS information may be simultaneously present in a single ISOBMFF filed, a DASH segment or multiple boxes in an MMT MPU.

In this case, values of 360 video related flags or 360 video metadata defined in a lower box may override values of metadata about region information or viewpoint information and/or GPS information defined in an upper box.

A description will be given of embodiments related to methods of transmitting and signaling metadata about region information or viewpoint information, described above with reference to FIGS. 12 to 16, on the basis of DASH.

<Methods of Transmitting and Signaling Metadata about Region Information or Viewpoint Information Using DASH>

Embodiment of Configuring Additional Adaptation Set for Metadata Transmission

When metadata about region information or viewpoint information is transmitted through DASH, an additional adaptation set for metadata transmission may be configured. In this case, signaling for indicating transmission of the metadata about region information or viewpoint information through the additional adaptation set needs to be included in an MPD. In an embodiment, a role descriptor may be used as signaling for indicating transmission of the metadata about region information or viewpoint information through the additional adaptation set.

A new schemeIdUri value may be allocated to discriminate a role scheme from the conventional role scheme in the MPD. For example, a new schemeIdUri value such as "urn:mpeg:dash:role:201X" can be allocated for the role scheme. "dirc" may be allocated to such a new scheme as a value for indicating the metadata about region information or viewpoint information. Here, "dirc" allocated as a value for indicating the metadata about region information or viewpoint information is exemplary and values other than "dirc" may be allocated. In the case of an adaptation set for transmission of VR video or 360 video, "main" may be allocated to the value.

To signal a relationship between a representation for VR video transmission and a representation for transmission of metadata about region information or viewpoint information, Representation@associationId and associationType may be used. The representation for transmission of metadata about region information or viewpoint information may indicate id ("VR_video") of the representation for transmission of VR video to which the metadata will be applied using associationId, and "dirc" may be allocated as associationType therein. Here, "dirc" may be newly defined as a value indicating the metadata about region information or viewpoint information. This method may be used to represent a relationship between tracks of the ISO BMFF (ISO Base Media File Format) in addition to DASH. That is, track_IDs of the "tref" box may be used instead of associationId and reference_type of the "tref" box may be used instead of associationType for the same purpose.

FIG. 18 illustrates an MPD which signals transmission of metadata about region information or viewpoint information according to an embodiment of the present invention.

Referring to FIG. 18, the MPD includes signaling for indicating transmission of metadata about region information or viewpoint information through an additional adaptation set.

In addition, in the embodiment illustrated in FIG. 18, a role descriptor is used as signaling for indicating transmission of metadata about region information or viewpoint information through an additional adaptation set.

In the embodiment illustrated in FIG. 18, "urn:mpeg:dash:role:201X" is allocated to the role scheme and "dirc" is allocated to the value in order to indicate transmission of the metadata about region information or viewpoint information through the additional adaptation set (H18020). In the case of an adaptation set for VR video transmission, "urn:mpeg:dash:role:2011" is allocated to the role scheme and "main" is allocated to the value (H18010).

Furthermore, in the embodiment illustrated in FIG. 18, Representation@ associationId and associationType are used in order to signal a relationship between a representation for VR video transmission and a representation for transmission of the metadata about region information or viewpoint information. The representation (representation id="directors_cut") for transmission of the metadata about region information or viewpoint information indicates id ("VR_video") of the representation for transmission of VR video to which the metadata will be applied using associationId, and "dirc" is allocated as associationType therein (H18030).

As in the embodiment of FIG. 18, a new role scheme may be defined in order to signal transmission of metadata about region information or viewpoint information. Alternatively, a method compatible with the conventional role scheme may be used in order to signal transmission of metadata about region information or viewpoint information.

FIG. 19 illustrates an MPD which signals transmission of metadata about region information or viewpoint information according to another embodiment of the present invention.

Referring to FIG. 19, the MPD includes signaling for indicating transmission of metadata about region information or viewpoint information through an additional adaptation set.

Referring to FIG. 19, "urn:mpeg:dash:role:2011" is allocated to the role scheme and "metadata" is allocated to the value (H19020). In the case of an adaptation set for VR video transmission, "urn:mpeg:dash:role:2011" is allocated to the role scheme and "main" is allocated to the value (H19010). That is, the embodiment of FIG. 19 may be regarded as an embodiment in which the conventional adaptation set identification method (Role@schemeIdUri="urn:mpeg:dash:role:2011", value="metadata") for metadata transmission is applied to identification of an adaptation set for transmission of metadata about region information or viewpoint information.

In addition, in the embodiment illustrated in FIG. 19, Representation@ associationId and associationType are used in order to signal a relationship between a representation for VR video transmission and a representation for transmission of the metadata about region information or viewpoint information. The representation (representation id="directors_cut") for transmission of the metadata about region information or viewpoint information indicates id ("VR_video") of the representation for transmission of VR video to which the metadata will be applied using associationId, and "dirc" is allocated as associationType therein (H19030).

A description will be given of receiver operation related to the methods of transmitting and signaling metadata about region information or viewpoint information through an additional adaptation set, described above with reference to FIGS. 18 and 19.

Figure 20:
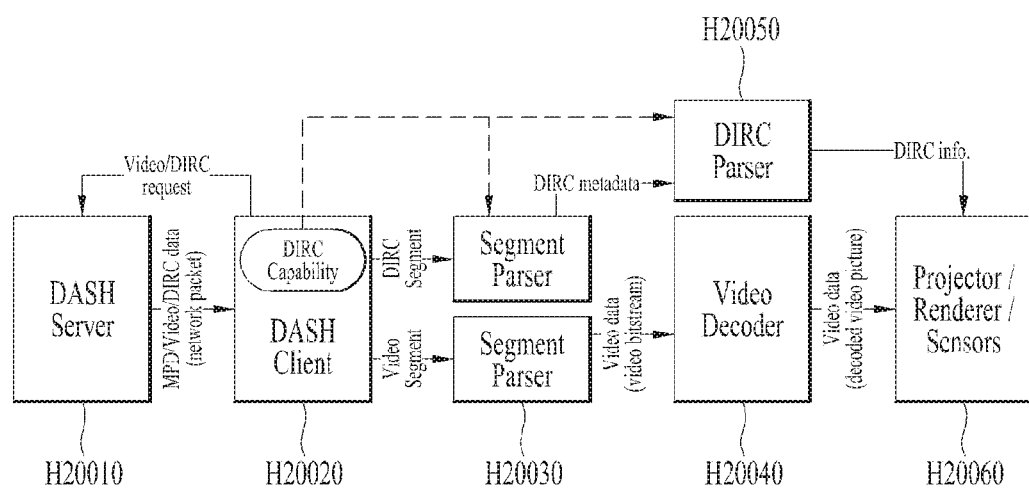
FIG. 20 is a block diagram of a receiver according to one embodiment of the present invention.

FIG. 20 is a block diagram of a receiver according to an embodiment of the present invention.

Referring to FIG. 20, the receiver according to an embodiment of the present invention may include a DASH client H20020, segment parsers H20030, a video decoder H20040, a DIRC parser H20050 and/or a projector/renderer/sensors H20060.

An MPD, VR content and/or metadata about region information or viewpoint information may be provided by a DASH server H20010 and received by the DASH client H20020. Here, the DASH client H20020 of the receiver may receive VR content, MPD and/or metadata about region information or viewpoint information in a data packet format from the DASH server H20010. The DASH client H20020 may request the MPD, VR content and/or metadata about region information or viewpoint information from the DASH server H20010. The DASH client H20020 may generate an MPD and a segment from a received packet.

The DASH client H20020 may parse the received MPD to acquire information about content (VR content). Here, the DASH client H20020 may recognize presence or absence of the metadata about region information or viewpoint information through signaling with respect to an adaptation set through which the metadata about region information or viewpoint information is transmitted, described above with reference to FIGS. 18 and 19. In addition, the DASH client H20020 may activate the DIRC parser and the segment parser for DIRC depending on capabilities of the receiver and/or purpose of use of the content (refer to the dotted line of the figure). For example, when the receiver cannot process the metadata about region information or viewpoint information or does not use the metadata about region information or viewpoint information according to purpose, the adaptation set through which the metadata about region information or viewpoint information is transmitted may not be used (may be skipped). The segment may be delivered to the segment parser H20030.

The segment parser H20030 may parse the received segment and respectively deliver a video bitstream and metadata (DIRC metadata) about region information or viewpoint information to the video decoder H20040 and the DIRC parser H20050. The segment parser H20030 may be functionally classified according to parsing target. That is, the segment parser H20030 may be classified into a segment parser for parsing a segment for video and a segment parser for metadata about region information or viewpoint information.

The video decoder H20040 may decode the video bitstream and deliver the decoded video bitstream to the projector/renderer/sensors H20060.

The DIRC parser H20050 may parse the DIRC metadata and deliver the parsed information (DIRC info) to the projector/renderer/sensors H20060.

The projector/renderer/sensors H20060 may receive the video bitstream from the video decoder H20040 and receive the DIRC metadata from the DIRC parser H20050. In addition, the projector/renderer/sensors H20060 may provide video data to a user using the DIRC information. A method through which the projector/renderer/sensors H20060 provide VR content to the user using the DIRC information may depend on application. For example, a viewpoint intended by a producer and indicated by DIRC can be displayed to the user through auto navigation. As another example, VR content can be displayed depending on the viewpoint of the user with direction indication for guiding the viewpoint intended by the producer.

FIG. 21 illustrates an MPD which signals transmission of metadata about region information or viewpoint information according to another embodiment of the present invention.

In the embodiment illustrated in FIG. 21, VR video is composed of two or more spatial regions and is transmitted through two or more adaptation sets, distinguished from the embodiments of FIGS. 18 and 19. In the example of FIG. 21, the VR video is divided into a left spatial region and a right spatial region which respectively correspond to VR video tiles. The two VR video tiles correspond to two adaptation sets. A spatial relationship between the two VR video tiles is described through SRD (SupplementalProperty@schemeIdUri="urn:mpeg:dash:srd:2014"). More specifically, spatial information of the VR video tile corresponding to the left spatial region is described through <SupplementalProperty schemeIdUri="urn:mpeg:dash:srd:2014" value="1, 0, 0, 1920, 1920, 3840, 1920, 0"/>(H21010) and spatial information of the VR video tile corresponding to the right spatial region is described through <supplementalProperty schemeIdUri="urn:mpeg:dash:srd:2014" value="1, 0, 1920, 1920, 1920, 3840, 1920, 0"/>(H21020).

In addition, the metadata about region information or viewpoint information may be identified through Role@value="dirc" or "metadata" as in the embodiments of FIGS. 18 and 19. In the present embodiment, a new role scheme is defined and Role@value="dirc" is allocated to identify the metadata about region information or viewpoint information is used as in the embodiment of FIG. 18 (H21030).

Representation@ associationId may indicate representations of VR video tiles corresponding to two or more spatial regions or a single representation (representation for transmission of a base tile track). The present embodiment indicates VR video tile 1 and VR video type 2 corresponding to two spatial regions (H21040).

A description will be given of receiver operation related to the method of transmitting and signaling metadata about region information or viewpoint information in the embodiment in which VR video is divided into two or more spatial regions and transmitted through two or more adaptation sets, described with reference to FIG. 21.

FIG. 22 is a block diagram of a receiver according to another embodiment of the present invention.

Referring to FIG. 22, the receiver according to another embodiment of the present invention may include a DASH client H22020, segment parsers H22030, a video decoder H22040, a DIRC parser H22050 and/or a projector/renderer/sensors H22060.

An MPD, VR content and/or metadata about region information or viewpoint information may be provided by a DASH server H22010 and received by the DASH client H22020. Here, the DASH client H22020 of the receiver may receive VR content, MPD and/or metadata about region information or viewpoint information in a data packet format from the DASH server H22010. The DASH client H22020 may request the MPD, VR content and/or metadata about region information or viewpoint information from the DASH server H22010. The DASH client H22020 may generate an MPD and a segment from a received packet.

In the embodiment of FIG. 22, the data packet transmitted from the DASH sever H22010 may be part of spatial regions (e.g., VR video tile) of VR video. That is, VR video content transmitted from the DASH server H22010 may correspond to a spatial region (tile) including the initial viewpoint of the user or a spatial region (tile) including a viewpoint or region intended by a producer, which is indicated by information (DIRC info) delivered from the DIRC parser H22050 which will be described below.

The DASH client H22020 may parse the received MPD to acquire information about content (VR content). Here, the DASH client H22020 may recognize presence or absence of the metadata about region information or viewpoint information through signaling with respect to an adaptation set through which the metadata about region information or viewpoint information is transmitted, described above with reference to FIG. 20. In addition, the DASH client H22020 may activate the DIRC parser and the segment parser for DIRC depending on capabilities of the receiver and/or purpose of use of the content (refer to the dotted line of the figure). For example, when the receiver cannot process the metadata about region information or viewpoint information or does not use the metadata about region information or viewpoint information according to purpose, the adaptation set through which the metadata about region information or viewpoint information is transmitted may not be used (may be skipped). The segment may be delivered to the segment parser H22030.

The segment parser H22030 may parse the received segment and respectively deliver a video bitstream and metadata (DIRC metadata) about region information or viewpoint information to the video decoder H22040 and the DIRC parser H22050. The segment parser H22030 may be functionally classified according to parsing target. That is, the segment parser H22030 may be classified into a segment parser for parsing a segment for video and a segment parser for metadata about region information or viewpoint information.

The video decoder H22040 may decode the video bitstream and deliver the decoded video bitstream to the projector/renderer/sensors H22060.

The DIRC parser H22050 may parse the DIRC metadata and deliver the parsed information (DIRC info) to the projector/renderer/sensors H22060.

In addition, the DIRC parser H22050 may deliver the parsed information (DIRC info) to the DASH client H22010. The information (DIRC info) delivered to the DASH client H22010 may be used for the DASH client H22010 to select an adaptation set corresponding to a spatial region (tile) including the viewpoint or region intended by the producer.

The projector/renderer/sensors H22060 may receive the video bitstream from the video decoder H22040 and receive the DIRC metadata from the DIRC parser H22050. In addition, the projector/renderer/sensors H22060 may provide video data to a user using the DIRC information. A method through which the projector/renderer/sensors H22060 provide VR content to the user using the DIRC information may depend on application. For example, a viewpoint intended by a producer and indicated by DIRC can be displayed to the user through auto navigation. As another example, VR content can be displayed depending on the user's gaze with direction indication for guiding the viewpoint intended by the producer.

In the embodiments described with reference to FIGS. 18 to 22, an adaptation set for transmitting and signaling VR video and an adaptation set for transmitting and signaling metadata are separately present.

A description will be given of embodiments of transmitting and signaling VR video and metadata together in a single adaptation set with reference to FIGS. 23 to 25.

Embodiments of Transmitting Video and Metadata in Single Adaptation Set

Metadata about viewpoint information or region information may be transmitted together with VR video in a single adaptation set, distinguished from the cases described with reference to FIGS. 18 to 22. In this case, video data and metadata may be transmitted through a single file (segment or ISO BMFF). In a specific embodiment, VR video and metadata may be configured as separate tracks in a single file or configured as a single video file including the metadata.

An embodiment in which VR video and metadata are configured as separate tracks in a single file and an embodiment in which a single video track including the metadata is configured will be sequentially described below.

FIG. 23 illustrates an MPD which signals transmission of metadata about region information or viewpoint information according to another embodiment of the present invention.

The embodiment of FIG. 23 corresponds to the embodiment in which VR video and the metadata about region information or viewpoint information are configured as separate tracks in a single file. The VR video and the metadata about region information or viewpoint information are configured as separate tracks in a single adaptation set and a single file and transmitted.

In the embodiment of FIG. 23, the VR video track and the metadata track may be identified by ContentComponent which is a lower element of AdaptationSet in the MPD and may have contentType of "video" and "application" (H23010 and H23020). The ContentComponent may have Role as a lower element and the Role is used to indicate whether the VR video and/or the metadata (metadata about region information or viewpoint information) are transmitted through the aforementioned method of transmitting metadata through an additional adaptation set. That is, for VR video, "urn:mpeg:dash:role:2011" may be allocated to the role scheme and "main" may be allocated to the value. In the case of metadata about region information or viewpoint information, "urn:mpeg:dash:role:201x" may be allocated to the role scheme and "dirc" may be allocated to the value or "urn:mpeg:dash:role:2011" may be allocated to the role scheme and "metadata" may be allocated to the value.

In the case of the embodiment of FIG. 23, "urn:mpeg:dash:role:2011" is allocated to the role scheme and "main" is allocated to the value for the VR video (H23030) and "urn:mpeg:dash:role:201x" is allocated to the role scheme and "dirc" is allocated to the value for the metadata about region information or viewpoint information (H23040).

FIG. 24 illustrates an MPD which signals transmission of metadata about region information or viewpoint information according to another embodiment of the present invention.

In the embodiment of FIG. 24, VR video and metadata about region information or viewpoint information are configured as a single track. The VR video and the metadata about region information or viewpoint information are configured as a single track in a single adaptation set and a single file.

A single file may basically include a single video track. The metadata about region information or viewpoint information may be stored in the form of metadata attached to a track such as sample group description. In this case, the MPD may include a single adaptation set including video and metadata and two roles for respectively indicating whether the video and the metadata are transmitted. That is, "urn:mpeg:dash:role:2011" may be allocated to the role scheme and "main" may be allocated to the value in the case of the VR video. In addition, "urn:mpeg:dash:role:201x" may be allocated to the role scheme and "dirc" may be allocated to the value or "urn:mpeg:dash:role:2011" may be allocated to the role scheme and "metadata" may be allocated to the value in the case of the metadata about region information or viewpoint information.

In the embodiment of FIG. 24, ContentComponent for identifying the VR video and the metadata is not present as a lower element of the Adaptation Set, distinguished from the embodiment of FIG. 23.

In the case of the embodiment of FIG. 24, "urn:mpeg:dash:role:2011" is allocated to the role scheme and "main" is allocated to the value for the VR video (H24030) and "urn:mpeg:dash:role:201x" is allocated to the role scheme and "dirc" is allocated to the value for the metadata about region information or viewpoint information (H24040).

A description will be given of receiver operation related to the method of transmitting and signaling metadata about region information or viewpoint information through a single adaptation set described above with reference to FIGS. 23 and 24.

FIG. 25 is a block diagram of a receiver according to another embodiment of the present invention.

Referring to FIG. 25, the receiver according to another embodiment of the present invention may include a DASH client H25020, a segment parser H25030, a video decoder H25040, a DIRC parser H25050 and/or a projector/renderer/sensors H25060.

An MPD, VR content and/or metadata about region information or viewpoint information may be provided by a DASH server H25010 and received by the DASH client H25020. Here, the DASH client H25020 of the receiver may receive VR content, MPD and/or metadata about region information or viewpoint information in a data packet format from the DASH server H25010. The DASH client H25020 may request the MPD, VR content and/or metadata about region information or viewpoint information from the DASH server H25010. The DASH client H25020 may generate an MPD and a segment from a received packet.

The DASH client H25020 may parse the received MPD to acquire information about content (VR content). Here, the DASH client H25020 may recognize presence or absence of the metadata about region information or viewpoint information through signaling with respect to an adaptation set through which the metadata about region information or viewpoint information is transmitted, described above with reference to FIGS. 23 and 24. In addition, the DASH client H25020 may activate the DIRC parser and the segment parser for DIRC depending on capabilities of the receiver and/or purpose of use of the content (refer to the dotted line of the figure). For example, when the receiver cannot process the metadata about region information or viewpoint information or does not use the metadata about region information or viewpoint information according to purpose, the adaptation set through which the metadata about region information or viewpoint information is transmitted may not be used (may be skipped). The segment may be delivered to the segment parser H25030.

The segment parser H25030 may parse the received segment and respectively deliver a video bitstream and metadata (DIRC metadata) about region information or viewpoint information to the video decoder H25040 and the DIRC parser H25050. The segment parser H25030 may be functionally classified according to parsing target. That is, the segment parser H25030 may be classified into a segment parser for parsing a segment for video and a segment parser for metadata about region information or viewpoint information.

The video decoder H25040 may decode the video bitstream and deliver the decoded video bitstream to the projector/renderer/sensors H25060.

The DIRC parser H25050 may parse the DIRC metadata and deliver the parsed information (DIRC info) to the projector/renderer/sensors H25060.

The projector/renderer/sensors H25060 may receive the video bitstream from the video decoder H25040 and receive the DIRC metadata from the DIRC parser H25050. In addition, the projector/renderer/sensors H25060 may provide video data to a user using the DIRC information. A method through which the projector/renderer/sensors H25060 provide VR content to the user using the DIRC information may depend on application. For example, a viewpoint intended by a producer and indicated by DIRC can be displayed to the user through auto navigation. As another example, VR content can be displayed depending on the viewpoint of the user with direction indication for guiding the viewpoint intended by the producer.

<Method of Transmitting and Signaling Metadata about Region Information or Viewpoint Information Using MPEG-2 TS>

The metadata about region information or viewpoint information described with reference to FIGS. 12 to 16 may be transmitted through an MPEG-2 TS. More specifically, the metadata about region information or viewpoint information may be transmitted through a packetized elementary stream packet (PES packet) or an adaptation field of a transport stream (TS).

An embodiment in which the metadata about region information or viewpoint information is transmitted through a PES packet having a unique PID and an embodiment in which the metadata about region information or viewpoint information is transmitted through an adaptation field of a TS will be sequentially described below.

Embodiment of Transmitting Metadata Through PES

According to an embodiment, the metadata about region information or viewpoint information may be transmitted through a PES packet through the following method. A stream ID stream_id of the PES packet including the metadata about region information or viewpoint information may be set to indicate a private stream and the stream type stream_type of the private stream may be set to indicate a metadata stream regarding region information or viewpoint information.

FIG. 26 illustrates a stream ID and information on a stream allocated to the stream ID, FIG. 27 illustrates a stream type and part of information on a stream allocated to the stream type, and FIG. 28 illustrates an access unit transmitted through a PES packet.

Referring to FIG. 26, when stream_id is "1011 1101", a stream corresponding thereto indicates private_stream_1. When stream_id="1011 1101" and stream_type is "0x27", a stream (VR director's cut information stream) corresponding thereto is a stream related to the metadata about region information or viewpoint information (refer to note 11 of FIG. 26). Referring to FIG. 27, when stream_type is "0x27", a stream corresponding thereto is a stream (VR director's cut information stream) related to the metadata about region information or viewpoint information.

FIG. 28 illustrates a configuration of an access unit transmitted through a single PES packet. The access unit (VDCI_AU) shown in FIG. 28 includes vdci_descriptor( ) and vdci_descriptor( ) may include the metadata about region information or viewpoint information. vdci_descriptor( ) will be described below.

Embodiment of Transmitting Metadata in Adaptation Field

According to an embodiment, the metadata about region information or viewpoint information may be transmitted through an adaptation field of a TS through the following method. When the metadata about region information or viewpoint information is included in the adaptation field and transmitted, presence or absence of a descriptor including the metadata about region information or viewpoint information may be indicated using a flag field, and when the flag field indicates presence of the descriptor including the metadata about region information or viewpoint information, the descriptor including the metadata about region information or viewpoint information may be included in the adaptation field.

FIG. 29 illustrates an adaptation field according to an embodiment of the present invention.

Referring to FIG. 29, the adaptation field includes vcdi_descriptor_not_present_flag. The vcdi_descriptor_not_present_flag indicates presence or absence of vcdi_descriptor( ). In the embodiment illustrated in FIG. 29, when the vcdi_descriptor_not_present_flag is set to 0, vcdi_descriptor( ) is present in adaptation_filed( ).

Whether a TS component can include the metadata about region information or viewpoint information in the adaptation field can be indicated through an extension descriptor. When extension_descriptor_tag is allocated to a preset value, the extension_descriptor_tag can indicate that the adaptation field of the component can include a descriptor with respect to the metadata about region information or viewpoint information.

FIG. 30 illustrates an extension descriptor according to an embodiment of the present invention, FIG. 31 illustrates values of an extension descriptor tag included in the extension descriptor and description of the values, and FIG. 32 illustrates a vdci extension descriptor according to an embodiment of the present invention.

Referring to FIG. 30, the extension descriptor according to an embodiment of the present invention may include a descriptor tag, a descriptor length and the extension descriptor tag and include a descriptor depending on a value of the extension descriptor tag.

The descriptor tag may indicate the present descriptor. In the embodiment illustrated in FIG. 30, the descriptor tag may be set to a value indicating the extension descriptor. In a specific embodiment, the descriptor tag may be set to "63" to indicate the extension descriptor. Here, a specific value of the descriptor tag may depend on embodiments.

The descriptor length may describe the length of the corresponding descriptor in bytes.

The extension descriptor tag may indicate a specific descriptor included in the extension descriptor.

Referring to FIG. 31, a value of the extension descriptor tag indicates a specific descriptor included in the extension descriptor. As illustrated in FIGS. 30 and 31, the extension descriptor includes an ObjectDescriptorUpdate descriptor when the extension descriptor tag is 0x02. The extension descriptor includes HEVC_timing_and_HRD_descriptor when the extension descriptor tag is 0x03. The extension descriptor includes af_extension_descriptor when the extension descriptor tag is 0x04. The extension descriptor includes vdci_extension_descriptor when the extension descriptor tag is 0x05.

FIG. 32 illustrates vdci_extension_descriptor according to an embodiment of the present invention.

The vdci_extenstions_descriptor according to an embodiment of the present invention may include a vdci descriptor type.

The vdci descriptor type indicates a type of a vdci descriptor which will be described below. For example, when the vdci descriptor type "0x01", the vdci descriptor is 2d_vcdi_descriptor( ). When the vdci descriptor type is "0x02", the vdci descriptor is spherical_vcdi_descriptor( ).

FIGS. 33 and 34 illustrate vdci descriptors according to an embodiment of the present invention.

More specifically, FIG. 33 illustrates a 2D vdci descriptor according to an embodiment of the present invention and FIG. 34 illustrates a spherical vcdi descriptor according to an embodiment of the present invention.

Referring to FIG. 33, a 2D vdci descriptor according to an embodiment of the present invention is shown.

The 2d_vcdi_descriptor may include 2d_vcdi_descr_tag, 2d_vdci_descr_length, reference_region_flag, duration_flag, next_vcdi_flag, reference_width, reference_height, top_left_x, top_left_y, width, height, interpolate, duration, next_top_left_x, next_top_left_y, next_width, next_height and/or next_interpolate.

The 2d_vcdi_descr_tag indicates the 2D vdci descriptor by allocating a unique value thereto.

The 2d_vdci_descr_length indicates the length of the 2D vdci descriptor in bytes.

The reference_region_flag indicates presence or absence of reference_width and reference_height fields. In an embodiment, when the reference_region_flag is set to 1, the reference_region_flag indicates presence of the reference_width and reference_height fields.

The duration_flag indicates presence or absence of a duration field. In an embodiment, the duration_flag indicates presence of the duration field when set to 1.

The next_vcdi_flag indicates presence or absence of next_top_left_x, next_top_left_y, next_width and next_height fields. In an embodiment, the next_vcdi_flag indicates presence of the next_top_left_x, next_top_left_y, next_width and next_height fields when set to 1.

The duration indicates the duration of the current region. In another embodiment, the duration may indicate a difference between a current region representation time and a next region representation time.

The reference_width indicates the horizontal size of a 2D space. Here, the horizontal size of the 2D space may be represented by the number of pixels.

The reference_height indicates the vertical size of the 2D space. Here, the vertical size of the 2D space may be represented by the number of pixels.

The top_left_x indicates the horizontal coordinate of the top left point of a region to be represented.

The top_left_y indicates the vertical coordinate of the top left point of the region to be represented.

The width indicates the horizontal size of the region to be represented. Here, the horizontal size of the region to be represented may be represented in number of pixels.

The height indicates the vertical size of the region to be represented. Here, the vertical size of the region to be represented may be represented in number of pixels.

The interpolate indicates whether values between the previous region and the current region are filled by linearly interpolated values. In an embodiment, when interpolate is 1, the values between the previous region and the current region can be filled by linearly interpolated values.

The next_top_left_x indicates the horizontal coordinate of the top left point of the next region to be represented.

The next_top_left_y indicates the vertical coordinate of the top left point of the next region to be represented.

The next_width indicates the horizontal size of the next region to be represented. Here, the horizontal size of the region to be represented may be represented in number of pixels.

The next_height indicates the vertical size of the next region to be represented. Here, the vertical size of the region to be represented may be represented in number of pixels.

The next_interpolate indicates whether values between the current region and the next region are filled by linearly interpolated values. In an embodiment, when the next_interpolate is 1, the values between the current region and the next region can be filled by linearly interpolated values.

Referring to FIG. 34, a spherical vdci descriptor according to an embodiment of the present invention is shown.

The spherical_vcdi_descriptor may include spherical_vcdi_descr_tag, spherical_vdci_descr_length, reference_region_flag, duration_flag, next_vcdi_flag, reference_min_yaw, reference_max_yaw, reference_min_pitch, reference_max_pitch, yaw, pitch, roll, field_of_view, interpolate, duration, next_yaw, next_pitch, next_roll, next_ field_of_view and/or next_interpolate.

The spherical_vcdi_descr_tag indicates the spherical vdci descriptor by allocating a unique value thereto.

The spherical_vcdi_descr_length indicates the length of the spherical vdci descriptor in bytes.

The reference_region_flag indicates presence or absence of reference_min_yaw, reference_max_yaw, reference_min_ pitch and reference_max_pitch fields. In an embodiment, the reference_region_flag indicates presence of the reference_min_yaw, reference_max_yaw, reference_min_pitch and reference_max_pitch fields when set to 1.

The duration_flag indicates presence or absence of the duration field. In an embodiment, the duration_flag indicates presence of the duration field when set to 1.

The next_vcdi_flag indicates presence or absence of next_yaw, next_pitch, next_roll, next_field_of view and next_interpolate fields. In an embodiment, the next_ vcdi_flag indicates presence of the next_yaw, next_pitch, next_roll, next_field_of_view and next_interpolate fields when set to 1.

The duration indicates the duration of the current region. Alternatively, the duration may indicate a difference between a current region representation time and a next region representation time.

The reference_min_yaw indicates a minimum value of a rotation amount with respect to the yaw axis of a 3D space.

The reference_max_yaw indicates a maximum value of the rotation amount with respect to the yaw axis of the 3D space.

The reference_min_pitch indicates a minimum value of a rotation amount with respect to the pitch axis of the 3D space.

The reference_max_pitch indicates a maximum value of the rotation amount with respect to the pitch axis of the 3D space.

The yaw indicates a rotation amount with respect to the yaw axis of a region to be represented.

The pitch indicates a rotation amount with respect to the pitch axis of the region to be represented.

The roll indicates a rotation amount with respect to the roll axis of the region to be represented.

The field_of_view indicates a field of view of the region to be represented.

The interpolate indicates whether values between the previous region and the current region are filled by linearly interpolated values. In an embodiment, when interpolate is 1, the values between the previous region and the current region can be filled by linearly interpolated values.

The next_yaw indicates a rotation amount with respect to the yaw axis of the next region to be represented.

The next_pitch indicates a rotation amount with respect to the pitch axis of the next region to be represented.

The next_roll indicates a rotation amount with respect to the roll axis of the next region to be represented.

The next_field_of_view indicates a field of view of the next region to be represented.

The next_interpolate indicates whether values between the current region and the next region are filled by linearly interpolated values. In an embodiment, when interpolate is 1, the values between the current region and the next region can be filled by linearly interpolated values.

A description will be given of receiver operation related to the methods of transmitting and signaling metadata about region information or viewpoint information through an MPEG-2 TS described above with reference to FIGS. 25 to 34.

Figure 35:
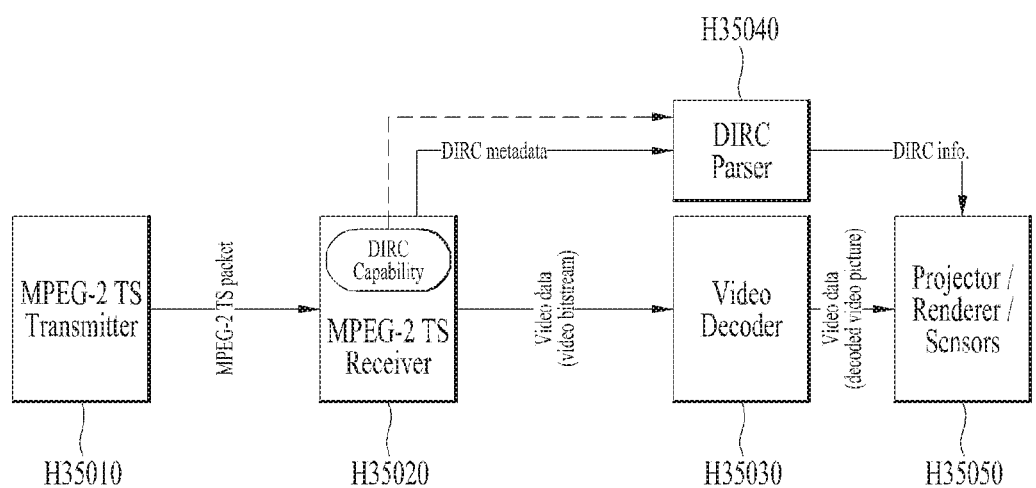
FIG. 35 is a block diagram of a receiver according to another embodiment of the present invention.

FIG. 35 is a block diagram of a receiver according to another embodiment of the present invention.

Referring to FIG. 35, the receiver according to another embodiment of the present invention may include an MPEG-2 TS receiver H35020, a video decoder H35030, a DIRC parser H35040 and/or a projector/renderer/sensors H35050.

VR content and/or metadata about region information or viewpoint information may be provided by an MPEG-2 TS transmitter H35010 and received by the MPEG-2 TS receiver H35020. Here, the MPEG-2 TS receiver H35020 of the receiver may receive VR content and/or metadata about region information or viewpoint information in a packet format from the MPEG-2 TS transmitter H35010. The MPEG-2 TS receiver H35020 may analyze received MPEG-2 TS packets to generate a video bitstream and metadata about region information or viewpoint information (DIRC metadata).

Here, the MPEG-2 TS receiver H35020 may recognize presence or absence of the metadata through the aforementioned method of identifying the metadata about region information or viewpoint information transmitted through a PEG or an adaptation field.

In addition, the MPEG-2 receiver H35020 may activate the DIRC parser depending on capabilities of the receiver and/or purpose of use of the content (refer to the dotted line of the figure). For example, when the receiver cannot process the metadata about region information or viewpoint information or does not use the metadata about region information or viewpoint information according to purpose, the adaptation set through which the metadata about region information or viewpoint information is transmitted may not be used (may be skipped). The MPEG-2 receiver H35020 may deliver the video bitstream and the metadata about region information or viewpoint information (DIRC metadata) to the video decoder H35030 and the DIRC parser H35040.

The video decoder H35030 may decode the video bitstream and deliver the decoded video bitstream to the projector/renderer/sensors H35050.

The DIRC parser H35040 may parse the DIRC metadata and deliver the parsed information (DIRC info) to the projector/renderer/sensors H35050.

The projector/renderer/sensors H35050 may receive the video bitstream from the video decoder H35030 and receive the DIRC metadata from the DIRC parser H35040. In addition, the projector/renderer/sensors H35050 may provide video data to a user using the DIRC information. A method through which the projector/renderer/sensors H35050 provide VR content to the user using the DIRC information may depend on application. For example, a viewpoint intended by a producer and indicated by DIRC can be displayed to the user through auto navigation. As another example, VR content can be displayed depending on the viewpoint of the user with direction indication for guiding the viewpoint intended by the producer.

<Method of Transmitting and Signaling Metadata about Region Information or Viewpoint Information Using Video Coding Layer>

The metadata about region information or viewpoint information described above with reference to FIGS. 12 to 16 may be transmitted through a video coding layer (VCL). More specifically, the metadata about region information or viewpoint information may be transmitted in the form of a VCL SEI (Supplemental Enhancement Information) message.

FIG. 36 illustrates metadata about region information or viewpoint information which is included in an SEI message according to an embodiment of the present invention.

Referring to the upper part of FIG. 36, a payload of an SEI message according to an embodiment of the present invention includes metadata about region information or viewpoint information in a 2D space.

The payload of the SEI message according to an embodiment of the present invention may include directors_cut_id, reference_region_flag, duration_flag, next_vcdi_flag, reference_width, reference_height, top_left_x, top_left_y, width, height, interpolate, duration, next_top_left_x, next_top_left_y, next_width, next_height and/or next_interpolate.

The directors_cut_id indicates a unique ID of the metadata about region information or viewpoint information in the 2D space. When there are pieces of metadata about region information or viewpoint information in multiple 2D spaces in the same stream, the directors_cut_id may be used to identify each piece of the metadata. That is, pieces of metadata having the same directors_cut_id form a metadata sequence indicating region information or viewpoint information in a single 2D space.

Description of the 2d_vcdi_descriptor ( ) with reference to FIG. 33 may be applied to other fields included in the payload of the SEI message according to an embodiment of the present invention.

Referring to the lower part of FIG. 36, a payload of an SEI message according to another embodiment of the present invention includes metadata about region information or viewpoint information in a 3D space.

The payload of the SEI message according to another embodiment of the present invention may include directors_cut_id, reference_region_flag, duration_flag, next_vcdi_flag, reference_min_yaw, reference_max_yaw, reference_min_pitch, reference_max_pitch, yaw, pitch, roll, field_of_view, interpolate, duration, next_yaw, next_pitch, next_roll, next_field_of_view and/or next_interpolate.

The directors_cut_id indicates a unique ID of the metadata about region information or viewpoint information in the 3D space. When there are pieces of metadata about region information or viewpoint information in multiple 3D spaces in the same stream, the directors_cut_id may be used to identify each piece of the metadata. That is, pieces of metadata having the same directors_cut_id form a metadata sequence indicating region information or viewpoint information in a single 3D space.

Description of the spherical_vcdi_descriptor( ) with reference to FIG. 34 may be applied to other fields included in the payload of the SEI message according to an embodiment of the present invention.

A description will be given of receiver operation related to the method of transmitting and signaling metadata about region information or viewpoint information through the VCL described above with reference to FIG. 36.

Figure 37:
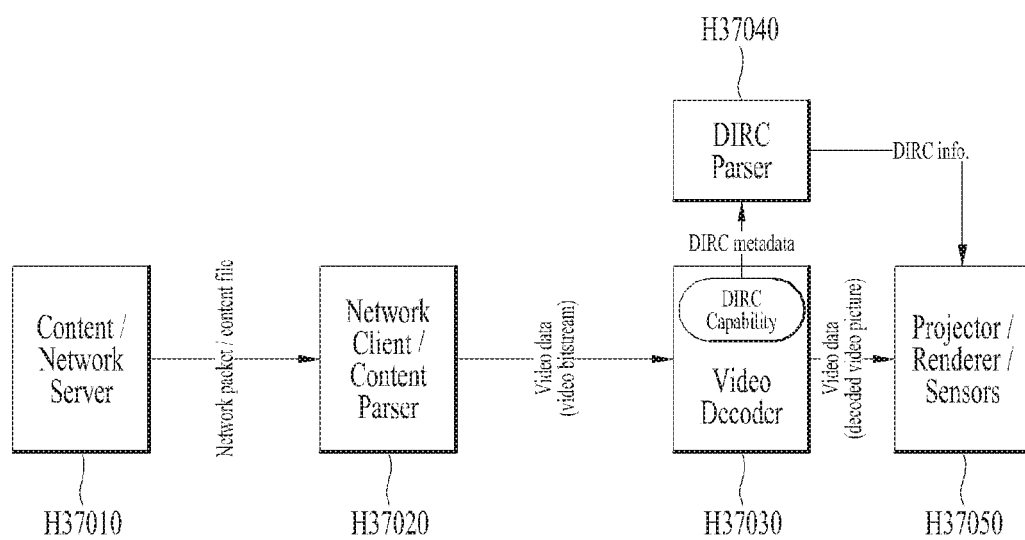
FIG. 37 is a block diagram of a receiver according to another embodiment of the present invention.

FIG. 37 is a block diagram of a receiver according to another embodiment of the present invention.

Referring to FIG. 37, the receiver according to another embodiment of the present invention may include a network client/content parser H37020, a video decoder H37030, a DIRC parser H37040 and/or a projector/renderer/sensors H37050.

Video data including VR content and/or metadata about region information or viewpoint information may be provided by a content/network server H37010 and received by the network client/content parser H37020. Here, the network client/content parser H37020 of the receiver may receive video data in the form of a network packet or a file from the content/network server H37010. The network client/content parser H37020 may analyze the received network packet or file to generate a video bitstream.

The network client/content parser H37020 may deliver the video bitstream to the video decoder H37030.

The video decoder H37030 may decode the video bitstream. The video decoder H37030 may decode the video bitstream to acquire video data and metadata about region information or viewpoint information (DIRC metadata).

The video decoder H37030 may deliver the video bitstream to the projector/renderer/sensors H37050.

In addition, the video decoder H37030 may activate the DIRC parser H37040 depending on capabilities of the receiver and/or purpose of use of the content and deliver the metadata about region information or viewpoint information (DIRC metadata) to the DRIC parser H37040. For example, when the receiver cannot process the metadata about region information or viewpoint information or does not use the metadata about region information or viewpoint information according to purpose, the adaptation set through which the metadata about region information or viewpoint information is transmitted may not be used (may be skipped).

The DIRC parser H37040 may parse the DIRC metadata and deliver the parsed information (DIRC info) to the projector/renderer/sensors H37050.

The projector/renderer/sensors H37050 may receive the video bitstream from the video decoder H37030 and receive the DIRC metadata from the DIRC parser H37040. In addition, the projector/renderer/sensors H37050 may provide video data to a user using the DIRC information. A method through which the projector/renderer/sensors H37050 provide VR content to the user using the DIRC information may depend on application. For example, a viewpoint intended by a producer and indicated by DIRC can be displayed to the user through auto navigation. As another example, VR content can be displayed depending on the viewpoint of the user with direction indication for guiding the viewpoint intended by the producer.

According to one aspect of the present invention, a method of transmitting omnidirectional video is provided.

Figure 38:
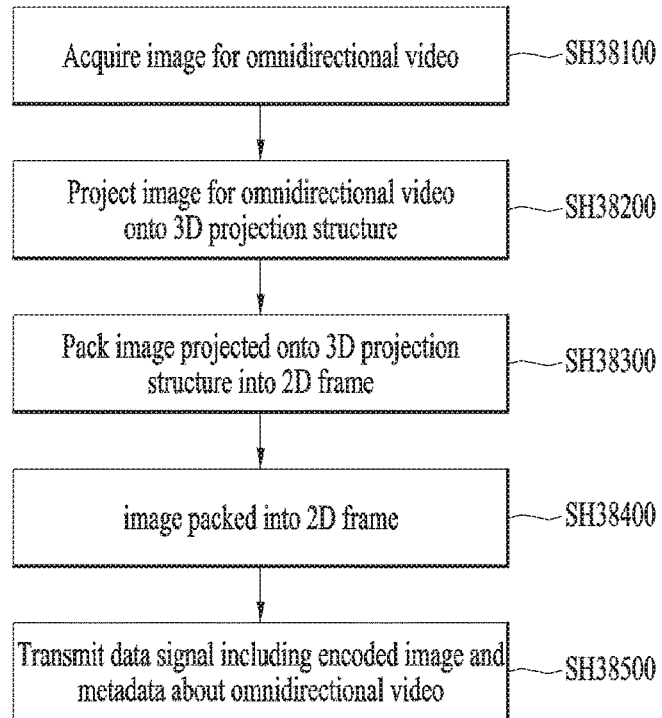
FIG. 38 is a flowchart illustrating a method of transmitting omnidirectional video according to one embodiment of the present invention.

FIG. 38 is a flowchart illustrating a method of transmitting omnidirectional video according to an embodiment of the present invention.

The method of transmitting omnidirectional video according to an embodiment of the present invention may include a step SH38100 of acquiring an image for omnidirectional video, a step SH380200 of projecting the image for the omnidirectional video on a 3D projection structure, a step SH38300 of packing the image projected on the 3D projection structure into a 2D frame, a step SH38400 of encoding the image packed into the 2D frame, and a step SH38500 of transmitting data including the encoded image and metadata about the omnidirectional video.

In step SH38100 of acquiring the image for the omnidirectional video, the image for the omnidirectional video can be acquired. As described above with reference to FIGS. 1, 2 and 4, the image for the omnidirectional video may be acquired by capturing the image using an omnidirectional camera (360-degree camera or VR camera) or by generating data corresponding to the omnidirectional video.

Step SH38100 of acquiring the image for the omnidirectional video may correspond to the capture process t1010 shown in FIG. 1, the operation of the data input unit shown in FIG. 2 and acquisition shown in FIG. 4.

Step SH380200 of projecting the image for the omnidirectional video on a 3D projection structure may be a step of projecting the image for the omnidirectional video on a 3D projection structure or a 3D model. In an embodiment, the 3D projection structure or the 3D model may be a sphere, a cube, a cylinder or a pyramid.

Step SH380200 of projecting the image for the omnidirectional video on a 3D projection structure may correspond to projection of the preparation process t1010 of FIG. 1, the operation of the projection processor shown in FIG. 2 and projection shown in FIG. 4.

In an embodiment, the method of transmitting omnidirectional video may further include a stitching step of connecting images for the omnidirectional video between step SH38100 of acquiring the image for the omnidirectional video and step SH380200 of projecting the image for the omnidirectional video on the 3D projection structure. That is, images for the omnidirectional video may be connected through stitching and the connected images may be projected on the 3D projection structure.

Step SH38300 of packing the image projected on the 3D projection structure into a 2D frame may be a step of mapping a 3D image projected on the 3D projection structure to a 2D frame. The 3D image projected on the 3D projection structure may be represented using 3D region information and the image packed in the 2D frame may be represented using 2D region information.

Here, the 2D region information may correspond to the 3D region information. That is, a region or a point on the 2D frame indicated by the 2D region information may correspond to a region or a point on the 3D projection structure indicated by the 3D region information.

The 2D region information may be the information described above with reference to FIGS. 12, 13, 33 and 36. The 3D region information may be information described above with reference to FIGS. 14, 15, 34 and 36. Further, the 2D region information and the 3D region information may be information included in the metadata about the omnidirectional video.

In addition, step SH38300 of packing the image projected on the 3D projection structure into a 2D frame may correspond to 2D image mapping of the preparation process t1010 of FIG. 1, the 2D projection operation of the projection processor shown in FIG. 2 and the mapping process of projection mapping shown in FIG. 4.

In an embodiment, step SH38300 of packing the image projected on the 3D projection structure into a 2D frame may include a step of dividing the image projected on a 3D projection structure into predetermined regions and a step of packing sub-images divided into the predetermined regions into a 2D frame.

The step of dividing the image projected on a 3D projection structure into predetermined regions and the step of packing sub-images divided into the predetermined regions into a 2D frame may correspond to the region-wise packing process of FIG. 1, the operation of the region-wise packing unit of FIG. 2 and region-wise packing of FIG. 4. When region-wise packing is performed, the sub-images divided into the predetermined regions may correspond to packed frames. When region-wise packing is not performed, a 2D frame may correspond to a packed frame.

Step SH38400 of encoding the image packed into a 2D frame may be a step of encoding the packed image according to a predetermined encoding scheme.

Step SH38400 of encoding the image packed into a 2D frame may correspond to the encoding process of the preparation process t1010 of FIG. 1, the operation of the data encoder of FIG. 2 and the video encoding or image encoding process of FIG. 4.

In an embodiment, when region-wise packing is performed, step SH38400 of encoding the image packed into a 2D frame may be a step of encoding a packed image corresponding to each region. Here, different encoding schemes may be used for packed images.

Step SH38500 of transmitting the encoded image and metadata about the omnidirectional video may be a step of transmitting a data signal including the encoded image and the metadata about the omnidirectional video to a reception device.

Step SH38500 of transmitting a data signal including the encoded image and the metadata about the omnidirectional video may correspond to the transmission process of FIG. 1, the operation of the transmitter of FIG. 2 and delivery shown in FIG. 4.

In an embodiment, the data signal may be a broadcast signal, and the encoded image and the metadata about the omnidirectional video may be transmitted through the broadcast signal.

In an alternative embodiment, the encoded image may be transmitted through a broadcast network and the metadata about the omnidirectional video may be transmitted through a broadband network. Alternatively, the encoded image may be transmitted through a broadband network and the metadata about the omnidirectional video may be transmitted through a broadcast network. Alternatively, both the encoded image and the metadata about the omnidirectional video may be transmitted through a broadband network.

The metadata about the omnidirectional video may refer to information necessary for the reception device to process the omnidirectional video. The metadata about the omnidirectional video may correspond to all or part of the metadata shown in FIG. 8 and may refer to the information shown in FIGS. 12 to 19, 21, 23, 24, 26 to 34 and/or 36.

In a specific embodiment, the metadata about the omnidirectional video may include 3D region information about the image projected on the 3D projection structure or 2D region information about the image packed into the 2D frame. Here, the 2D region information may be the information described with reference to FIGS. 12, 13, 33 and 36 and the 3D region information may be the information described with reference to FIGS. 14, 15, 34 and 36. Further, the 2D region information and the 3D region information may be information included in the metadata about the omnidirectional video.

In a specific embodiment, the 3D region information may be used to indicate a region of a 3D image projected on a 3D spherical projection structure. That is, the 3D region information may be information indicating a region of a sphere (refer to FIGS. 14, 15, 34 and 36). In this embodiment, the 3D region information may include horizontal field of view information indicating a horizontal field of view and vertical field of view information indicating a vertical field of view. In addition, the 3D region information may further include yaw information and pitch information which indicate a yaw axis angle and a pitch axis angle for indicating the centers of the horizontal field of view and the vertical field of view. In an embodiment, the horizontal field of view information and the vertical field of view information may be field_of_view, min_field_of_view, max_field_of_view, horizontal_field_of_view and/or vertical_field_of_view of FIGS. 14 and 15.

In an embodiment, the yaw information and the pitch information which indicate a yaw axis angle and a pitch axis angle for indicating the centers of the horizontal field of view and the vertical field of view may be center_yaw, yaw, center_pitch and pitch of FIGS. 14 and 15.

In addition, the metadata about the omnidirectional video may indicate information about a viewpoint intended by a producer of the omnidirectional video.

The metadata about the omnidirectional video may be transmitted through the ISOBMFF, a DASH MPD/segment, a PES packet or an adaptation field of an MPEG-2 TS and/or an SEI message of VCL.

In an embodiment, the metadata about the omnidirectional video may be included in an adaptation set of DASH (Dynamic Adaptive Streaming over HTTP) and transmitted. This has been described above in detail with reference to FIGS. 18 to 25.

In another embodiment, the metadata about the omnidirectional video may be included in a PES (Packetized Elementary Stream) packet or an adaptation field of an MPEG-2 TS and transmitted. This has been described above in detail with reference to FIGS. 26 to 36.

In another embodiment, the metadata about the omnidirectional video may be included in an SEI (Supplemental Enhancement Layer) message of a VCL (Video Coding layer). This has been described above in detail with reference to FIGS. 36 and 37.

According to another aspect of the present invention, a device for transmitting omnidirectional video is provided.

Figure 39:
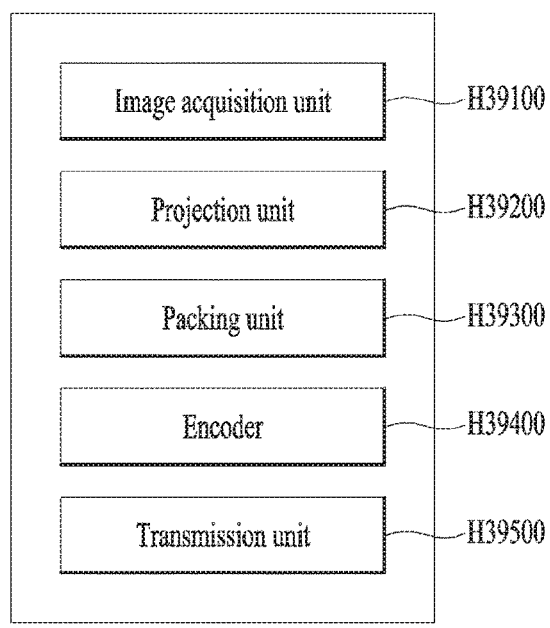
FIG. 39 is a block diagram of a device for transmitting omnidirectional video according to one embodiment of the present invention.

FIG. 39 is a block diagram of a device for transmitting omnidirectional video according to an embodiment of the present invention.

The device for transmitting omnidirectional video according to an embodiment of the present invention may include an image acquisition unit H39100 for acquiring an image for the omnidirectional video, a projection unit H39200 for projecting the image for the omnidirectional video on a 3D projection structure, a packing unit H39300 for packing the image projected on the 3D projection structure into a 2D frame, an encoder H39400 for encoding the image packed into the 2D frame, and a transmission unit H39500 for transmitting a data signal including the encoded image and metadata about the omnidirectional video.

The operation of the image acquisition unit H39100 may correspond to step SH38100 of acquiring an image for omnidirectional video in the method of transmitting omnidirectional video according to an embodiment of the present invention described above with reference to FIG. 38 and thus description of step SH38100 is applicable thereto.

The operation of the projection unit H39200 may correspond to step SH38200 of projecting the image for the omnidirectional video onto a 3D projection structure in the method of transmitting omnidirectional video according to an embodiment of the present invention described above with reference to FIG. 38 and thus description of step SH38200 is applicable thereto.

The operation of the packing unit H39300 may correspond to step SH38300 of packing the image projected onto the 3D projection structure into a 2D frame in the method of transmitting omnidirectional video according to an embodiment of the present invention described above with reference to FIG. 38 and thus description of step SH38300 is applicable thereto.

The operation of the encoder H39400 may correspond to step SH38400 of encoding the image packed into the 2D frame in the method of transmitting omnidirectional video according to an embodiment of the present invention described above with reference to FIG. 38 and thus description of step SH38400 is applicable thereto.

The operation of the transmission unit H39500 may correspond to step SH38500 of transmitting a data signal including the encoded image and metadata about the omnidirectional video in the method of transmitting omnidirectional video according to an embodiment of the present invention described above with reference to FIG. 38 and thus description of step SH38500 is applicable thereto.

In an embodiment, the device for transmitting omnidirectional video may further include a stitcher (not shown). The stitcher may connect images for omnidirectional video. The operation of the stitcher may correspond to the stitching step of the method of transmitting omnidirectional video according to an embodiment of the present invention described above with reference to FIG. 38 and thus description of the stitching step is applicable thereto.

In an embodiment, the packing unit H39300 may divide the image projected onto the 3D projection structure into predetermined regions and pack sub-images divided into the predetermined regions into a 2D frame. Such region-wise packing operation of the packing unit may correspond to the region-wise packing step of the method of transmitting omnidirectional video according to an embodiment of the present invention described above with reference to FIG. 38 and thus description of the region-wise packing step is applicable thereto.

The metadata about the omnidirectional video may refer to information necessary for a reception device to process the omnidirectional video. The metadata about the omnidirectional video has been described above in the method of transmitting omnidirectional video according to an embodiment of the present invention.

According to another aspect of the present invention, a method of receiving omnidirectional video is provided.

Figure 40:
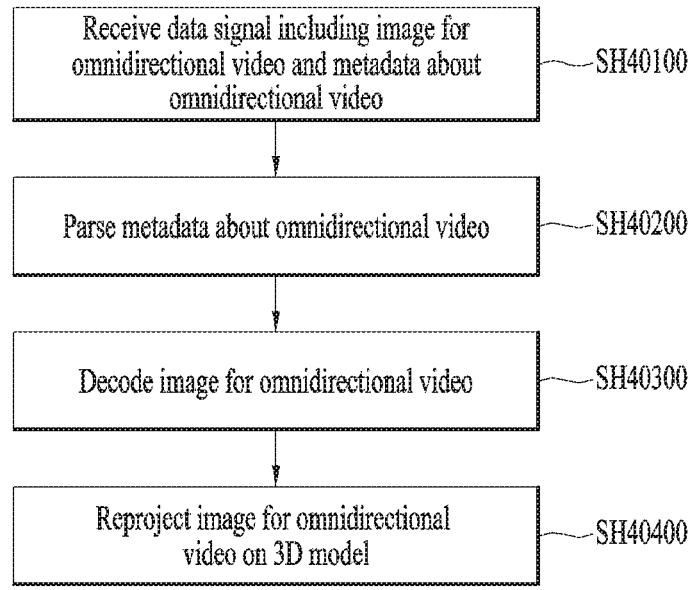
FIG. 40 is a flowchart illustrating a method of receiving omnidirectional video according to one embodiment of the present invention.

FIG. 40 is a flowchart illustrating a method of receiving omnidirectional video according to an embodiment of the present invention.

The method of receiving omnidirectional video according to an embodiment of the present invention may include a step SH40100 of receiving a data signal including an image for the omnidirectional video and metadata about the omnidirectional video, a step SH40200 of parsing the metadata about the omnidirectional video, a step SH40300 of decoding the image for the omnidirectional video and a step SH40400 of reprojecting the image for the omnidirectional video onto a 3D model.

The method of receiving omnidirectional video according to an embodiment of the present invention may be a method of a receiving side which corresponds to the above-described method of transmitting omnidirectional video according to an embodiment of the present invention.

Step SH40100 of receiving a data signal including an image for the omnidirectional video and metadata about the omnidirectional video may be a step of receiving a data signal including an image for the omnidirectional video and metadata about the omnidirectional video, and the data signal may be transmitted from a transmission device.

The image for the omnidirectional video may be the image encoded in the method of transmitting omnidirectional video according to an embodiment of the present invention. That is, the image for the omnidirectional video may be the encoded image generated through steps SH38100, SH38200, SH38300 and SH38400 of FIG. 38.

Step SH40100 of receiving a data signal including an image for the omnidirectional video and metadata about the omnidirectional video may correspond to the reception process of FIG. 1, the operation of the reception unit shown in FIG. 3 and the reception process of FIG. 4.

In an embodiment, the data signal may be a broadcast signal, and the encoded image and the metadata about the omnidirectional video may be transmitted through the broadcast signal.

In an alternative embodiment, the image for the omnidirectional video may be transmitted through a broadcast network and the metadata about the omnidirectional video may be transmitted through a broadband network. Alternatively, the image for the omnidirectional video may be transmitted through a broadband network and the metadata about the omnidirectional video may be transmitted through a broadcast network. Alternatively, both the image for the omnidirectional video and the metadata about the omnidirectional video may be transmitted through a broadband network.

The metadata about the omnidirectional video may refer to information necessary for the reception device to process the omnidirectional video. The metadata about the omnidirectional video may correspond to all or part of the metadata shown in FIG. 8 and may refer to the information shown in FIGS. 12 to 19, 21, 23, 24, 26 to 34 and/or 36.

In a specific embodiment, the metadata about the omnidirectional video may include 3D region information about the image projected on the 3D projection structure or 2D region information about the image packed into the 2D frame. Here, the 2D region information may be the information described with reference to FIGS. 12, 13, 33 and 36 and the 3D region information may be the information described with reference to FIGS. 14, 15, 34 and 36. Further, the 2D region information and the 3D region information may be information included in the metadata about the omnidirectional video.

In a specific embodiment, the 3D region information may be used to indicate a region of a 3D image projected on a 3D spherical projection structure. That is, the 3D region information may be information indicating a region of a sphere (refer to FIGS. 14, 15, 34 and 36). In this embodiment, the 3D region information may include horizontal field of view information indicating a horizontal field of view and vertical field of view information indicating a vertical field of view. In addition, the 3D region information may further include yaw information and pitch information which indicate a yaw axis angle and a pitch axis angle for indicating the centers of the horizontal field of view and the vertical field of view. In an embodiment, the horizontal field of view information and the vertical field of view information may be field_of_view, min_field_of_view, max_field_of_view, horizontal_field_of_view and/or vertical_field_of_view of FIGS. 14 and 15.

In an embodiment, the yaw information and the pitch information which indicate a yaw axis angle and a pitch axis angle for indicating the centers of the horizontal field of view and the vertical field of view may be center_yaw, yaw, center_pitch and pitch of FIGS. 14 and 15.

In addition, the metadata about the omnidirectional video may indicate information about a viewpoint intended by a producer of the omnidirectional video.

The metadata about the omnidirectional video may be transmitted through the ISOBMFF, a DASH MPD/segment, a PES packet or an adaptation field of an MPEG-2 TS and/or an SEI message of VCL.

In an embodiment, the metadata about the omnidirectional video may be included in an adaptation set of DASH (Dynamic Adaptive Streaming over HTTP) and transmitted. This has been described above in detail with reference to FIGS. 18 to 25.

In another embodiment, the metadata about the omnidirectional video may be included in a PES (Packetized Elementary Stream) packet or an adaptation field of an MPEG-2 TS and transmitted. This has been described above in detail with reference to FIGS. 26 to 36.

In another embodiment, the metadata about the omnidirectional video may be included in an SEI (Supplemental Enhancement Layer) message of a VCL (Video Coding layer). This has been described above in detail with reference to FIGS. 36 and 37.

Step SH40200 of parsing the metadata about the omnidirectional video may be a step of parsing the metadata about the omnidirectional video included in the data signal.

As described above, the metadata about the omnidirectional video may be transmitted through ISOBMFF, a DASH MPD/segment, a PES packet or an adaptation field of an MPEG-2 TS and/or an SEI message of VCL and thus may be parsed at each level.

Step SH40300 of decoding the image for the omnidirectional video may be a step of decoding an encoded image using a decoding scheme corresponding to the encoding scheme used for the encoded image.

Step SH40300 of decoding the image for the omnidirectional video may correspond to the decoding process of FIG. 1, the operation of the data decoder of FIG. 3 and the video decoding or image decoding process of FIG. 4.

In an embodiment, when region-wise packing is performed, step SH40300 of decoding the image for the omnidirectional video may be a step of decoding a packed image corresponding to each region. Here, different decoding schemes may be used for packed images.

In an embodiment in which the metadata about the omnidirectional video is transmitted through an SEI message of VCL, the metadata about the omnidirectional video may be extracted in step SH40300.

Step SH40400 of reprojecting the image for the omnidirectional video onto a 3D model may be a step of reprojecting an image packed into a 2D frame onto a 3D model. Since the image for the omnidirectional video decoded through step SH40300 refers to an image packed into a 2D frame, step SH40400 may refer to a step of reprojecting the image packed into a 2D frame onto a 3D model. Here, the 3D model may be the same as the 3D projection structure in the method of transmitting omnidirectional video according to an embodiment of the present invention.

Step SH40400 of reprojecting the image for the omnidirectional video on the 3D model may correspond to the rendering process t1030 of FIG. 1, the operation of the reprojection processor of FIG. 3 and the video rendering process of FIG. 4.

In an embodiment, the method of receiving omnidirectional video according to an embodiment of the present invention may further include a feedback step. The feedback step is a step of outputting viewport information or rotation information of a user device. Data corresponding to a view region can be processed on the basis of the viewport information or rotation information of the user device. Feedback information including the viewport information or rotation information of the user device may be provided prior to the reprojection step, rendering step, image decoding step or a transmission file or segment decapsulation step. Further, the feedback information may be transmitted to a transmission side.

The feedback step may correspond to the feedback process of FIG. 1, the operation of the feedback processor of FIG. 3 and the tracking process of a VR application shown in FIG. 4.

According to another aspect of the present invention, a device for receiving omnidirectional video is provided.

Figure 41:
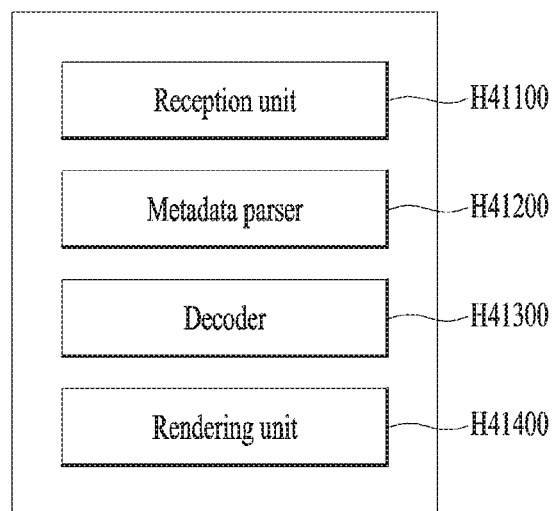
FIG. 41 is a block diagram of a device for receiving omnidirectional video according to one embodiment of the present invention.

FIG. 41 is a block diagram of a device for receiving omnidirectional video according to an embodiment of the present invention.

The device for receiving omnidirectional video according to an embodiment of the present invention may include a reception unit H41100 for receiving a data signal including an image for the omnidirectional video and metadata about the omnidirectional video, a metadata parser H41200 for parsing the metadata about the omnidirectional video, a decoder H41300 for decoding the image for the omnidirectional video, and a rendering unit H41400 for reprojecting the image for the omnidirectional video onto a 3D model.

The operation of the reception unit H41100 may correspond to step SH40100 of receiving a data signal including an image for the omnidirectional video and metadata about the omnidirectional video in the method of receiving omnidirectional video according to an embodiment of the present invention described above with reference to FIG. 40 and thus description of step SH40100 is applicable thereto.

The operation of the metadata parser H41200 may correspond to step SH40200 of parsing the metadata about the omnidirectional video in the method of receiving omnidirectional video according to an embodiment of the present invention described above with reference to FIG. 40 and thus description of step SH40200 is applicable thereto.

The operation of the decoder H41300 may correspond to step SH40300 of decoding the image for the omnidirectional video in the method of receiving omnidirectional video according to an embodiment of the present invention described above with reference to FIG. 40 and thus description of step SH40300 is applicable thereto.

The operation of the rendering unit H41400 may correspond to step SH40400 of reprojecting the image for the omnidirectional video onto a 3D model in the method of receiving omnidirectional video according to an embodiment of the present invention described above with reference to FIG. 40 and thus description of step SH40400 is applicable thereto.

In an embodiment, the device for receiving omnidirectional video may further include a feedback processor (not shown). The feedback processor may generate and output viewport information and/or rotation information by tracking viewport and/or rotation of a user device.

The metadata about the omnidirectional video may refer to information necessary for a reception device to process the omnidirectional video. The metadata about the omnidirectional video has been described above in the method of receiving omnidirectional video according to an embodiment of the present invention.

The internal components of the above-described devices may be processors which execute consecutive procedures stored in memories or hardware components. The processors or hardware components may be provided to the inside/outside of the devices.

The aforementioned modules may be omitted or replaced by other modules which perform similar/identical operations according to embodiments.

Each of the aforementioned parts, modules or units may be a processor or a hardware part designed to execute a series of execution steps stored in a memory (or a storage unit). Each step described in the above-mentioned embodiments may be implemented by processors or hardware parts. Each module, each block, and/or each unit described in the above-mentioned embodiments may be realized by a processor/hardware. In addition, the above-mentioned methods of the present invention may be realized by code written in recoding media configured to be read by a processor so that the code may be read by the processor provided by the apparatus.

Although the description of the present invention is explained with reference to each of the accompanying drawings for clarity, it is possible to design new embodiments by merging the embodiments shown in the accompanying drawings with each other. If a recording medium readable by a computer, in which programs for executing the embodiments mentioned in the foregoing description are recorded, is designed by those skilled in the art, it may fall within the scope of the appended claims and their equivalents.

The devices and methods according to the present invention may be non-limited by the configurations and methods of the embodiments mentioned in the foregoing description. The embodiments mentioned in the foregoing description may be configured in a manner of being selectively combined with one another entirely or in part to enable various modifications.

In addition, a method according to the present invention may be implemented with processor-readable code in a processor-readable recording medium provided to a network device. The processor-readable medium may include all kinds of recording devices capable of storing data readable by a processor. The processor-readable medium may include one of ROM, RAM, CD-ROM, magnetic tapes, floppy disks, optical data storage devices, and the like and also include carrier-wave type implementation such as a transmission via Internet. Furthermore, as the processor-readable recording medium is distributed to a computer system connected via a network, processor-readable code may be saved and executed in a distributed manner.

Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

It will be appreciated by those skilled in the art that various modifications and variations may be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

MODE FOR INVENTION

Various embodiments have been described in the best mode for carrying out the invention.

INDUSTRIAL APPLICABILITY

The present invention is available in a series of broadcast signal provision fields.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

What is claimed is:

1. A method of generating 360 degree video in a server, the method comprising:
   obtaining image data captured by at least one camera;
   stitching the image data;
   mapping the image data onto a packed picture;
   encoding the packed picture;
   generating one or more media tracks for the packed picture;
   generating timed metadata track for specifying a sphere region, wherein the timed metadata track includes first information for specifying a first rotation value related to a center of the sphere region based on a yaw axis, second information for specifying a second rotation value related to the center of the sphere region based on a pitch axis, third information for specifying a first range related to the sphere region based on the yaw axis, and fourth information for specifying a second range related to the sphere region based on the pitch axis;

generating track reference box having at least one track ID (identification), wherein the timed metadata track is linked to the one or more media tracks based on the track reference box; and transmitting at least one segment including the one or more media tracks, the timed metadata track, and the track reference box.

2. The method according to claim 1, wherein the at least one segment is transmitted to a VR (Virtual Reality) display.

3. The method according to claim 1, wherein the one or more media tracks, the timed metadata track, and the track reference box are included in an adaptation set of DASH (Dynamic Adaptive Streaming over HTTP).

4. The method according to claim 1, wherein the one or more media tracks, the timed metadata track, and the track reference box are included in a PES (Packetized Elementary Stream) packet of an MPEG-2 TS (Transport Stream) or an adaptation field of a TS.

5. The method according to claim 1, wherein the one or more media tracks, the timed metadata track, and the track reference box are included in an SEI (Supplemental Enhancement Layer) message of a VCL (Video Coding layer).

6. A device for transmitting 360 degree video, comprising:

an image acquisition unit for obtaining image data captured by at least one camera;

a projection unit for stitching the image data and mapping the image data onto a packed picture;

an encoder for encoding the packed picture;

a controller for generating one or more media tracks for the packed picture, and generating timed metadata track for specifying a sphere region, wherein the timed metadata track includes first information for specifying a first rotation value related to a center of the sphere region based on a yaw axis, second information for specifying a second rotation value related to the center of the sphere region based on a pitch axis, third information for specifying a first range related to the sphere region based on the yaw axis, and fourth information for specifying a second range related to the sphere region based on the pitch axis, wherein the controller is further configured to generate track reference box having at least one track ID (identification), wherein the timed metadata track is linked to the one or more media tracks based on the track reference box; and a transmitter for transmitting at least one segment including the one or more media tracks, the timed metadata track, and the track reference box.

7. A digital receiver for processing 360 degree video, comprising:

a receiving module configured to receive at least one segment including one or more media tracks related to the 360 degree video, timed metadata track for specifying a sphere region and track reference box having at least one track ID (identification), wherein the timed metadata track includes first information for specifying a first rotation value related to a center of the sphere region based on a yaw axis, second information for specifying a second rotation value related to the center of the sphere region based on a pitch axis, third information for specifying a first range related to the sphere region based on the yaw axis, and fourth information for specifying a second range related to the sphere region based on the pitch axis, wherein the timed metadata track is linked to the one or more media tracks based on the track reference box;

a decoder configured to decode the 360 degree video; and a display module configured to display the 360 degree video.

8. A method for processing 360 degree video in a digital receiver, comprising:

receiving at least one segment including one or more media tracks related to the 360 degree video, timed metadata track for specifying a sphere region and track reference box having at least one track ID (identification), wherein the timed metadata track includes first information for specifying a first rotation value related to a center of the sphere region based on a yaw axis, second information for specifying a second rotation value related to the center of the sphere region based on a pitch axis, third information for specifying a first range related to the sphere region based on the yaw axis, and fourth information for specifying a second range related to the sphere region based on the pitch axis, wherein the timed metadata track is linked to the one or more media tracks based on the track reference box;

decoding the 360 degree video; and displaying the 360 degree video.

* * * * *